US009537351B2

(12) United States Patent
Lee et al.

(10) Patent No.: US 9,537,351 B2
(45) Date of Patent: *Jan. 3, 2017

(54) DUAL INPUT POWER SUPPLY SYSTEM AND METHOD

(71) Applicant: Lite-On, Inc., Milpitas, CA (US)

(72) Inventors: Victor K. J. Lee, Milpitas, CA (US); Yung Hsiang Liu, New Taipei (TW); Wei Ru Chen, New Taipei (TW); Chen Yu Wang, New Taipei (TW); Chao Han Cheng, New Taipei (TW)

(73) Assignee: LITE-ON, INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/928,744

(22) Filed: Oct. 30, 2015

(65) Prior Publication Data

US 2016/0233720 A1 Aug. 11, 2016

Related U.S. Application Data

(63) Continuation-in-part of application No. 14/925,754, filed on Oct. 28, 2015, and a continuation-in-part of
(Continued)

(51) Int. Cl.
 *H02J 7/00* (2006.01)
 *G06F 1/30* (2006.01)
 *H02J 9/06* (2006.01)

(52) U.S. Cl.
 CPC ............... *H02J 9/061* (2013.01); *G06F 1/30* (2013.01); *H02J 7/0068* (2013.01); *H02J 9/06* (2013.01); *H02J 9/062* (2013.01)

(58) Field of Classification Search
None
See application file for complete search history.

(56) References Cited

U.S. PATENT DOCUMENTS 9,047,075 B1 6/2015 Lee
9,047,076 B1 6/2015 Lee
(Continued)

FOREIGN PATENT DOCUMENTS

DE 3031981 A1 4/1982
DE 10200802422 A1 2/2009
(Continued)

OTHER PUBLICATIONS

EPO, European Search Report for EP1419244 dated Jul. 10, 2015.
EPO, European Search Report for EP14199267 dated May 7, 2015.

*Primary Examiner* — Kim Huynh
*Assistant Examiner* — Vincent Chang
(74) *Attorney, Agent, or Firm* — David W. Carstens; Kevin M. Klughart; Carstens & Cahoon, LLP

(57) ABSTRACT

A dual input power supply system/method providing uninterruptable power to a protected load device (PLD) is disclosed. The system includes hybrid switch devices (HSD) comprising semiconductor and relay/contactors that minimize the OPERATE/RELEASE times associated with switchover from a primary power source (PPS) to a secondary power source (SPS). An operate/release controller (ORC) monitors the condition of power provided by the PPS and SPS and determines the optimal transfer time to activate the HSD and switch between the PPS and SPS based on the PLD configuration. Use of the HSD in conjunction with the ORC permits a wide variety of series permutated AC/DC primary (PPS) and secondary (SPS) power sources, EMI snubbers (EMS), bridge rectifier diodes (BRD), AC-DC converters (ADC), and DC-DC converters (DDC) to service the PLD, while simultaneously reducing storage capacitors normally required to cover the OPERATE/RELEASE times associated with traditional PPS/SPS switchover/failover delays.

48 Claims, 80 Drawing Sheets

Related U.S. Application Data application No. 14/843,880, filed on Sep. 2, 2015, now Pat. No. 9,444,280, which is a continuation of application No. 14/565,754, filed on Dec. 10, 2014, which is a continuation-in-part of application No. 14/509,454, filed on Oct. 8, 2014, now Pat. No. 9,047,075, which is a continuation of application No. 14/461,110, filed on Aug. 15, 2014, now Pat. No. 9,047,076.

(60) Provisional application No. 62/245,826, filed on Oct. 23, 2015, provisional application No. 62/245,807, filed on Oct. 23, 2015, provisional application No. 61/922,311, filed on Dec. 31, 2013.

(56) References Cited

U.S. PATENT DOCUMENTS

| | | |
|---|---|---|
| 2004/0164618 A1 | 8/2004 | Bryde |
| 2006/0050465 A1 | 3/2006 | Cho et al. |
| 2010/0180139 A1 | 7/2010 | Denney et al. |
| 2011/0291606 A1 | 12/2011 | Lee |
| 2012/0081078 A1 | 4/2012 | Matsumura et al. |
| 2012/0086269 A1 | 4/2012 | Nakano et al. |
| 2013/0020872 A1 | 1/2013 | Kinnard |
| 2013/0141828 A1 | 6/2013 | Yamaguchi et al. |
| 2013/0246815 A1 | 9/2013 | Uehara |

FOREIGN PATENT DOCUMENTS

| | | |
|---|---|---|
| EP | 2833504 A1 | 2/2015 |
| KR | 101322617 B1 | 10/2013 |

N.O.: normally open contact.

*Prior Art*

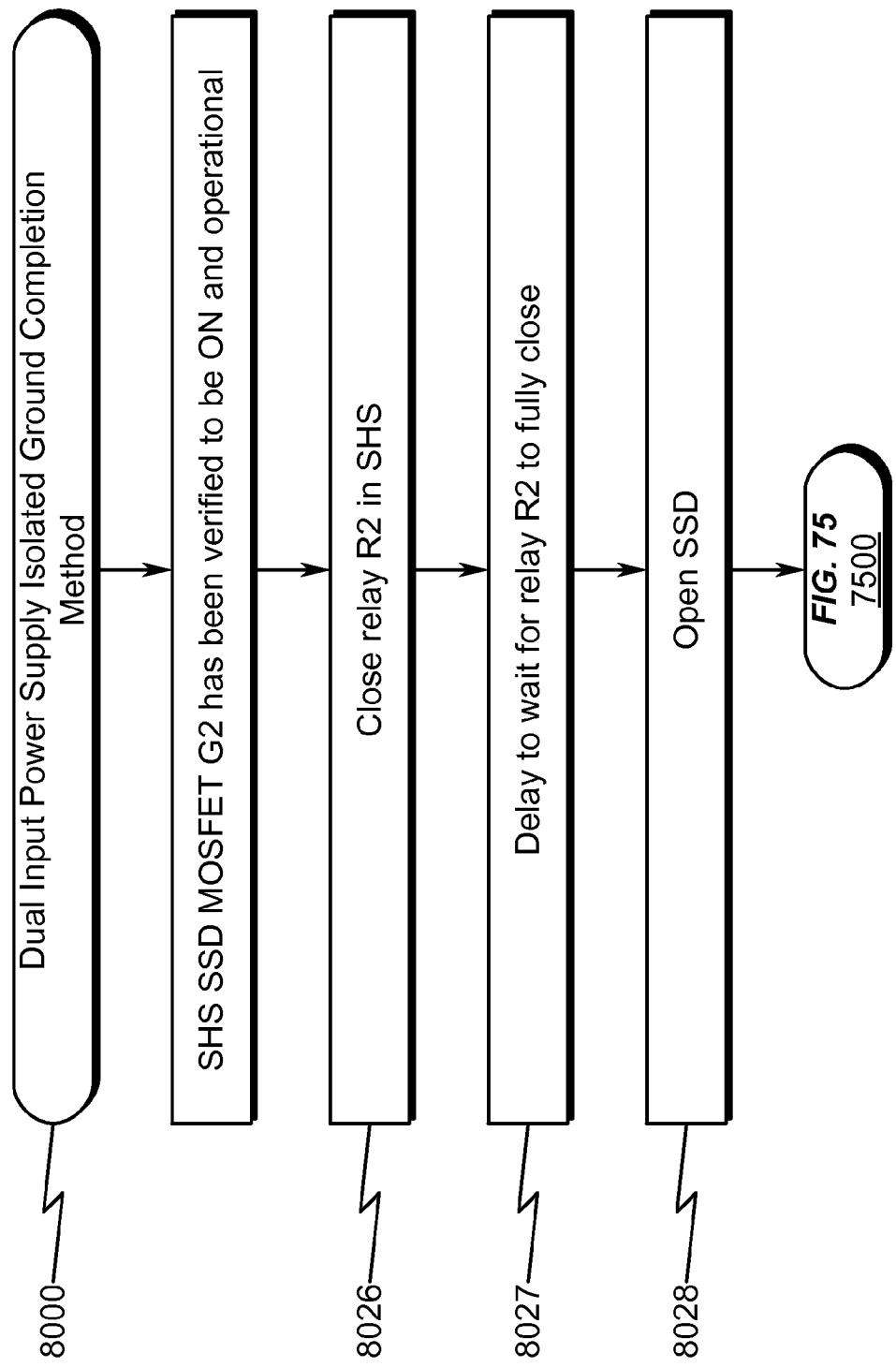

DUAL INPUT POWER SUPPLY SYSTEM AND METHOD

CROSS REFERENCE TO RELATED APPLICATIONS

Continuation-In-Part Patent Application (CIP)

This is a continuation-in-part (CIP) patent application of and incorporates by reference United States Utility Patent Application for POWER SUPPLY OUTPUT CONFIGURATION SYSTEM AND METHOD by inventor Victor K. J. Lee, filed electronically with the USPTO on Dec. 10, 2014, with Ser. No. 14/565,754, EFSID 20919171, confirmation number 2974.

Continuation Chain

The United States Utility Patent Application for POWER SUPPLY OUTPUT CONFIGURATION SYSTEM AND METHOD Ser. No. 14/565,754 is a continuation-in-part of United States Utility Patent Application for UNINTERRUPTABLE POWER SUPPLY SYSTEM AND METHOD by inventor Victor K. J. Lee, filed electronically with the USPTO on Aug. 15, 2014, with Ser. No. 14/461,110, EFSID 19882156, confirmation number 3198, now U.S. Pat. No. 9,047,076.

Utility Patent Applications

This application claims benefit under 35 U.S.C. §120 and incorporates by reference United States Utility Patent Application for POWER SUPPLY OUTPUT CONFIGURATION SYSTEM AND METHOD by inventor Victor K. J. Lee, filed electronically with the USPTO on Dec. 10, 2014, with Ser. No. 14/565,754, EFSID 20919171, confirmation number 2974.

This application claims benefit under 35 U.S.C. §120 and incorporates by reference United States Utility Patent Application for UNINTERRUPTABLE POWER SUPPLY SYSTEM AND METHOD by inventor Victor K. J. Lee, filed electronically with the USPTO on Aug. 15, 2014, with Ser. No. 14/461,110, EFSID 19882156, confirmation number 3198.

This application claims benefit under 35 U.S.C. §120 and incorporates by reference United States Utility Patent Application for UNINTERRUPTABLE POWER SUPPLY SYSTEM AND METHOD by inventor Victor K. J. Lee, filed electronically with the USPTO on Oct. 8, 2014, with Ser. No. 14/509,454, EFSID 20358607, confirmation number 3152, now U.S. Pat. No. 9,047,075.

Provisional Patent Applications

This application claims benefit under 35 U.S.C. §119 and incorporates by reference United States Provisional Patent Application for POWER SUPPLY OUTPUT CONFIGURATION SYSTEM AND METHOD by inventor Victor K. J. Lee, filed electronically with the USPTO on Oct. 23, 2015, with Ser. No. 62/245,807, EFS ID 23881058, confirmation number 6409.

This application claims benefit under 35 U.S.C. §119 and incorporates by reference United States Provisional Patent Application for UNINTERRUPTABLE POWER SUPPLY SYSTEM AND METHOD by inventor Victor K. J. Lee, filed electronically with the USPTO on Dec. 31, 2013, with Ser. No. 61/922,311, EFS ID 17788637, confirmation number 8260.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods associated with uninterruptable power supplies (UPS). Specifically, the present invention relates in some preferred embodiments to UPS power supply systems/methods as applied to large computing data centers. Without limitation, the present invention may have application in scenarios where a reduction in switching time between a primary power source (PPS) and a secondary power source (SPS) in a UPS system is desired to minimize the amount of capacitor energy storage required during the time of PPS/SPS switching.

PRIOR ART AND BACKGROUND OF THE INVENTION

Conventional uninterruptable power supplies (UPS) incorporate a primary power source (PPS) and a secondary power source (SPS) to provide switched power to a protected load device (PLD). A series of relays/contactors is typically configured between the output of the PPS and SPS to the PLD (or circuitry supplying power to the PLD) to ensure that either the PPS or the SPS is connected to the PLD. Depending on the voltage provided by and the availability of the PPS and SPS, these relays/contactors are configured to ensure that only one of the PPS/SPS is connected to the PLD. Since the relays/contactors are mechanical devices, there exists a finite transition time to ACTIVATE the relay/contactor and a finite transition time to RELEASE the relay/contactor. This is true irrespective of whether the relay/contactor is normally-OPEN or normally-CLOSED. During these ACTIVATE/RELEASE transition times, neither the PPS nor the SPS provides power to the PLD, and power necessary to support PLD operation is normally supplied by a capacitor bank placed between the relay/contactor outputs and the PLD (or circuitry supplying power to the PLD). This capacitor bank must be sized to ensure that during the ACTIVATE/RELEASE times, sufficient energy is supplied to maintain proper operation of the PLD. Since the ACTIVATE/RELEASE times may be substantial and the load presented by the PLD may be large, the size of this capacitor bank can be very large and present both a size and cost restriction on UPS power supplies using conventional relay/contactors to switch between PPS and SPS supply power.

BRIEF SUMMARY OF THE INVENTION

The present invention presents a dual input power supply architecture supporting a protected load device (PLD) in which the switching time between primary power source (PPS) and secondary power source (SPS) is minimized via the use of a hybrid switching device (HSD) that is activated by an operate/release controller (ORC). The operate/release controller (ORC) monitors the condition of power provided by the PPS and SPS and determines the optimal transfer time to activate the HSD and switch between the PPS and SPS based on the configuration of the PLD. The HSD incorporates a hybrid semiconductor/mechanical switch that reduces OPERATE and RELEASE times to allow a reduction in energy storage capacitance within the overall uninterruptable power supply (UPS) system. Coordination of both the mechanical and electrical operation within the HSD by the ORC ensures that OPERATE and RELEASE times between PPS and SPS transitions are minimized while simultaneously eliminating power spikes within the system. The use of a HSD in conjunction with the ORC permits a wide variety of AC/DC sources, EMI circuitry, bridge rectifier diodes (BRDs), AC-DC converters, and DC-DC converters to be concatenated in series permutations to service the PLD while simultaneously minimizing the storage capacitance normally required to cover the OPERATE and RELEASE times associated with traditional PPS/SPS switchover/failover circuitry.

BRIEF DESCRIPTION OF THE DRAWINGS

For a fuller understanding of the advantages provided by the invention, reference should be made to the following detailed description together with the accompanying drawings wherein:

FIG. 80 illustrates a completion flowchart depicting the operation of a preferred exemplary invention method embodiment wherein the PPS and SPS have isolated grounds.

DESCRIPTION OF THE PRESENTLY PREFERRED EXEMPLARY EMBODIMENTS

Figure 1:
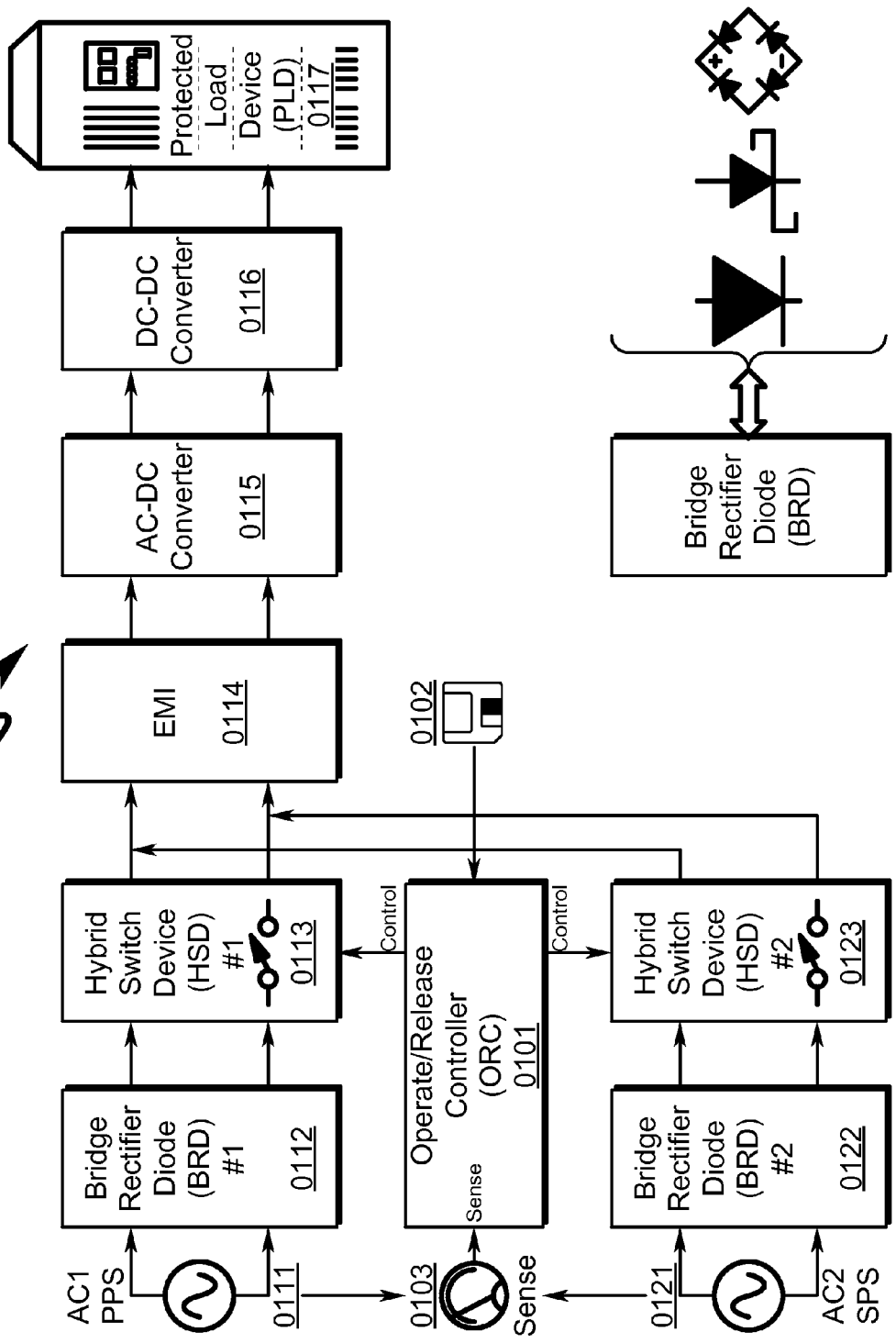
FIG. 1 illustrates a system block diagram depicting a preferred exemplary invention system embodiment incorporating a dual AC input and hybrid switch device (HSD) following a bridge rectifier diode (BRD)

While this invention is susceptible to embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a DUAL INPUT POWER SUPPLY SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Bridge Rectifier Diode Not Limitive

The present invention will be discussed in the context of a variety of rectifier topologies, some of which are preferred depending on application context. These converter topologies will be shown to incorporate bridge rectifier diodes, but the present invention is not limited in scope to the use of these devices and may incorporate any form of electrical rectification, such as (but not limited to) single diodes, Schottky diodes, half-wave rectifiers, full-wave rectifier bridges, etc. Thus, the term "bridge rectifier diode (BRD)" and its equivalents should be given a broad scope of interpretation.

Switch Methodology Not Limitive

The present invention will be discussed in the context of a variety of boost converter topologies, some of which are preferred depending on application context. These converter topologies will be shown to incorporate MOSFET electrical switches, but the present invention is not limited in scope to the use of these devices and may incorporate any form of electrical switch, such as (but not limited to) bipolar transistors, MOSFETs, T-GATEs (complementary MOSFET transistors with common drain and common source connections in which the gates are driven with complementary signals), IGBTs, GTOs, etc.

Control System Not Limitive

The present invention may utilize a wide variety of constructs when implementing the OPERATE/RELEASE CONTROLLER (ORC) described herein. Many preferred invention embodiments may utilize a computerized control mechanism wherein the computer system executes machine instructions read from a tangible, non-transitory, computer-readable medium.

System Overview (0100)-(0800)

Figure 8:
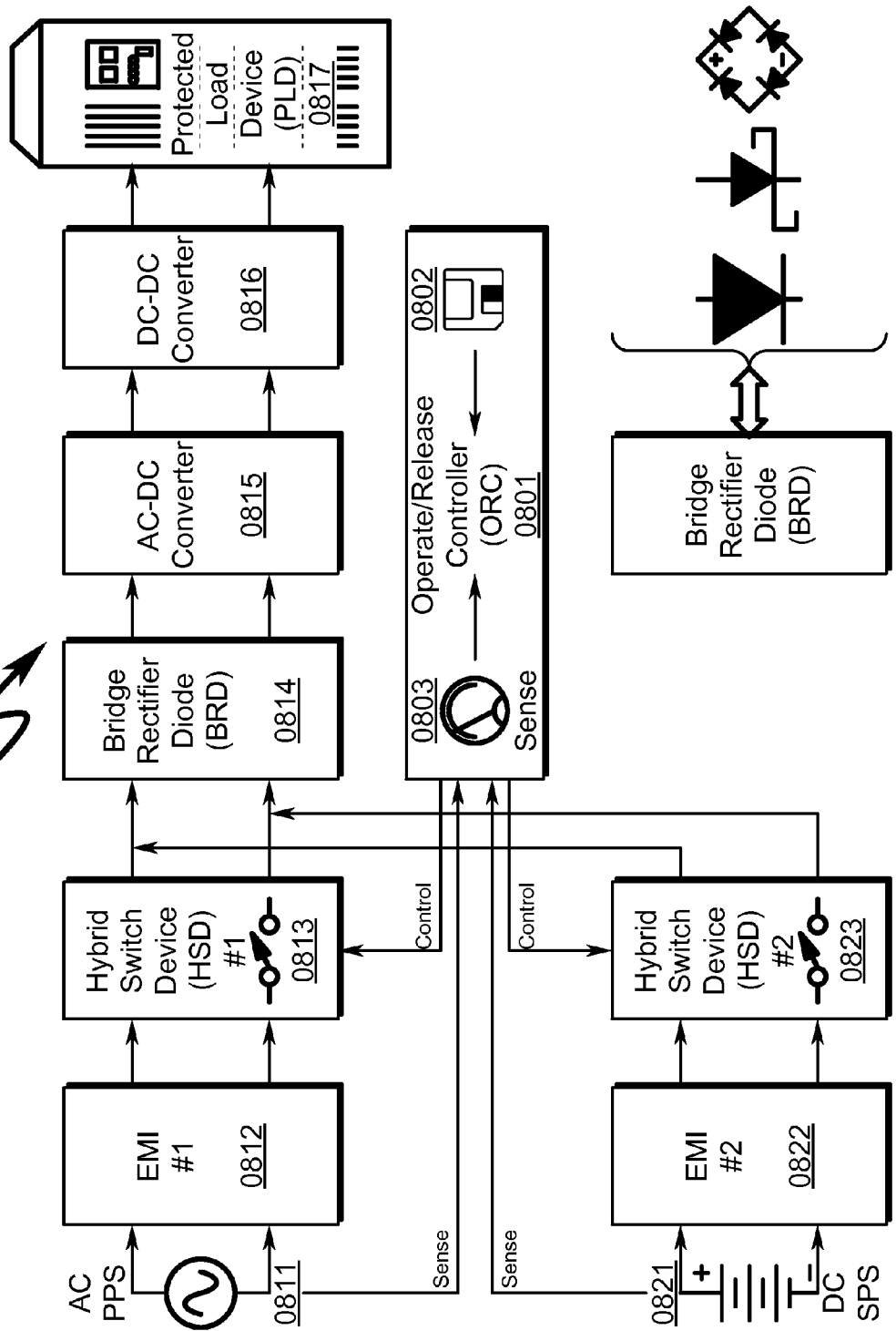
FIG. 8 illustrates a system block diagram depicting a preferred exemplary invention system embodiment incorporating an AC+DC input with EMI filtering and hybrid switch device (HSD) preceding a bridge rectifier diode (BRD)

Several preferred exemplary system embodiments of the present invention are depicted in FIG. 1 (0100)-FIG. 8 (0800).

AC+AC with HSD Following Bridge Rectifier (0100)-(0200)

Figure 2:
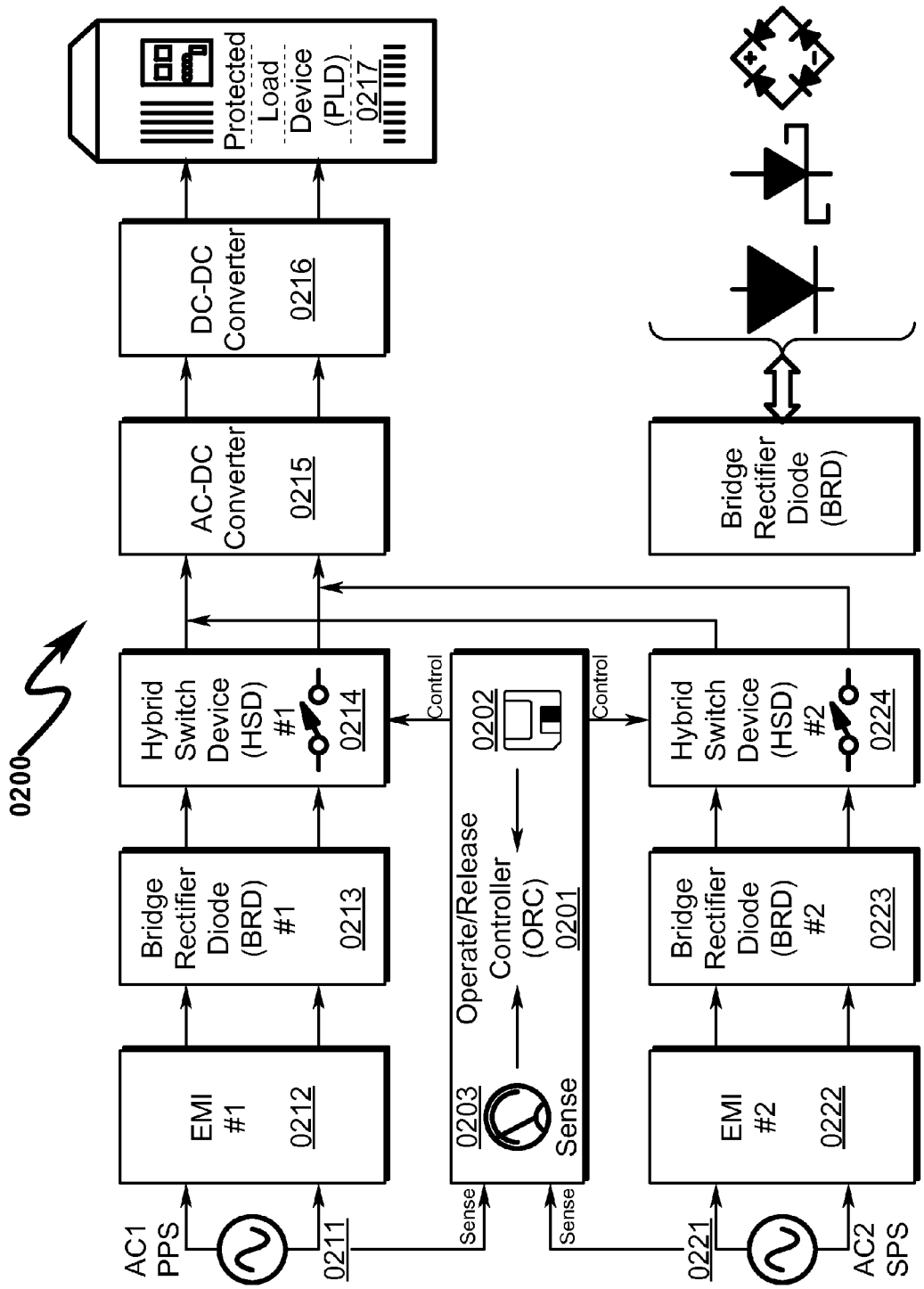
FIG. 2 illustrates a system block diagram depicting a preferred exemplary invention system embodiment incorporating a dual AC input with EMI filtering and hybrid switch device (HSD) following a bridge rectifier diode (BRD)

FIG. 1 (0100)-FIG. 2 (0200) depict exemplary invention system embodiments in which an AC primary power supply (PPS) and AC secondary power supply (SPS) are coupled to a bridge rectifier diode (BRD) and followed by a hybrid switch device (HSD) to support uninterrupted power to a protected load device (PLD). Electrical connections between the various elements are depicted in terms of dual (4-wire) connections between the elements and input/output ports of the elements may typically be described as dual input ports and/or dual output ports.

Referencing FIG. 1 (0100), a depicted exemplary system embodiment utilizes an AC primary power source (AC1/PPS) (0111) and an AC secondary power source (AC2/SPS) (0121) that each feed a corresponding bridge rectifier diode (BRD) (0112, 0122) and hybrid switch device (HSD) (0113, 0123). HSD (0113, 0123) outputs are coupled together and feed a common electromagnetic interference (EMI) filter (0114) that serves to filter input to an AC-DC converter (0115). The AC-DC converter (0115) in this embodiment is capable of accepting AC and/or DC input voltage. The AC-DC converter (0115) output is coupled to a DC-DC converter (0116) that services a protected load device (PLD) (0117). Operation of the HSDs (0113, 0123) is dictated by an operate/release controller (ORC) (0101) that may function under control of machine instructions read from a tangible computer-readable medium (0102). Timing operation of the ORC (0101) with respect to control of the HSDs (0113, 0123) is defined by voltage sense inputs (0103) from the PPS (0111) and SPS (0121).

Referencing FIG. 2 (0200), a depicted exemplary system embodiment utilizes an AC primary power source (AC1/PPS) (0211) and an AC secondary power source (AC2/SPS) (0221) that each feed a corresponding electromagnetic interference (EMI) filter (0212, 0222) and bridge rectifier diode (BRD) (0213, 0223). The bridge rectifier diode (BRD) (0213, 0223) outputs are coupled to individual hybrid switch devices (HSDs) (0214, 0224). HSD (0214, 0224) outputs are coupled together and feed a common AC-DC converter (0215). The AC-DC converter (0215) in this embodiment is capable of accepting AC and/or DC input voltage. The AC-DC converter (0215) output is coupled to a DC-DC converter (0216) that services a protected load device (PLD) (0217). Operation of the HSDs (0214, 0224) is dictated by an operate/release controller (ORC) (0201) that may function under control of machine instructions read from a tangible computer-readable medium (0202). Timing operation of the ORC (0201) with respect to control of the HSDs (0214, 0224) is defined by voltage sense inputs (0203) from the PPS (0211) and SPS (0221).

AC+DC with HSD Following Bridge Rectifier (0300)-(0400)

Figure 3:
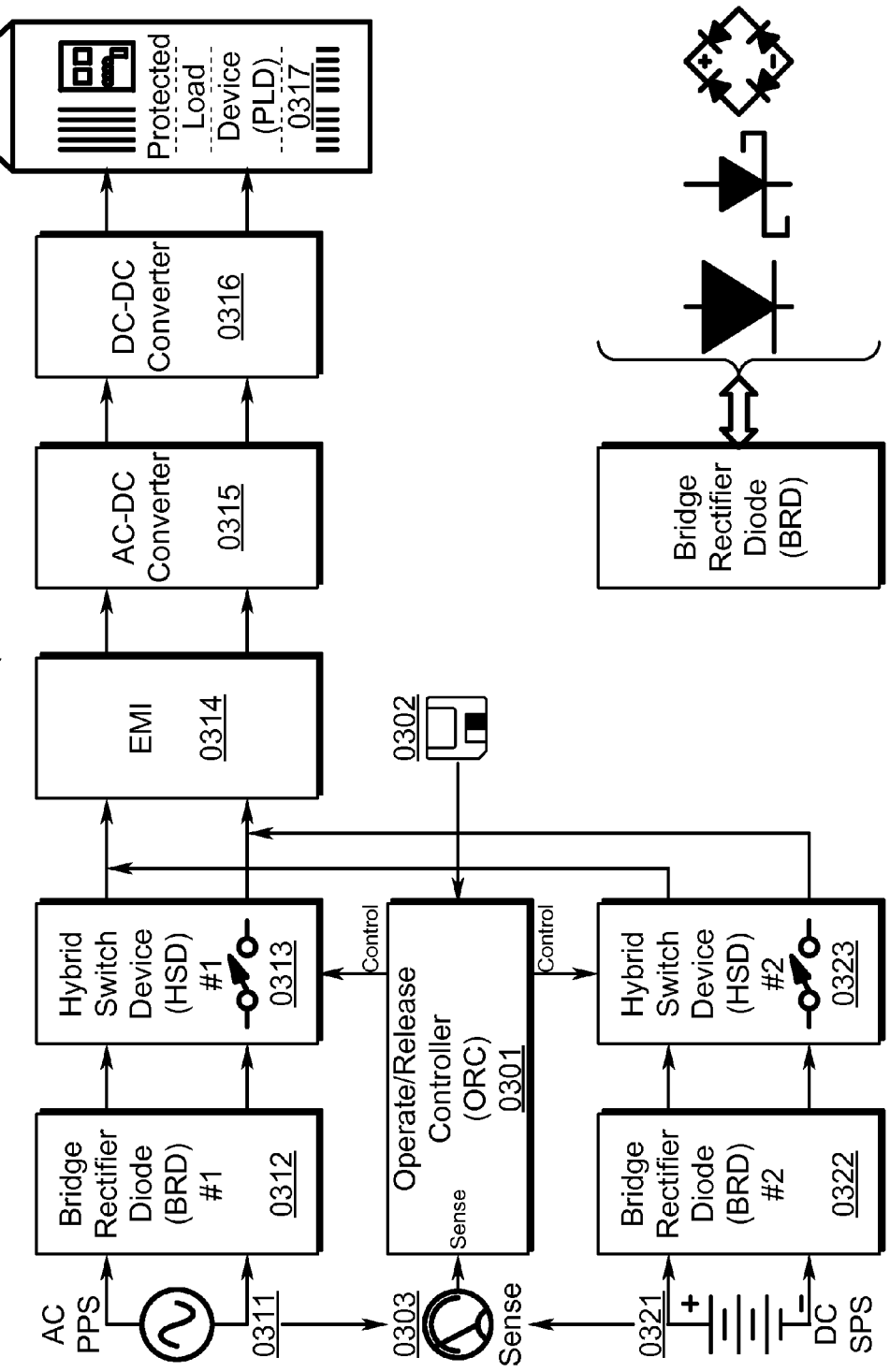
FIG. 3 illustrates a system block diagram depicting a preferred exemplary invention system embodiment incorporating an AC+DC input and hybrid switch device (HSD) following a bridge rectifier diode (BRD)
Figure 4:
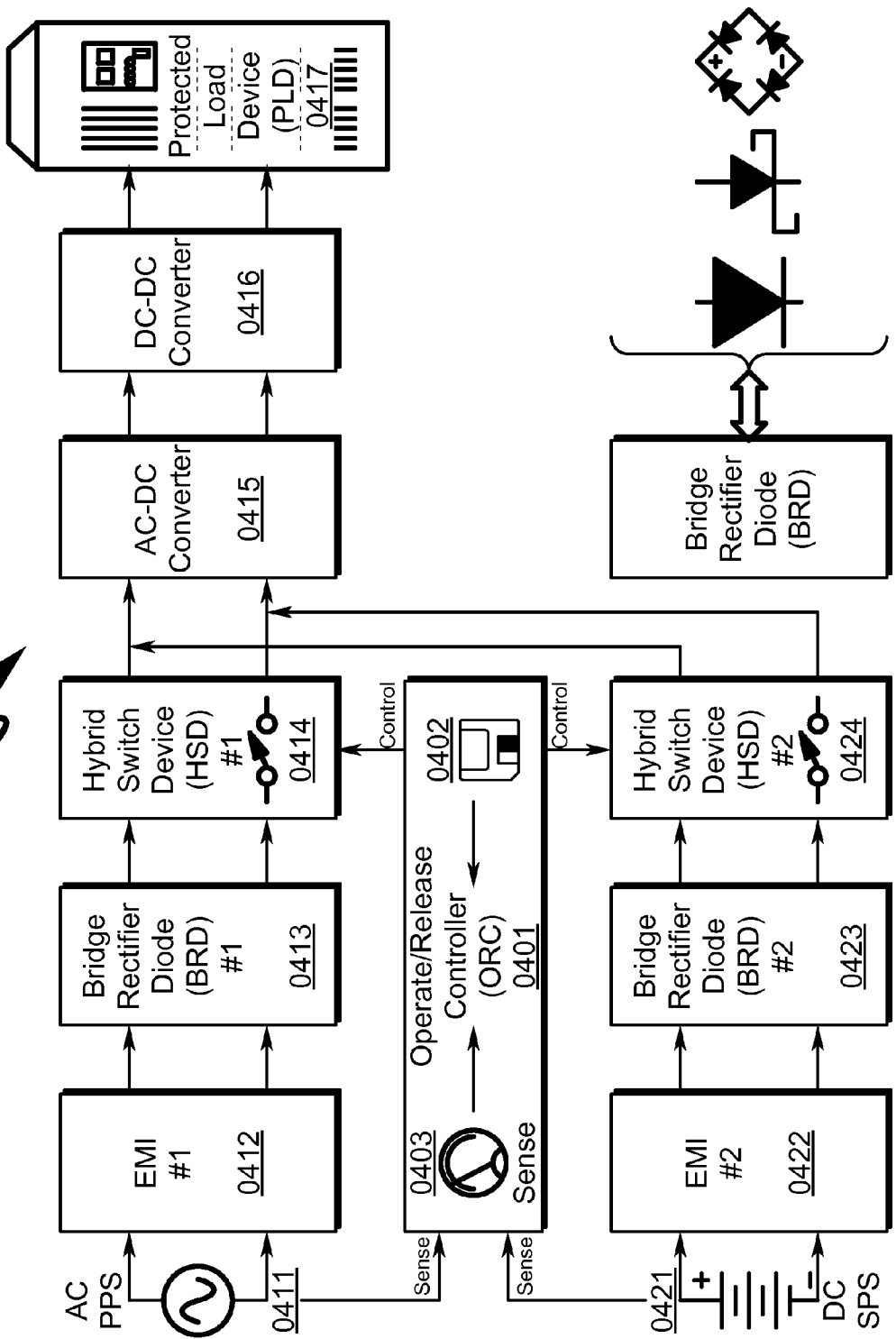
FIG. 4 illustrates a system block diagram depicting a preferred exemplary invention system embodiment incorporating an AC+DC input with EMI filtering and hybrid switch device (HSD) following a bridge rectifier diode (BRD)

FIG. 3 (0300)-FIG. 4 (0400) depict exemplary invention system embodiments in which an AC primary power supply (PPS) and DC secondary power supply (SPS) are coupled to a bridge rectifier diode (BRD) and followed by a hybrid switch device (HSD) to support uninterrupted power to a protected load device (PLD). Electrical connections between the various elements are depicted in terms of dual (4-wire) connections between the elements and input/output ports of the elements may typically be described as dual input ports and/or dual output ports.

Referencing FIG. 3 (0300), a depicted exemplary system embodiment utilizes an AC primary power source (AC/PPS) (0311) and a DC secondary power source (DC/SPS) (0321) that each feed a corresponding bridge rectifier diode (BRD) (0312, 0322) and hybrid switch device (HSD) (0313, 0323). HSD (0313, 0323) outputs are coupled together and feed a common electromagnetic interference (EMI) filter (0314) that serves to filter input to an AC-DC converter (0315). The AC-DC converter (0315) in this embodiment is capable of accepting AC and/or DC input voltage. The AC-DC converter (0315) output is coupled to a DC-DC converter (0316) that services a protected load device (PLD) (0317). Operation of the HSDs (0313, 0323) is dictated by an operate/release controller (ORC) (0301) that may function under control of machine instructions read from a tangible computer-readable medium (0302). Timing operation of the ORC (0301) with respect to control of the HSDs (0313, 0323) is defined by voltage sense inputs (0303) from the PPS (0311) and SPS (0321).

Referencing FIG. 4 (0400), a depicted exemplary system embodiment utilizes an AC primary power source (AC/PPS) (0411) and a DC secondary power source (DC/SPS) (0421) that each feed a corresponding electromagnetic interference (EMI) filter (0412, 0422) and bridge rectifier diode (BRD) (0413, 0423). The bridge rectifier diode (BRD) (0413, 0423) outputs are coupled to individual hybrid switch devices (HSDs) (0414, 0424). HSD (0414, 0424) outputs are coupled together and feed a common AC-DC converter (0415). The AC-DC converter (0415) in this embodiment is capable of accepting AC and/or DC input voltage. The AC-DC converter (0415) output is coupled to a DC-DC converter (0416) that services a protected load device (PLD) (0417). Operation of the HSDs (0414, 0424) is dictated by an operate/release controller (ORC) (0401) that may function under control of machine instructions read from a tangible computer-readable medium (0402). Timing operation of the ORC (0401) with respect to control of the HSDs (0414, 0424) is defined by voltage sense inputs (0403) from the PPS (0411) and SPS (0421).

AC+AC with HSD Preceding Bridge Rectifier (0500)-(0600)

Figure 5:
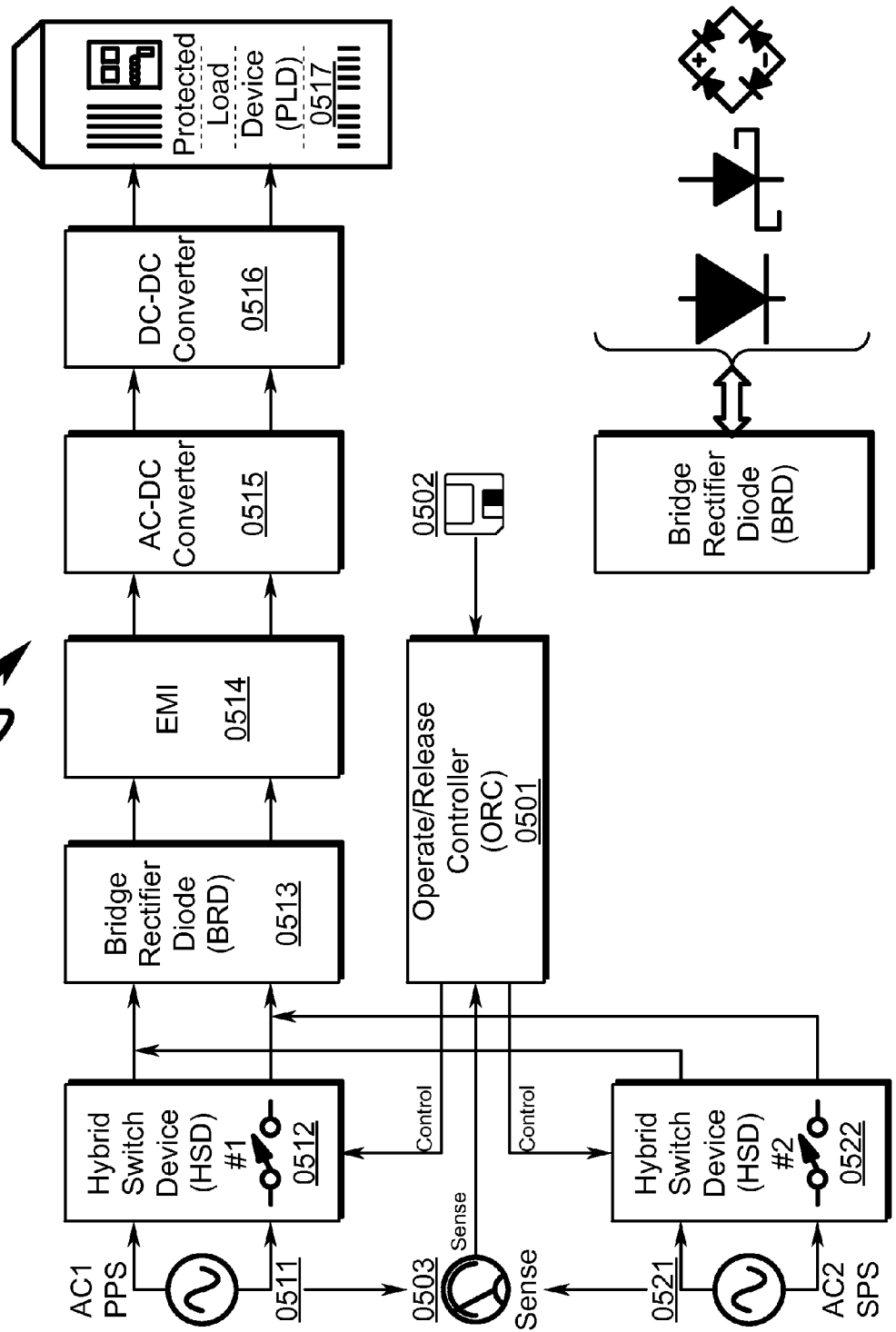
FIG. 5 illustrates a system block diagram depicting a preferred exemplary invention system embodiment incorporating a dual AC input and hybrid switch device (HSD) preceding a bridge rectifier diode (BRD)
Figure 6:
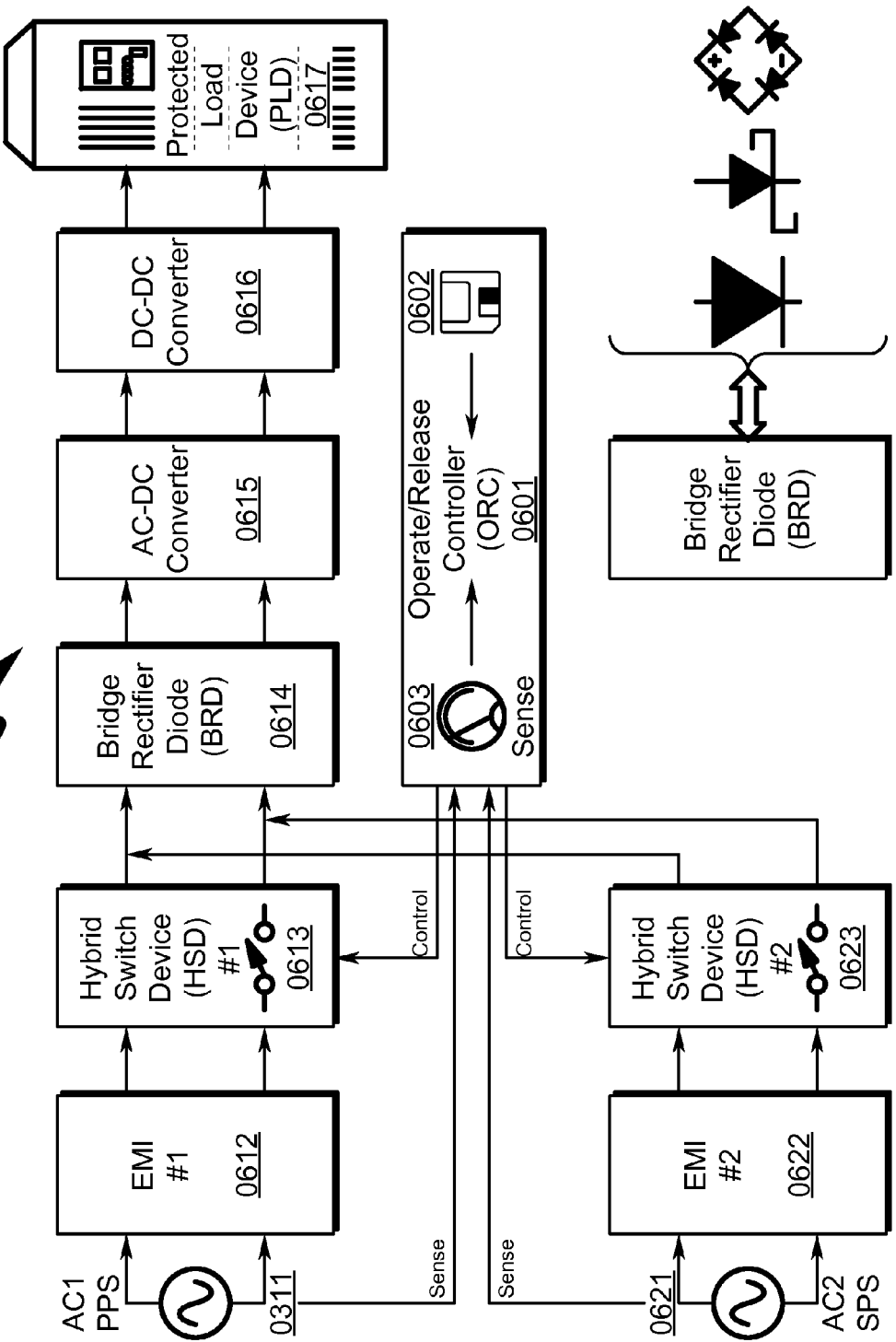
FIG. 6 illustrates a system block diagram depicting a preferred exemplary invention system embodiment incorporating a dual AC input with EMI filtering and hybrid switch device (HSD) preceding a bridge rectifier diode (BRD)

FIG. 5 (0500)-FIG. 6 (0600) depict exemplary invention system embodiments in which an AC primary power supply (PPS) and AC secondary power supply (SPS) are coupled to a hybrid switch device (HSD) and followed by a bridge rectifier diode (BRD) to support uninterrupted power to a protected load device (PLD). Electrical connections between the various elements are depicted in terms of dual (4-wire) connections between the elements and input/output ports of the elements may typically be described as dual input ports and/or dual output ports.

Referencing FIG. 5 (0500), a depicted exemplary system embodiment utilizes an AC primary power source (AC1/PPS) (0511) and an AC secondary power source (AC2/SPS) (0521) that each feed a corresponding hybrid switch device (HSD) (0512, 0522). HSD (0512, 0522) outputs are coupled together and feed a common bridge rectifier diode (BRD) (0513). The BRD (0513) output feeds an electromagnetic interference (EMI) filter (0514) that serves to filter input to an AC-DC converter (0515). The AC-DC converter (0515) in this embodiment is capable of accepting AC and/or DC input voltage. The AC-DC converter (0515) output is coupled to a DC-DC converter (0516) that services a protected load device (PLD) (0517). Operation of the HSDs (0512, 0522) is dictated by an operate/release controller (ORC) (0501) that may function under control of machine instructions read from a tangible computer-readable medium (0502). Timing operation of the ORC (0501) with respect to control of the HSDs (0512, 0522) is defined by voltage sense inputs (0503) from the PPS (0511) and SPS (0521).

Referencing FIG. 6 (0600), a depicted exemplary system embodiment utilizes an AC primary power source (AC1/PPS) (0611) and an AC secondary power source (AC2/SPS) (0621) that each feed a corresponding electromagnetic interference (EMI) filter (0612, 0622) and hybrid switch devices (HSDs) (0613, 0623). The hybrid switch device (HSD) (0613, 0623) outputs are coupled together to a common bridge rectifier diode (BRD) (0614). The BRD (0614) output feeds a common AC-DC converter (0615). The AC-DC converter (0615) in this embodiment is capable of accepting AC and/or DC input voltage. The AC-DC converter (0615) output is coupled to a DC-DC converter (0616) that services a protected load device (PLD) (0617). Operation of the HSDs (0613, 0623) is dictated by an operate/release controller (ORC) (0601) that may function under control of machine instructions read from a tangible computer-readable medium (0602). Timing operation of the ORC (0601) with respect to control of the HSDs (0613, 0623) is defined by voltage sense inputs (0603) from the PPS (0611) and SPS (0621).

AC+DC with HSD Preceding Bridge Rectifier (0700)-(0800)

Figure 7:
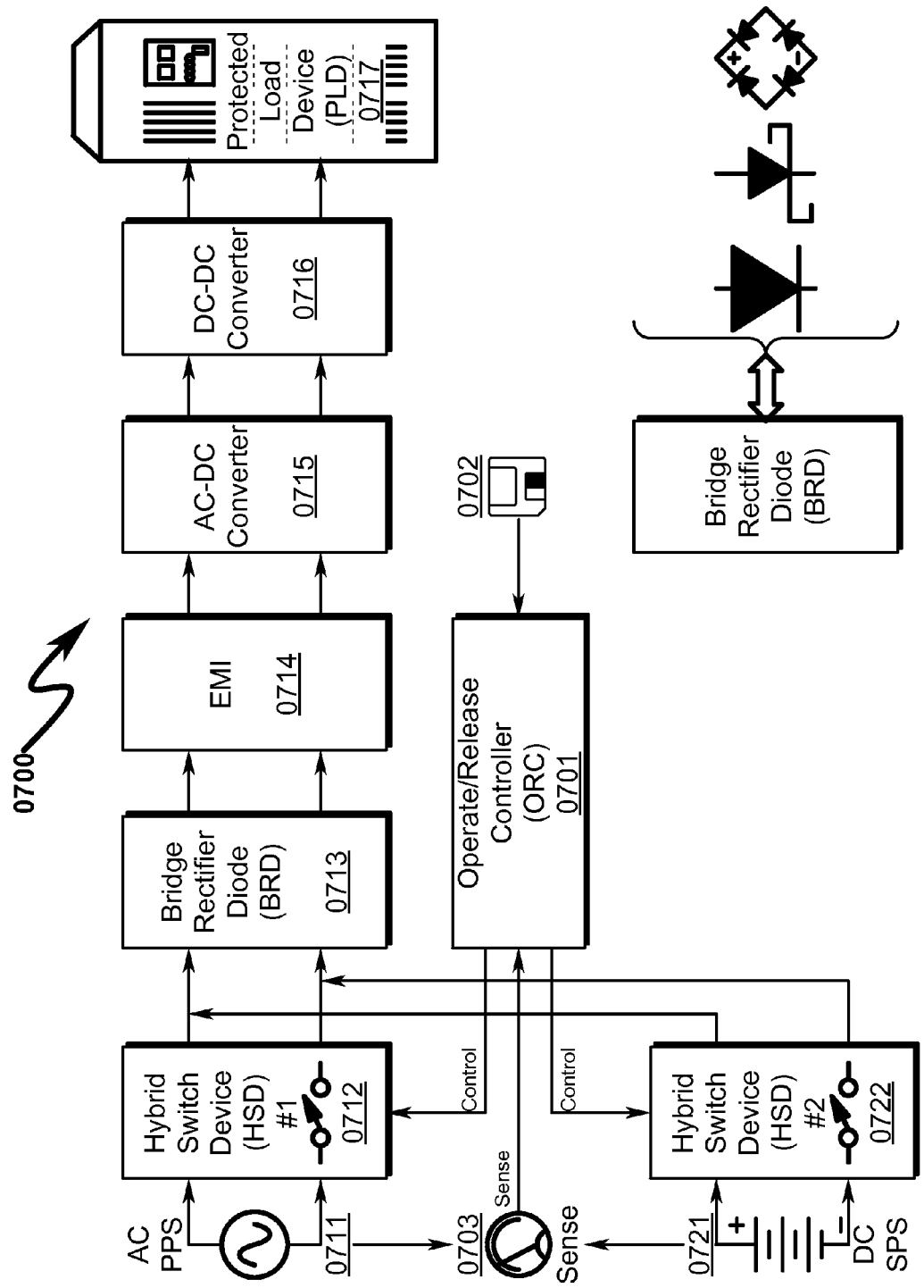
FIG. 7 illustrates a system block diagram depicting a preferred exemplary invention system embodiment incorporating an AC+DC input and hybrid switch device (HSD) preceding a bridge rectifier diode (BRD)

FIG. 7 (0700)-FIG. 8 (0800) depict exemplary invention system embodiments in which an AC primary power supply (PPS) and DC secondary power supply (SPS) are coupled to a hybrid switch device (HSD) and followed by a bridge rectifier diode (BRD) to support uninterrupted power to a protected load device (PLD). Electrical connections between the various elements are depicted in terms of dual (4-wire) connections between the elements and input/output ports of the elements may typically be described as dual input ports and/or dual output ports.

Referencing FIG. 7 (0700), a depicted exemplary system embodiment utilizes an AC primary power source (AC/PPS) (0711) and a DC secondary power source (DC/SPS) (0721) that each feed a corresponding hybrid switch device (HSD) (0712, 0722). HSD (0712, 0722) outputs are coupled together and feed a common bridge rectifier diode (BRD) (0713). The BRD (0713) output feeds an electromagnetic interference (EMI) filter (0714) that serves to filter input to an AC-DC converter (0715). The AC-DC converter (0715) in this embodiment is capable of accepting AC and/or DC input voltage. The AC-DC converter (0715) output is coupled to a DC-DC converter (0716) that services a protected load device (PLD) (0717). Operation of the HSDs (0712, 0722) is dictated by an operate/release controller (ORC) (0701) that may function under control of machine instructions read from a tangible computer-readable medium (0702). Timing operation of the ORC (0701) with respect to control of the HSDs (0712, 0722) is defined by voltage sense inputs (0703) from the PPS (0711) and SPS (0721).

Referencing FIG. 8 (0800), a depicted exemplary system embodiment utilizes an AC primary power source (AC/PPS) (0811) and a DC secondary power source (DC/SPS) (0821) that each feed a corresponding electromagnetic interference (EMI) filter (0812, 0822) and hybrid switch devices (HSDs) (0813, 0823). The hybrid switch device (HSD) (0813, 0823) outputs are coupled together to a common bridge rectifier diode (BRD) (0814). The BRD (0814) output feeds a common AC-DC converter (0815). The AC-DC converter (0815) in this embodiment is capable of accepting AC and/or DC input voltage. The AC-DC converter (0815) output is coupled to a DC-DC converter (0816) that services a protected load device (PLD) (0817). Operation of the HSDs (0813, 0823) is dictated by an operate/release controller (ORC) (0801) that may function under control of machine instructions read from a tangible computer-readable medium (0802). Timing operation of the ORC (0801) with respect to control of the HSDs (0813, 0823) is defined by voltage sense inputs (0803) from the PPS (0811) and SPS (0821).

Prior Art Switch Relay Configurations (0900)-(2000)

Conventional Relay Configuration (1000)

Figure 9:
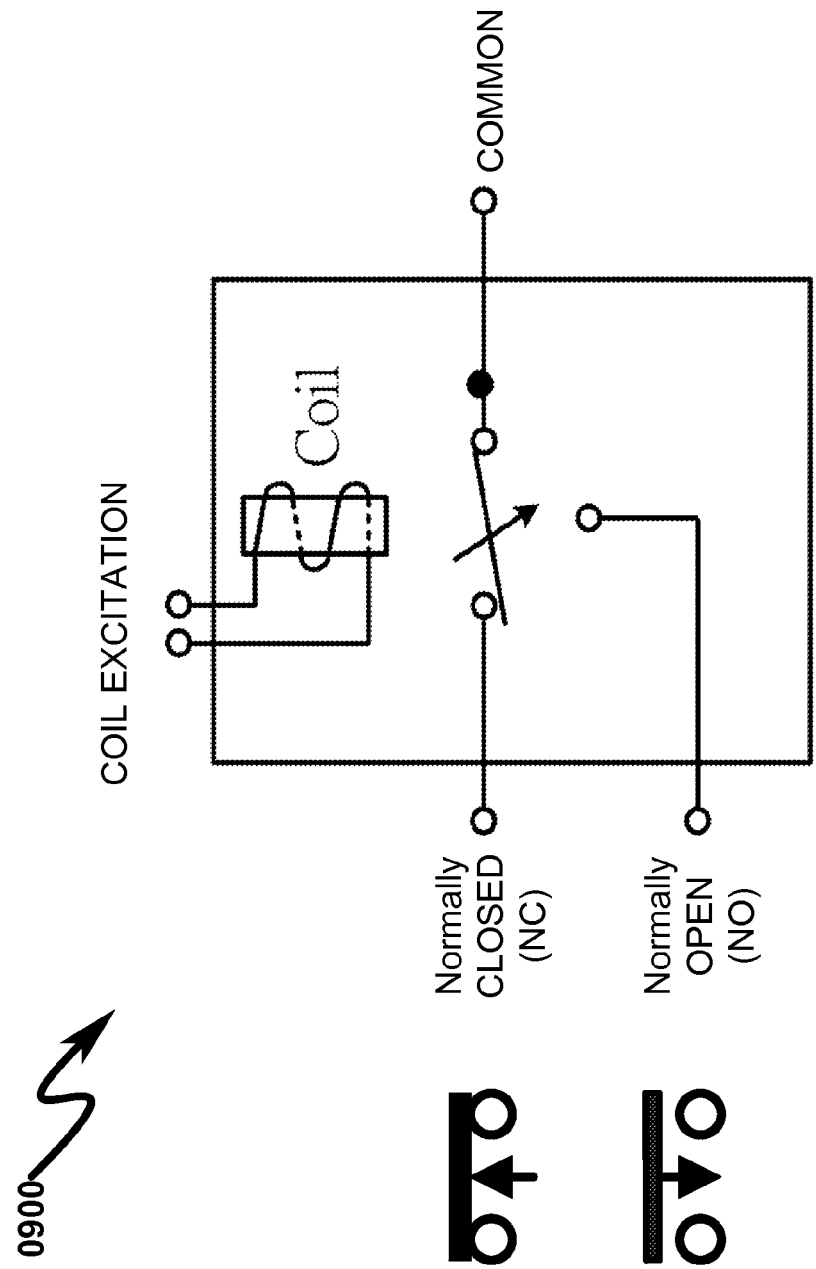
FIG. 9 illustrates a schematic representation of a prior art relay indicating NORMALLY-OPEN and NORMALLY-CLOSED contact configurations.

Typical dual input power supply systems are implemented using relays or contactors as depicted in FIG. 9 (0900). Here it can be seen that depending on the implementation, the relay/contactor may be configured for normally-OPEN or normally-CLOSED operation.

Conventional Relay Timing (1000)

Figure 10:
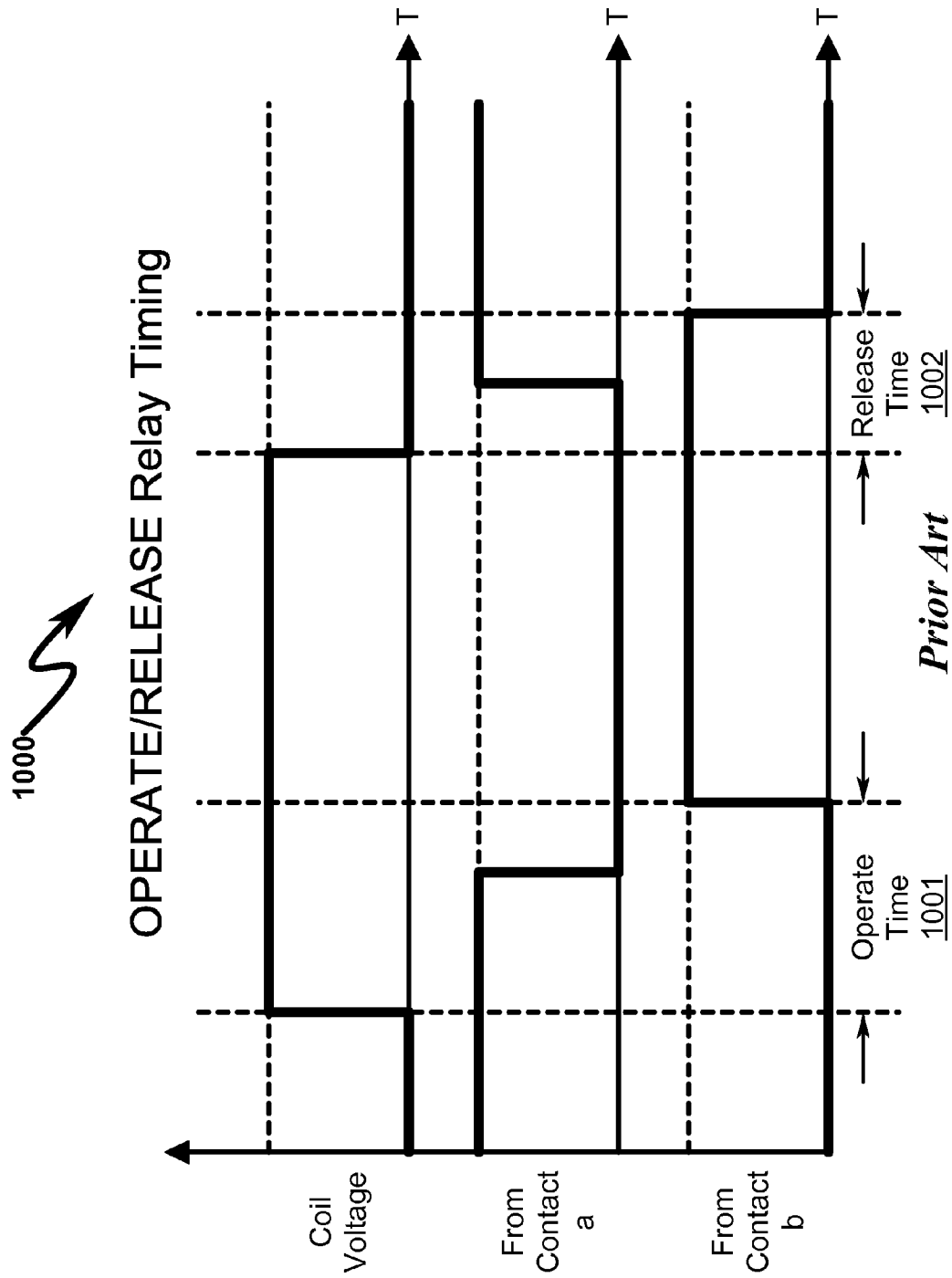
FIG. 10 illustrates a timing diagram of a prior art relay contact transition indicating relay OPERATE and RELEASE times.

As depicted in FIG. 10 (1000), when applied to the relay/contactor, the coil voltage does not produce an instantaneous transition between the OPEN-to-CLOSED or CLOSED-to-OPEN states with respect to the relay/contactor electrical contacts. An OPERATE time (1001) is associated with activating the coil and mechanically moving the contacts to their CLOSED/OPEN position, and a corresponding RELEASE time (1002) is associated with de-energizing the coil and mechanically moving the contacts to their OPEN/CLOSED position. Both of these OPERATE/RELEASE times may have associated contact bounce times in which the contacts are not mated securely due to mechanical vibration associated with the switching action.

Within the context of the present disclosure, the OPERATE time will be defined from the initial application of power to the coil until the closure of the normally open contacts. Similarly, the RELEASE time will be defined from the initial removal of coil power until the re-closure of the normally closed contacts.

Typical Dual-Port Relay Configurations (1100)-(1600)

Figure 11:
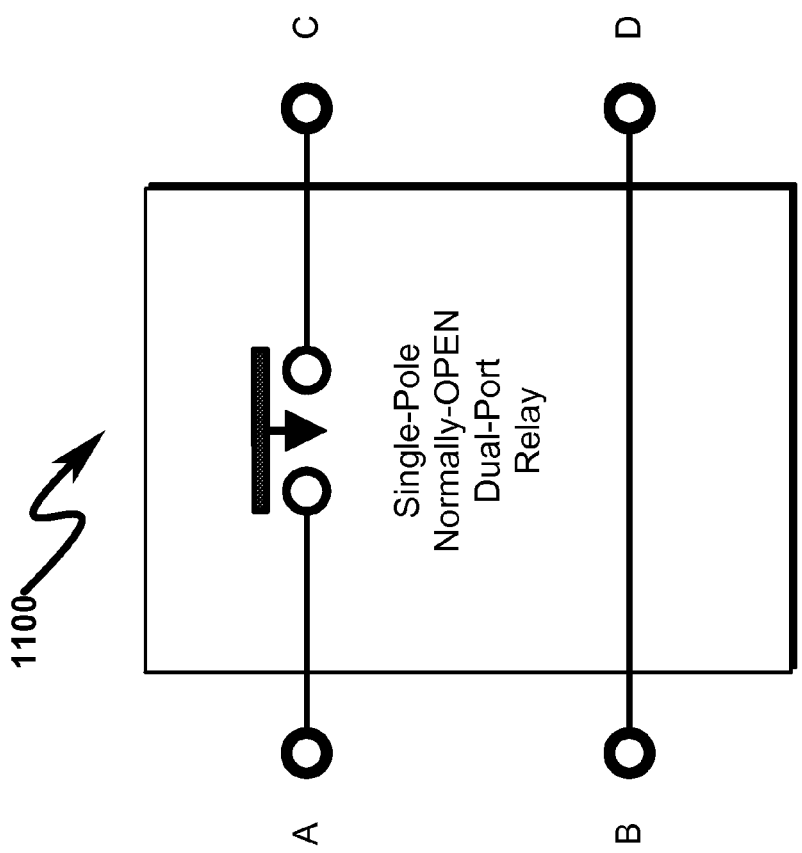
FIG. 11 illustrates a prior art single-pole normally-OPEN dual-port relay configuration.
Figure 12:
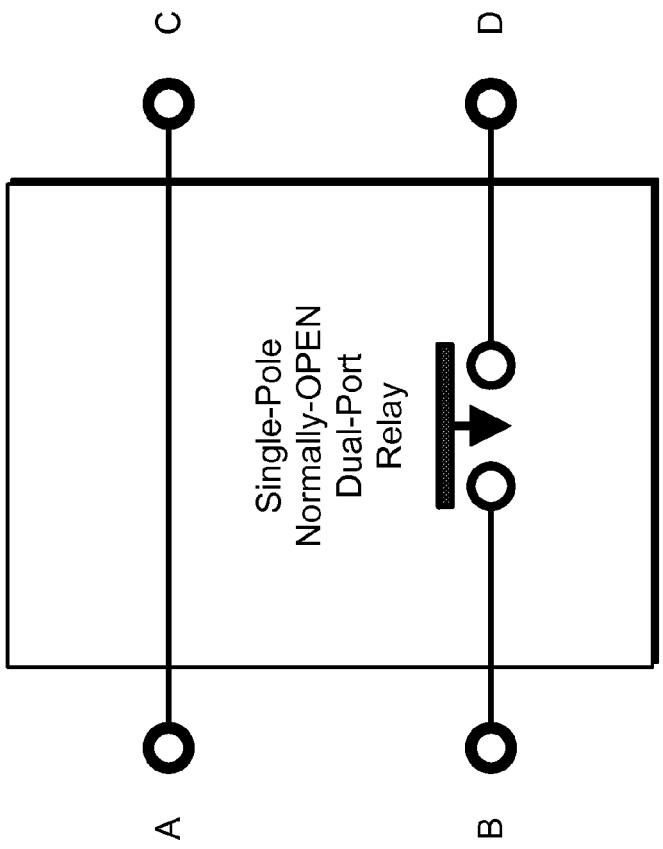
FIG. 12 illustrates a prior art single-pole normally-OPEN dual-port relay configuration.
Figure 13:
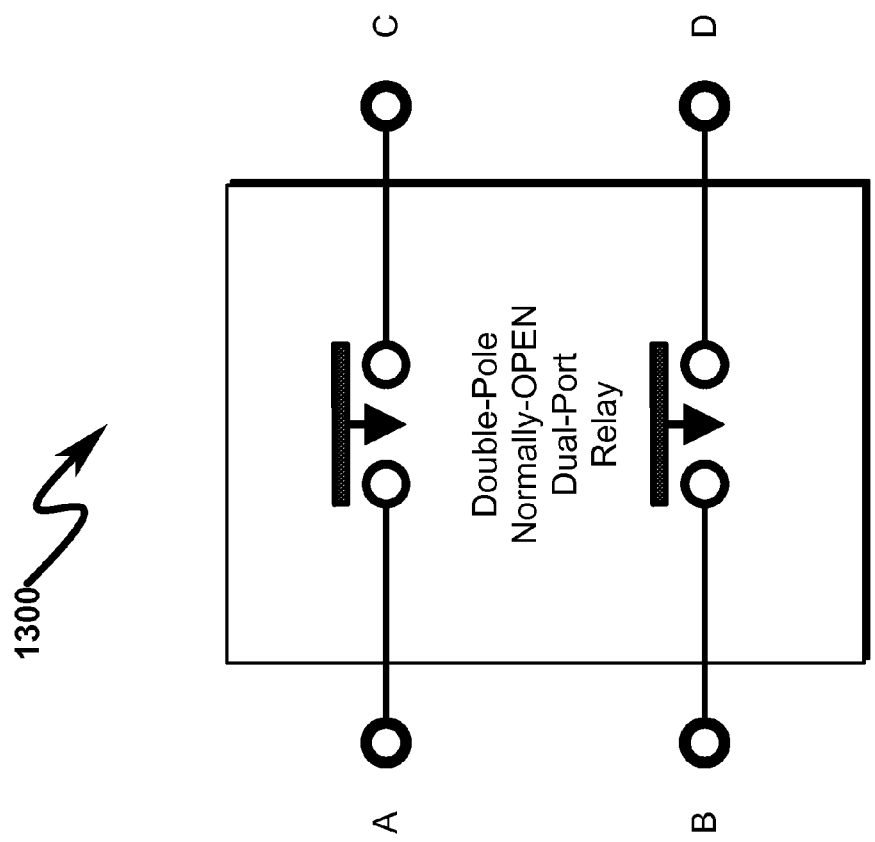
FIG. 13 illustrates a prior art double-pole normally-OPEN dual-port relay configuration.
Figure 14:
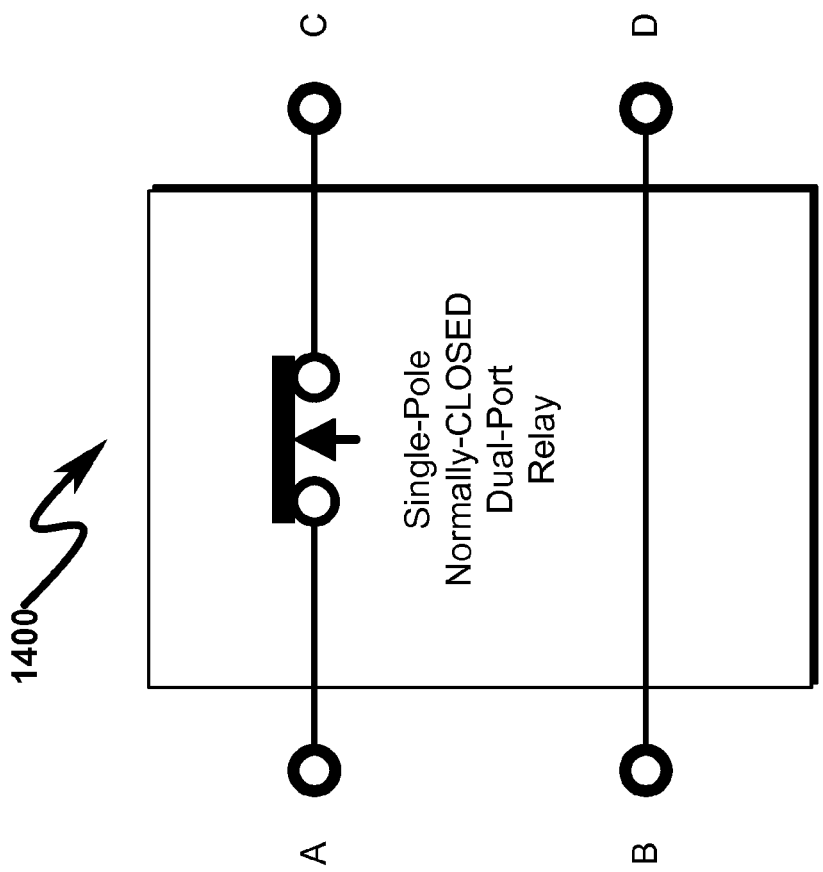
FIG. 14 illustrates a prior art single-pole normally-CLOSED dual-port relay configuration.
Figure 15:
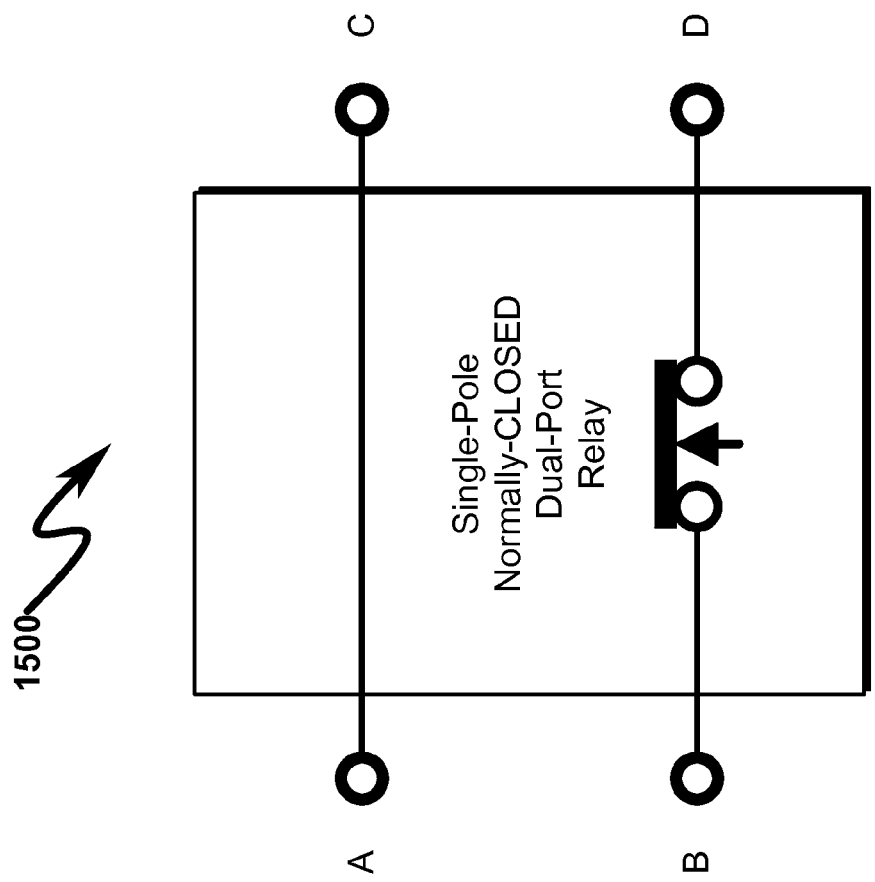
FIG. 15 illustrates a prior art single-pole normally-CLOSED dual-port relay configuration.
Figure 16:
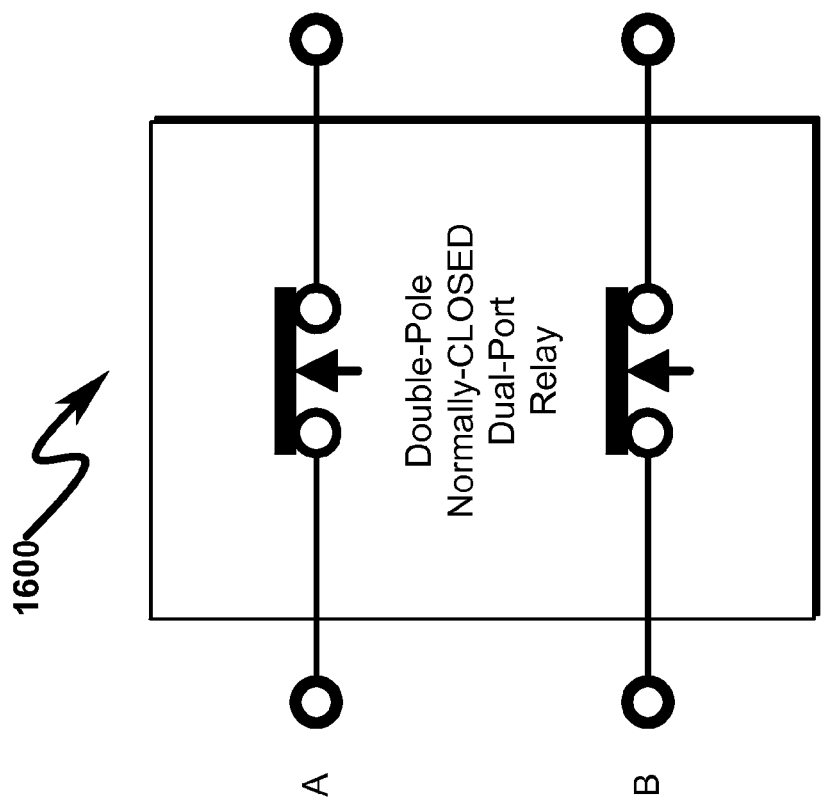
FIG. 16 illustrates a prior art double-pole normally-CLOSED dual-port relay configuration.

Consistent with the previously discussed relay configurations, a variety of dual-port (4-wire) configurations is taught by the prior art, including single-pole normally-open (FIG. 11 (1100)-FIG. 12 (1200)), double-pole normally-open (FIG. 13 (1300)), single-pole normally-closed (FIG. 14 (1400)-FIG. 15 (1500)), and double-pole normally-closed (FIG. 16 (1600)).

Prior Art Normally-Open Contact Dual Input Power Supply (1700)-(1800)

Figure 17:
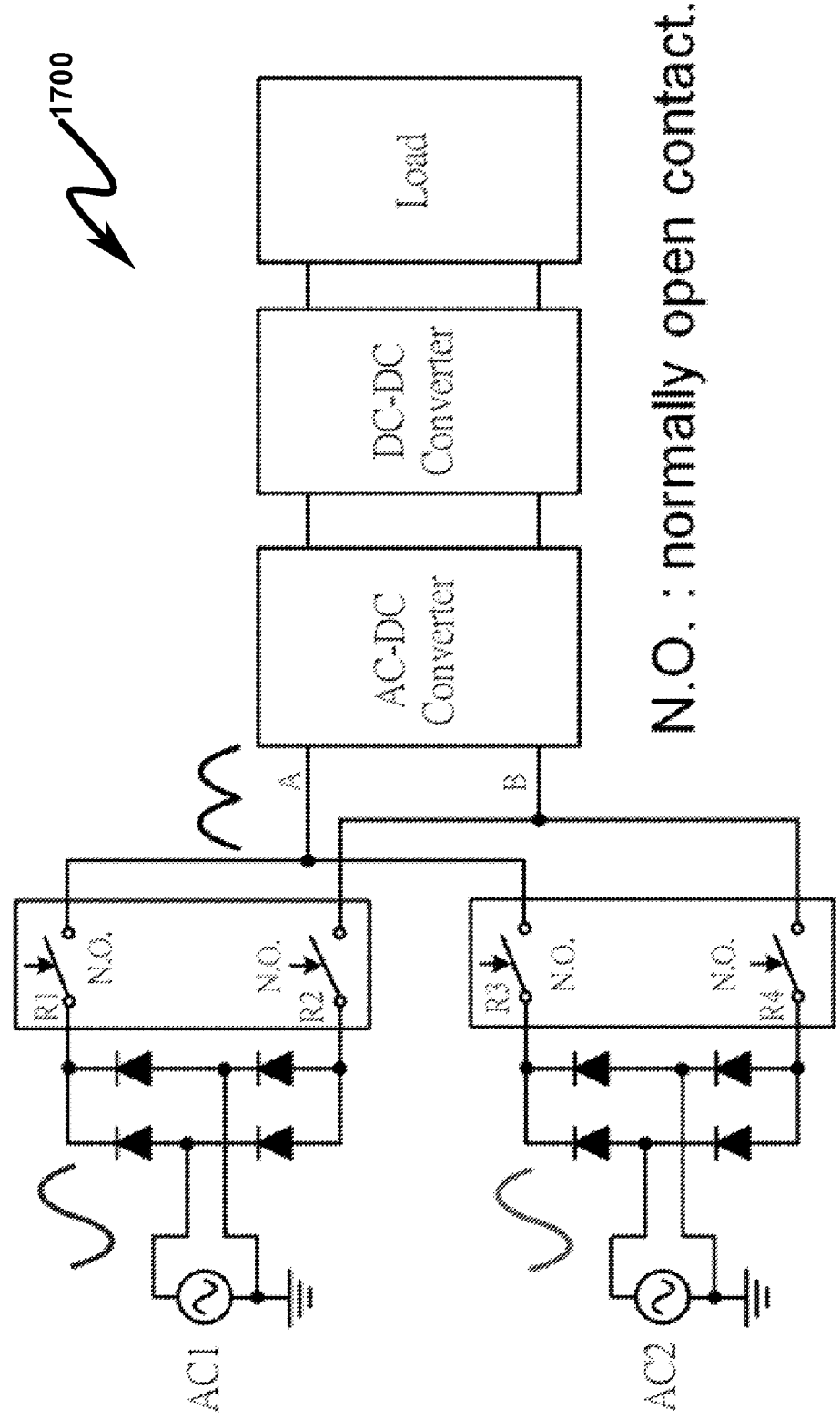
FIG. 17 illustrates a prior art primary/secondary power supply switchover schematic configuration with normally-OPEN PPS contacts and normally-OPEN SPS relay contacts.

An exemplary prior art dual input power supply system using normally-open contact relays is generally depicted in FIG. 17 (1700). A timing diagram associated with this schematic is generally depicted in FIG. 18 (1800).

Figure 18:
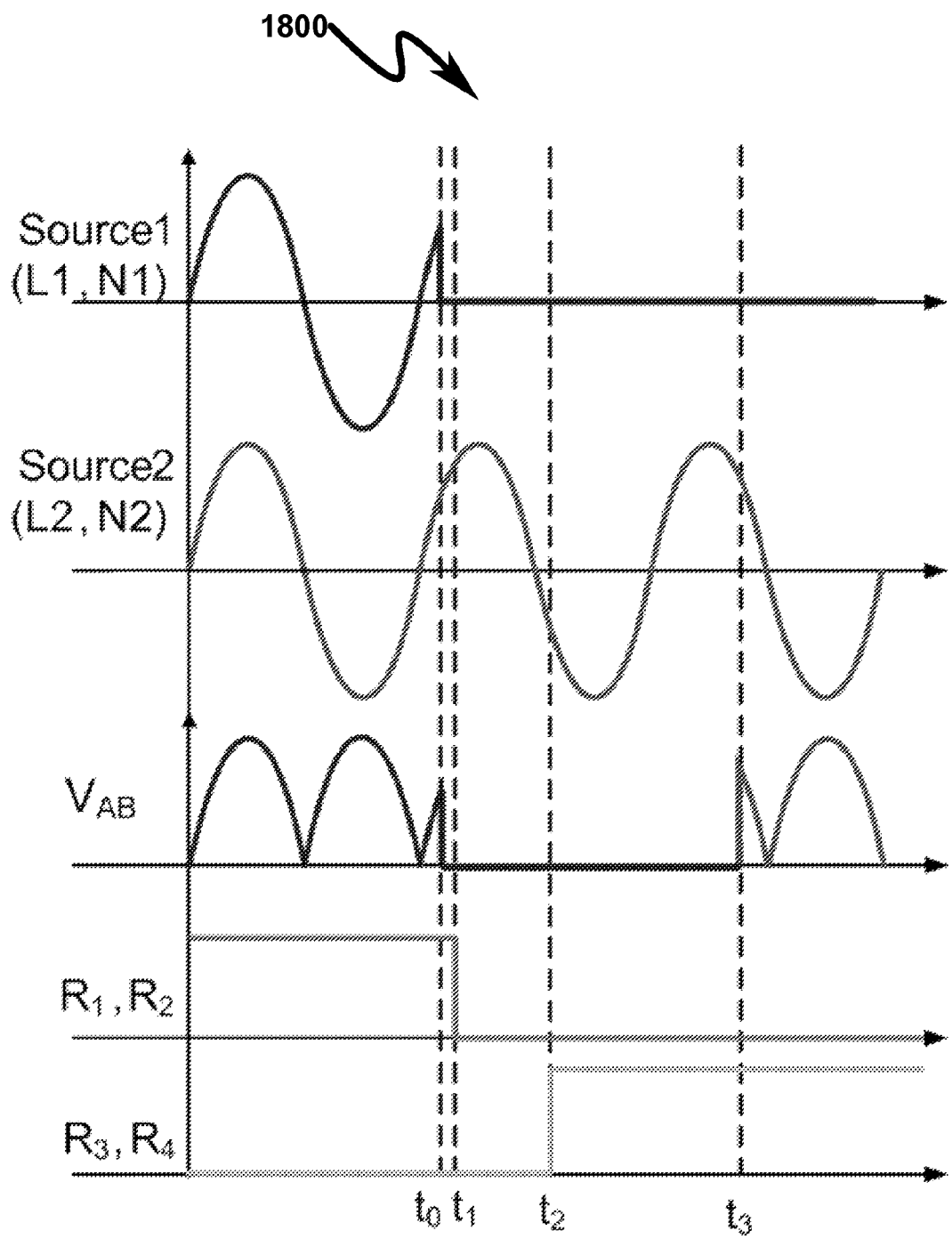
FIG. 18 illustrates a prior art primary/secondary power supply switchover timing diagram with normally-OPEN PPS contacts and normally-OPEN SPS relay contacts.

Referencing FIG. 18 (1800), at time T0 SOURCE1 power fails and relays R1/R2 are deactivated (transitioning from normally-open to normally-closed), but remain engaged until time T1 due to relay RELEASE times. Relays R3/R4 are activated at time T2 (transitioning from normally-open to normally-closed) to supply power from SOURCE2, but due to the relay ACTIVATE time are not fully contacted until time T3. Power is subsequently supplied by SOURCE2 at time T3 when relays R3/R4 finally make contact. During time T0-T3 no power is supplied to the PLD and must be supplied by internal capacitor banks within the power supply system.

Prior Art Normally-Closed Contact Dual Input Power Supply (1900)-(2000)

Figure 19:
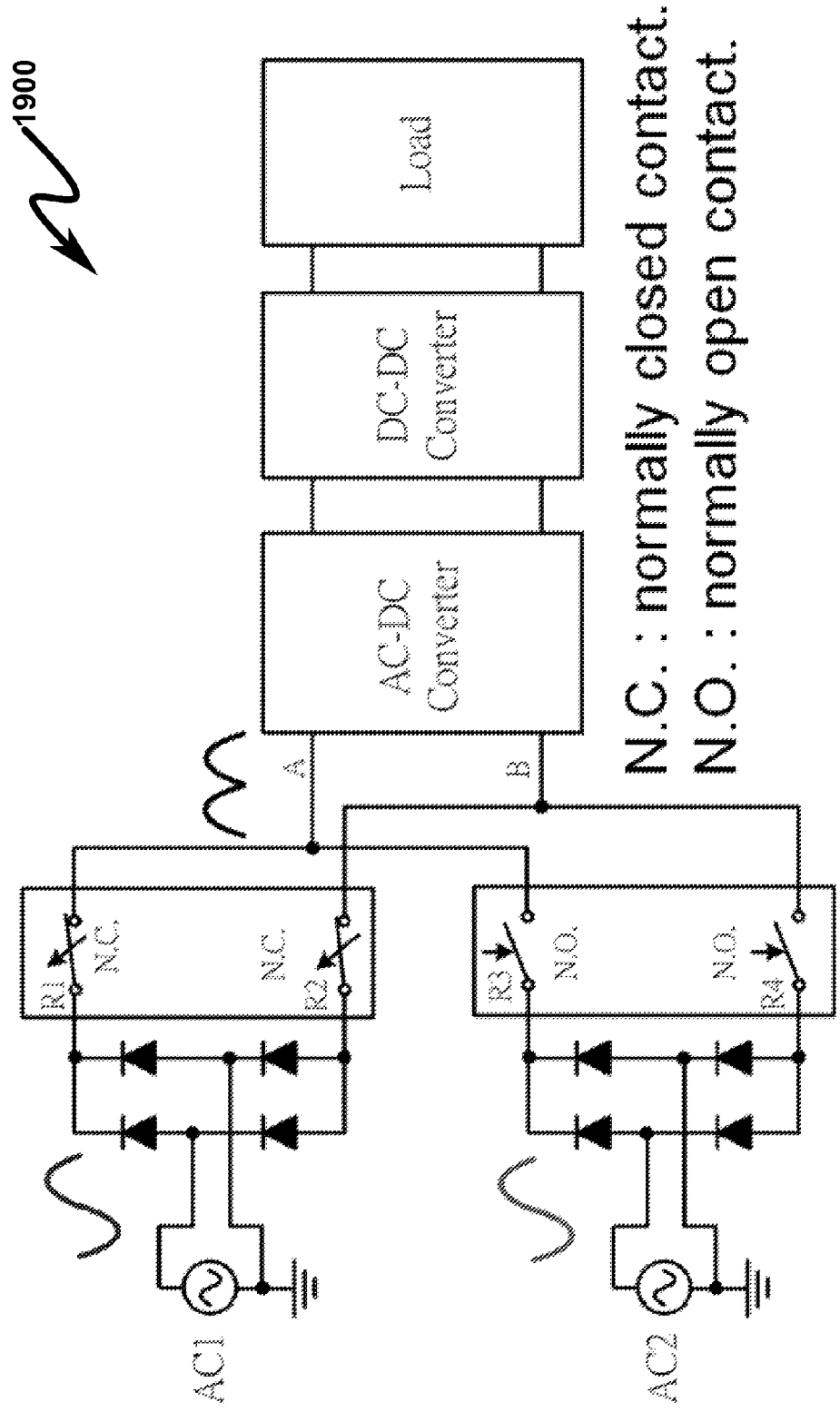
FIG. 19 illustrates a prior art primary/secondary power supply switchover schematic configuration with normally-CLOSED PPS contacts and normally-OPEN SPS relay contacts.

An exemplary prior art dual input power supply system using normally-closed and normally-open contact relays is generally depicted in FIG. 19 (1900). A timing diagram associated with this schematic is generally depicted in FIG. (2000).

Figure 20:
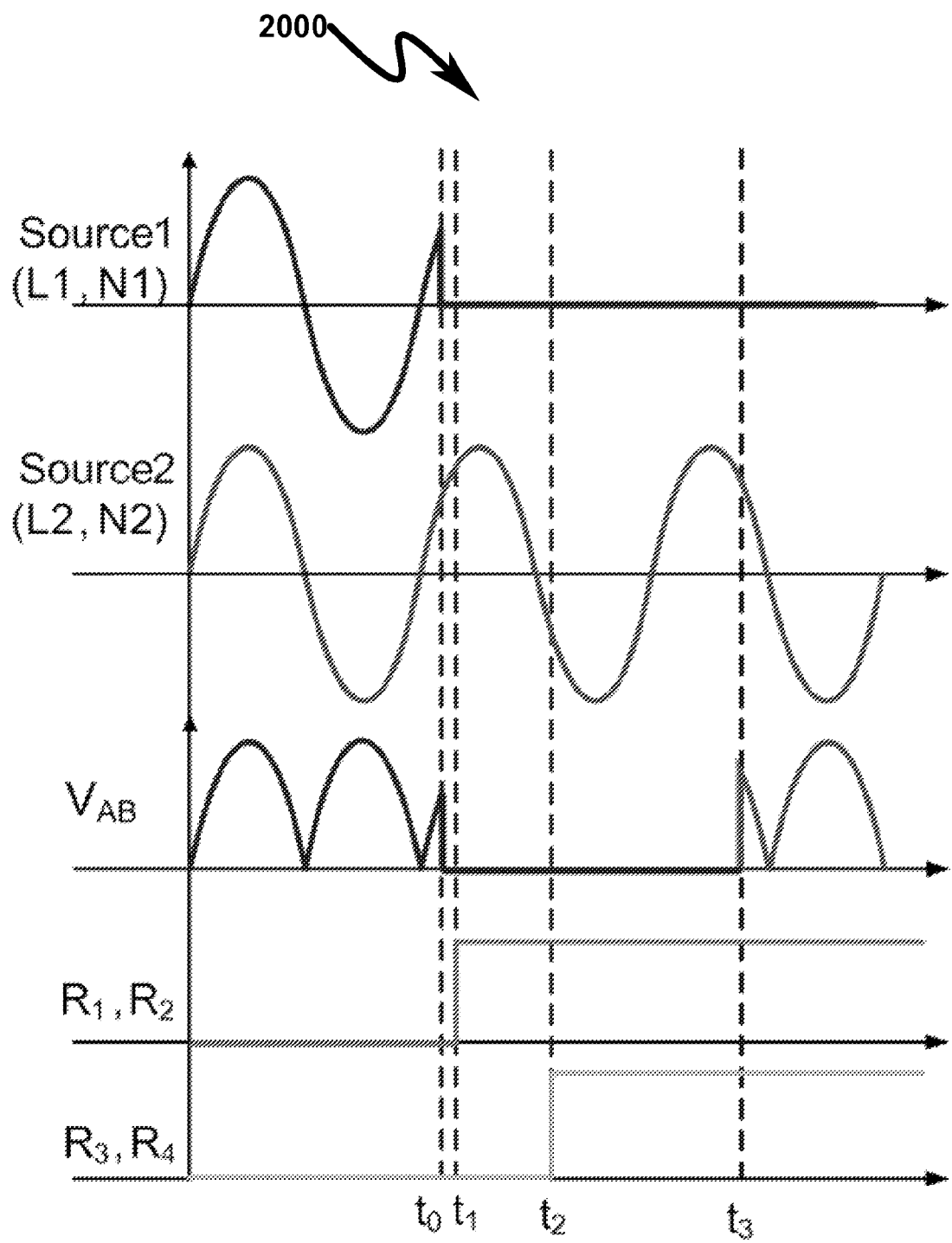
FIG. 20 illustrates a prior art primary/secondary power supply switchover timing diagram with normally-CLOSED PPS contacts and normally-OPEN SPS relay contacts.

Referencing FIG. 20 (2000), at time T0 SOURCE1 power fails and relays R1/R2 are activated (transitioning from normally-closed to normally-open), but remain engaged until time T1 due to relay RELEASE times. Relays R3/R4 are activated at time T2 (transitioning from normally-open to normally-closed) to supply power from SOURCE2, but due to the relay ACTIVATE time are not fully contacted until time T3. Power is subsequently supplied by SOURCE2 at time T3 when relays R3/R4 finally make contact. During time T0-T3 no power is supplied to the PLD and must be supplied by internal capacitor banks within the power supply system.

Hybrid Switch Device (HSD) Configurations (2100)-(3200)

Figure 21:
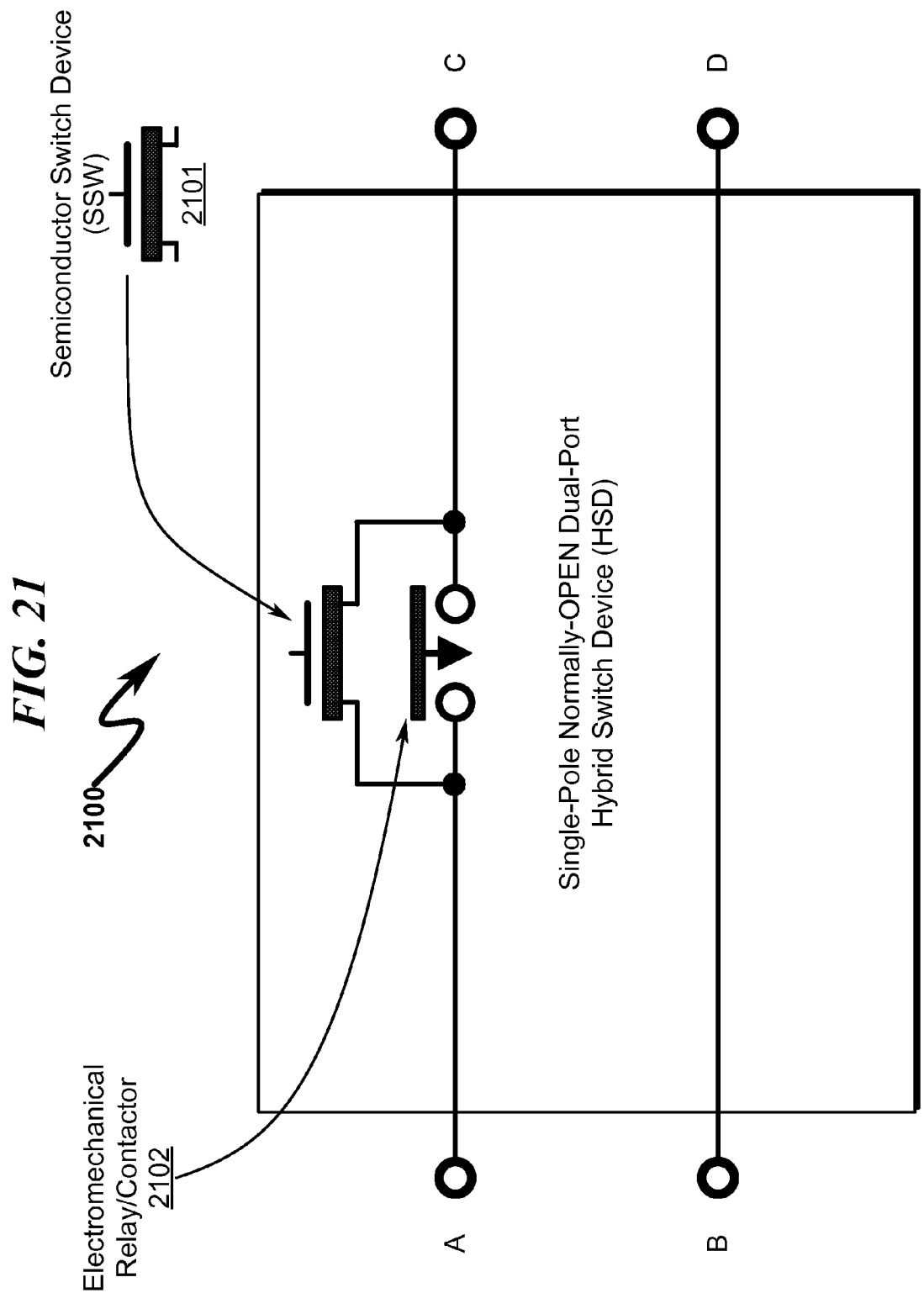
FIG. 21 illustrates a preferred exemplary embodiment of a single-pole normally-OPEN dual-port hybrid switch device (HSD)
Figure 22:
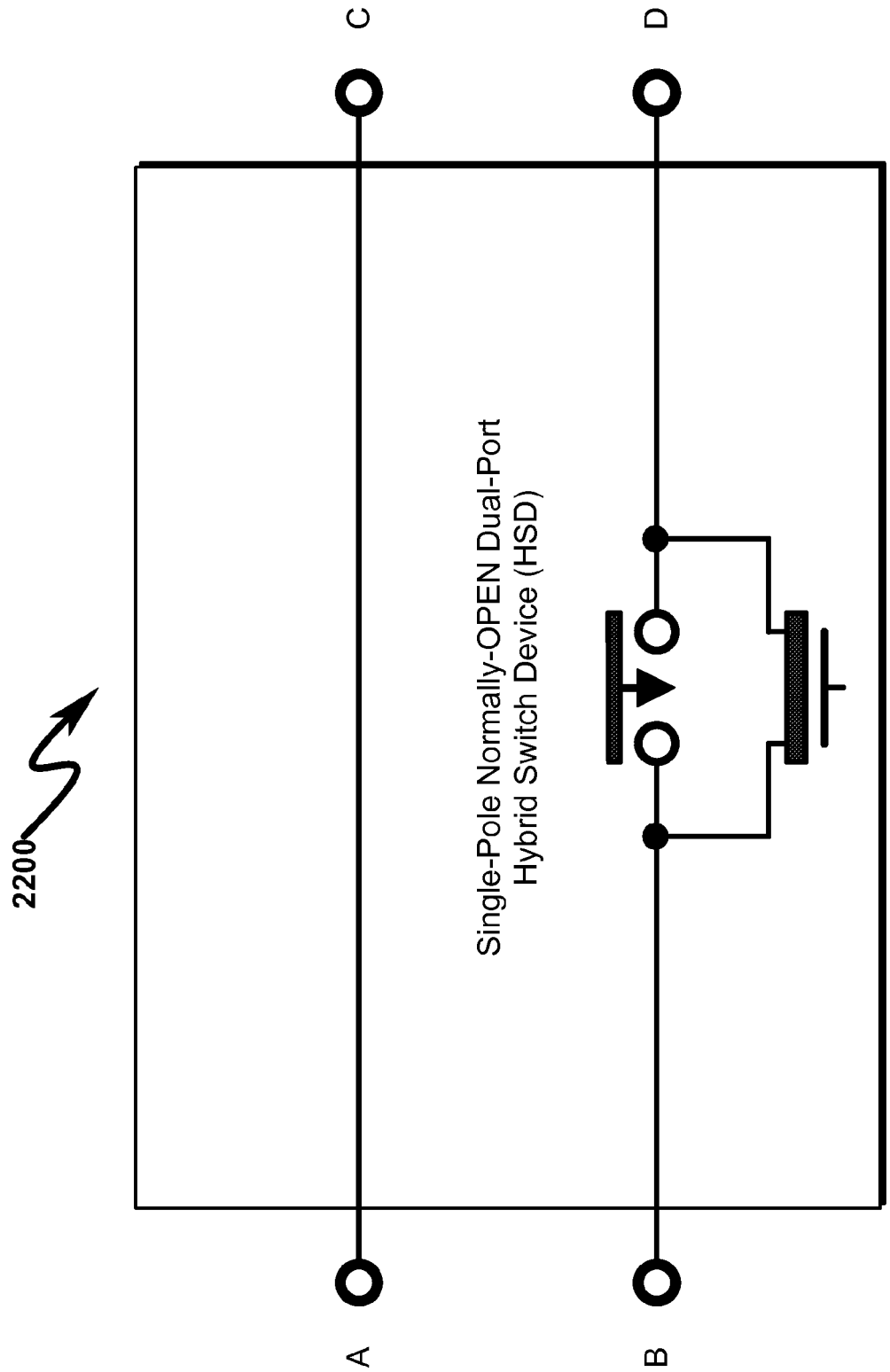
FIG. 22 illustrates a preferred exemplary embodiment of a single-pole normally-OPEN dual-port hybrid switch device (HSD)
Figure 23:
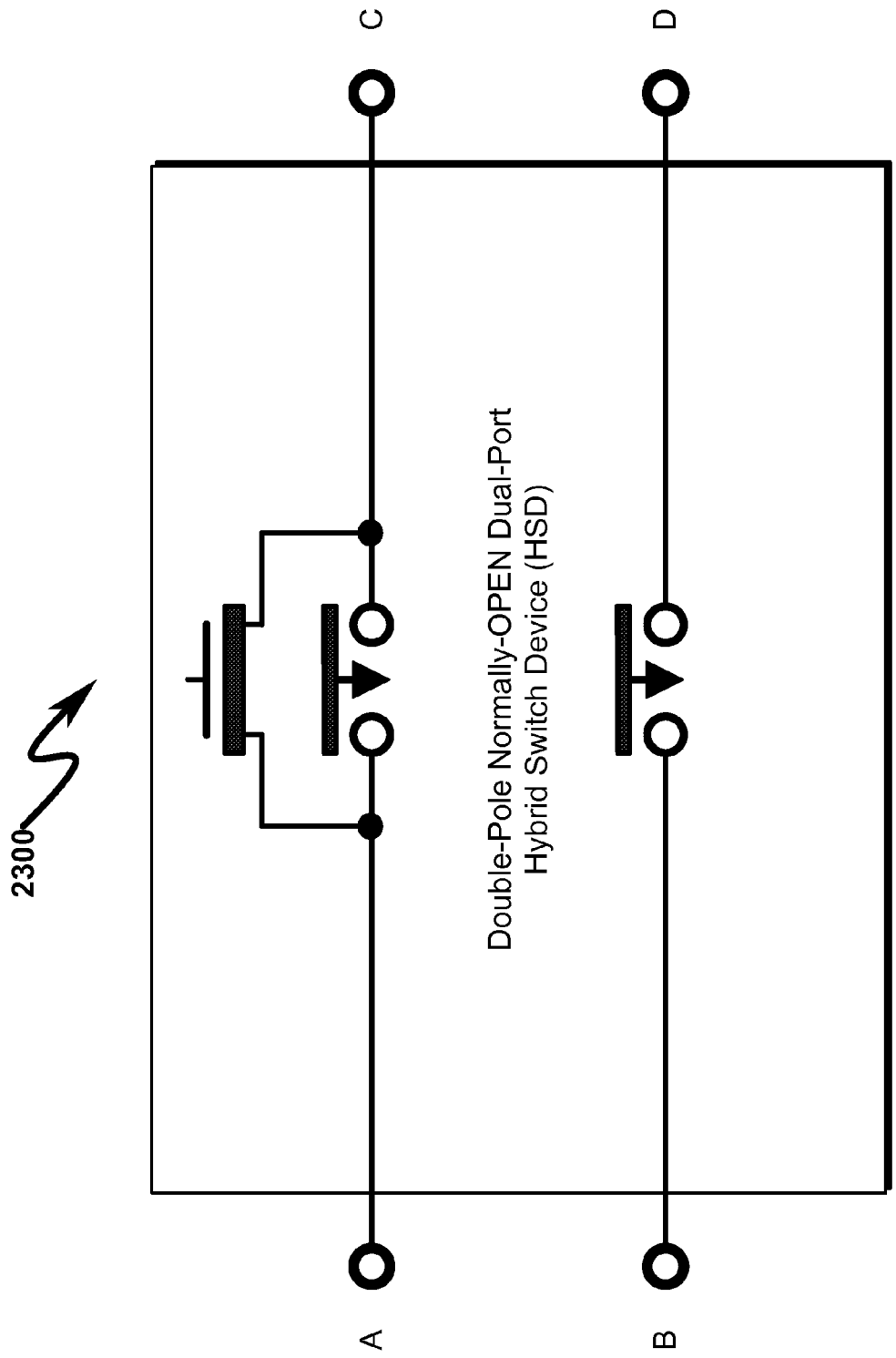
FIG. 23 illustrates a preferred exemplary embodiment of a double-pole normally-OPEN dual-port hybrid switch device (HSD)
Figure 30:
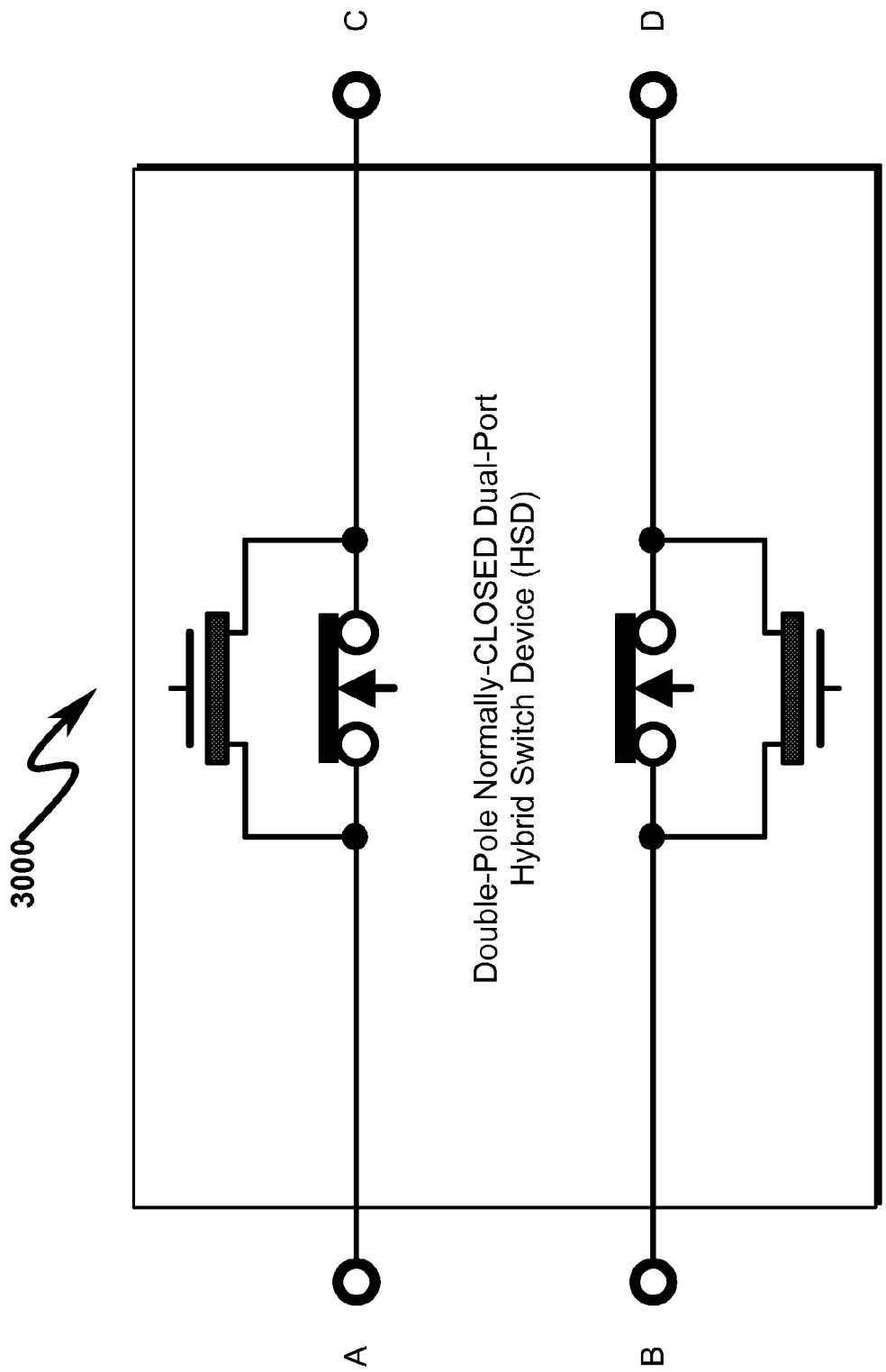
FIG. 30 illustrates a preferred exemplary embodiment of a double-pole normally-CLOSED dual-port hybrid switch device (HSD)
Figure 31:
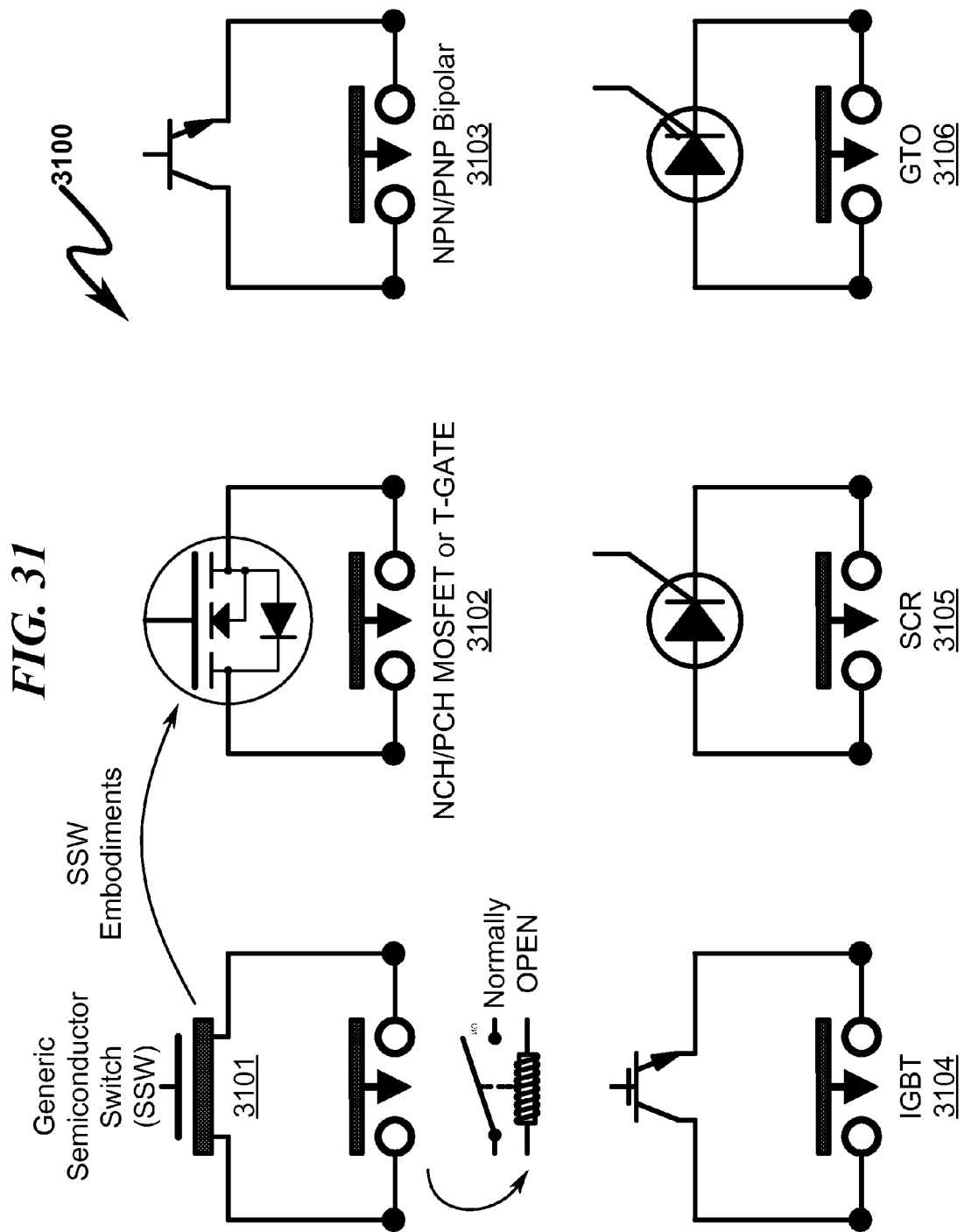
FIG. 31 illustrates several exemplary implementations of the SSW configurations utilized in creating a hybrid switch device (HSD)
Figure 32:
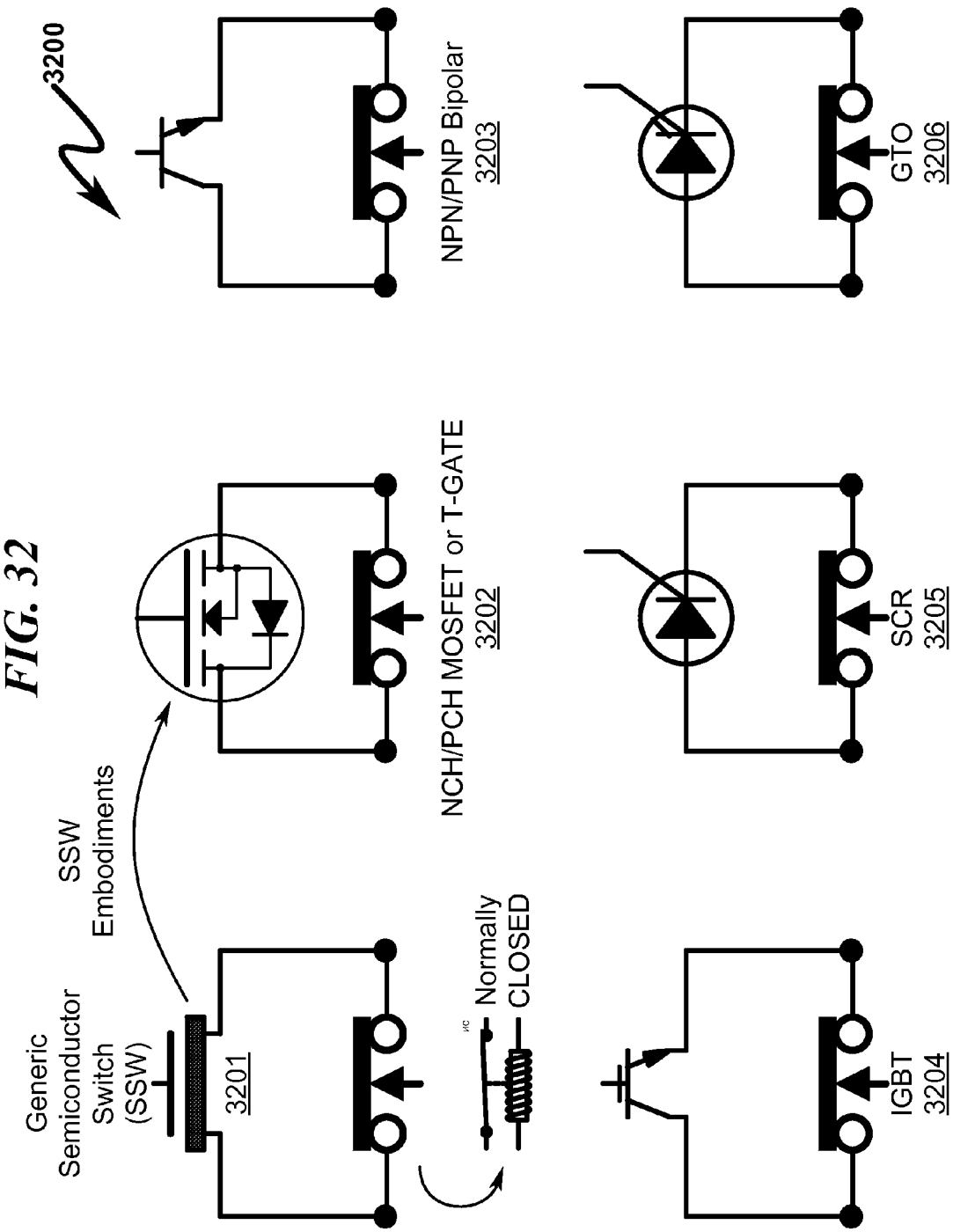
FIG. 32 illustrates several exemplary implementations of the SSW configurations utilized in creating a hybrid switch device (HSD)

The present invention anticipates the use of a hybrid switch device (HSD) as generally depicted in FIG. 21 (2100)-FIG. 30 (3000) as a general replacement for conventional relays used in prior art dual input power supply systems. Since the prior art relay configurations discussed above have applicable OPERATE/RELEASE timings, each of these prior art systems has a significant delay between the transition from the PPS to the SPS and vice-versa. The present invention combines the use of electromechanical relays and/or contactors with a semiconductor switch device (SSW) (2101) that is generically depicted in FIG. 21 (2100)-FIG. (3000) in parallel with the electromagnetic relay (2102). Further details on anticipated implementations of the SSW (2101) are provided in FIG. 31 (3100) which depicts normally-OPEN switch configurations and in FIG. 32 (3200) which depicts normally-CLOSED switch configurations. Within this context, the generic SSW component (3101, 3201) may comprise NCH and/or PCH MOSFETs and/or T-GATEs (3102, 3202), NPN and/or PNP bipolar transistors (3103, 3203), insulated gate bipolar transistors (IGBTs, NPN and PNP variants) (3104, 3204), SCRs (3105, 3205), gate turn-off thyristors (GTOs) (3106, 3206), and combinations of these devices in parallel with the electromagnetic relay.

Figure 24:
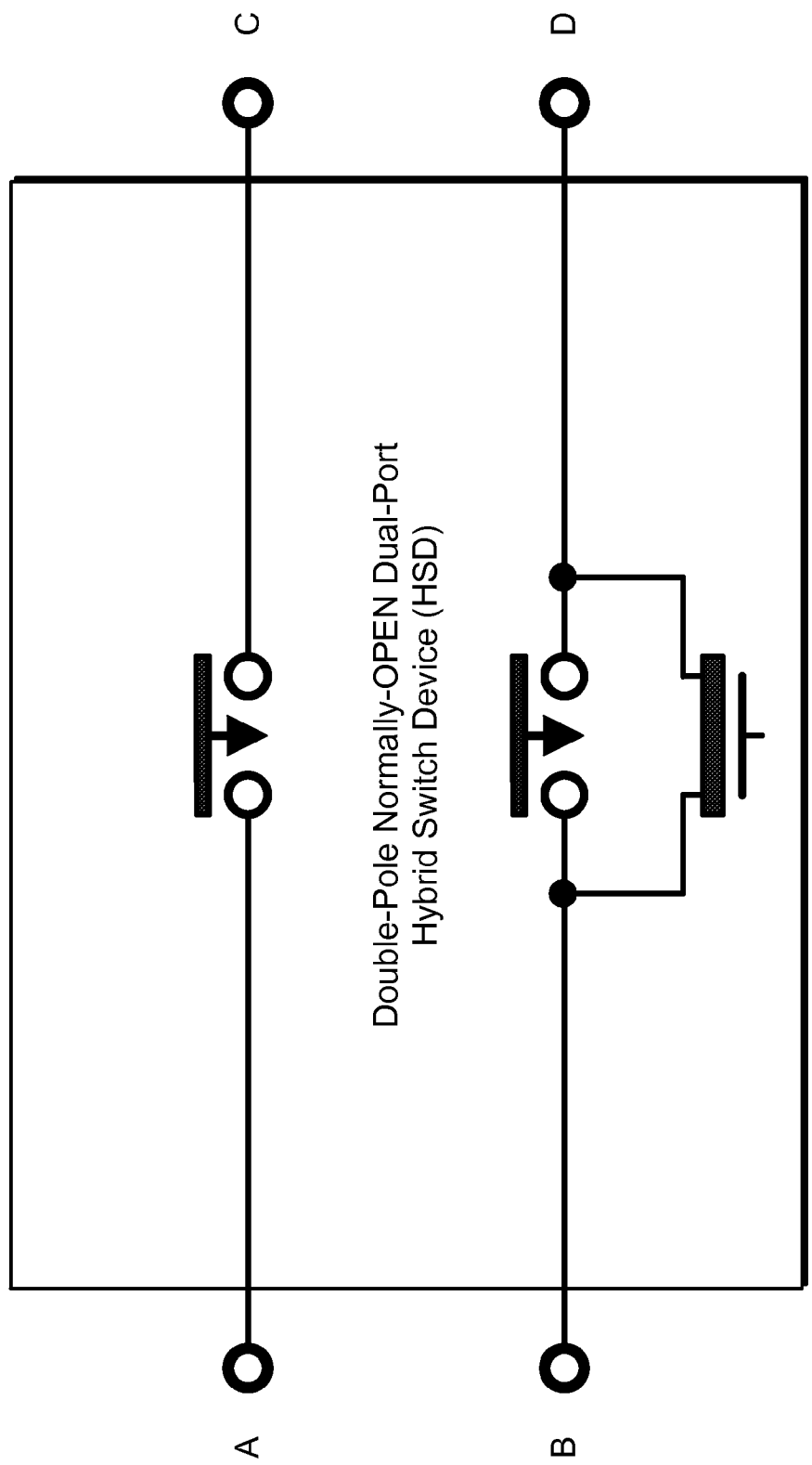
FIG. 24 illustrates a preferred exemplary embodiment of a double-pole normally-OPEN dual-port hybrid switch device (HSD)
Figure 25:
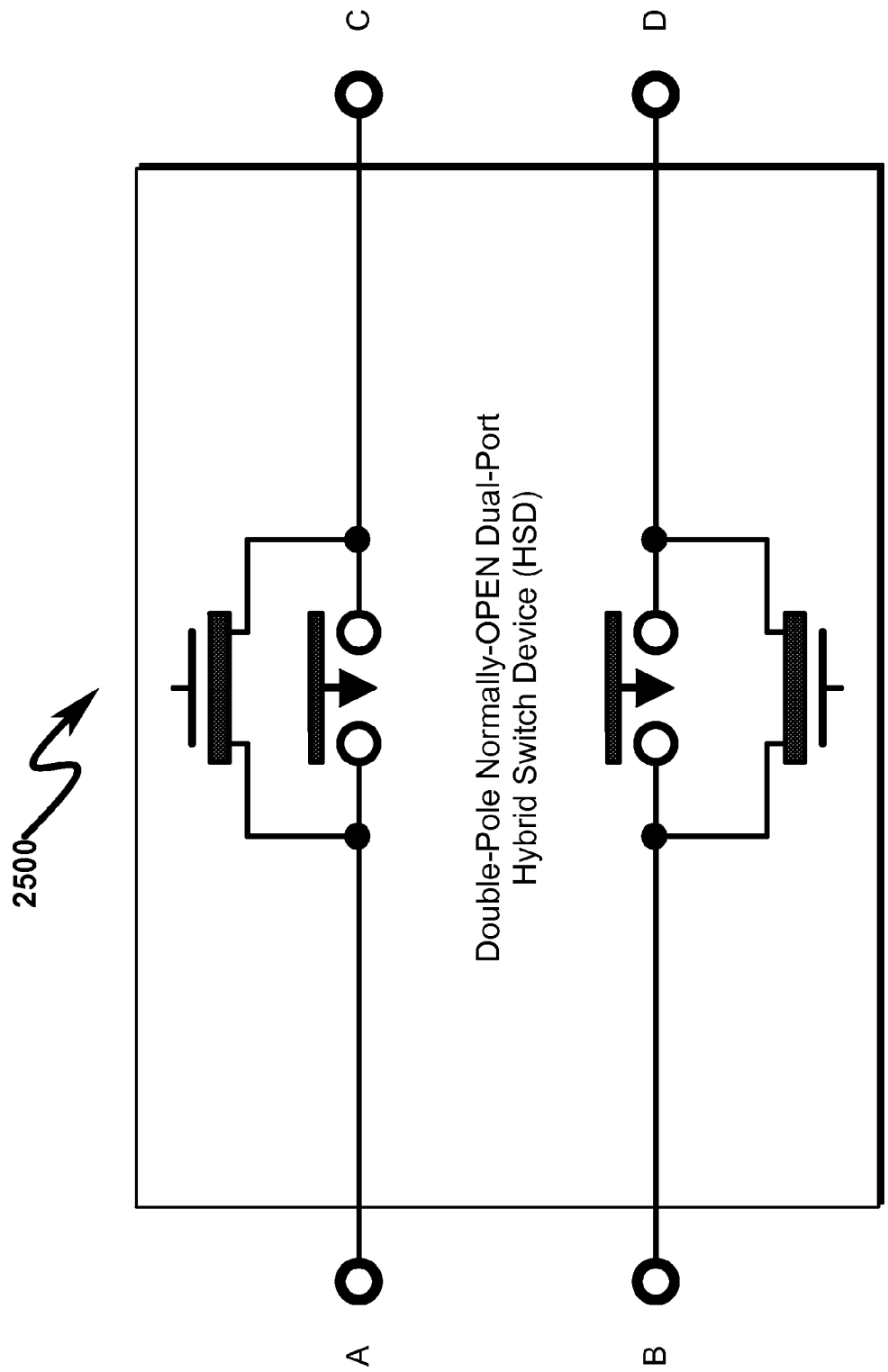
FIG. 25 illustrates a preferred exemplary embodiment of a double-pole normally-OPEN dual-port hybrid switch device (HSD)
Figure 26:
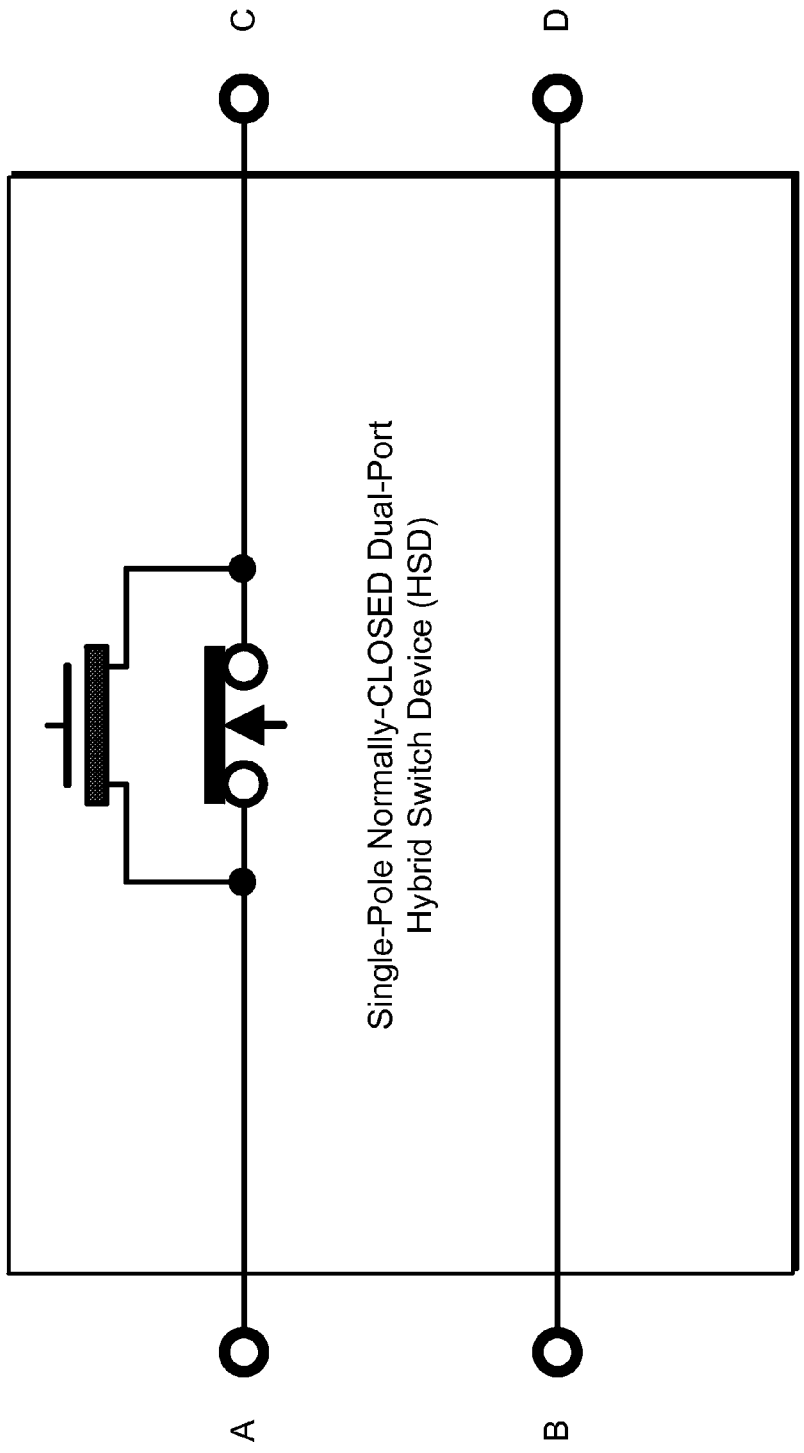
FIG. 26 illustrates a preferred exemplary embodiment of a single-pole normally-CLOSED dual-port hybrid switch device (HSD)
Figure 27:
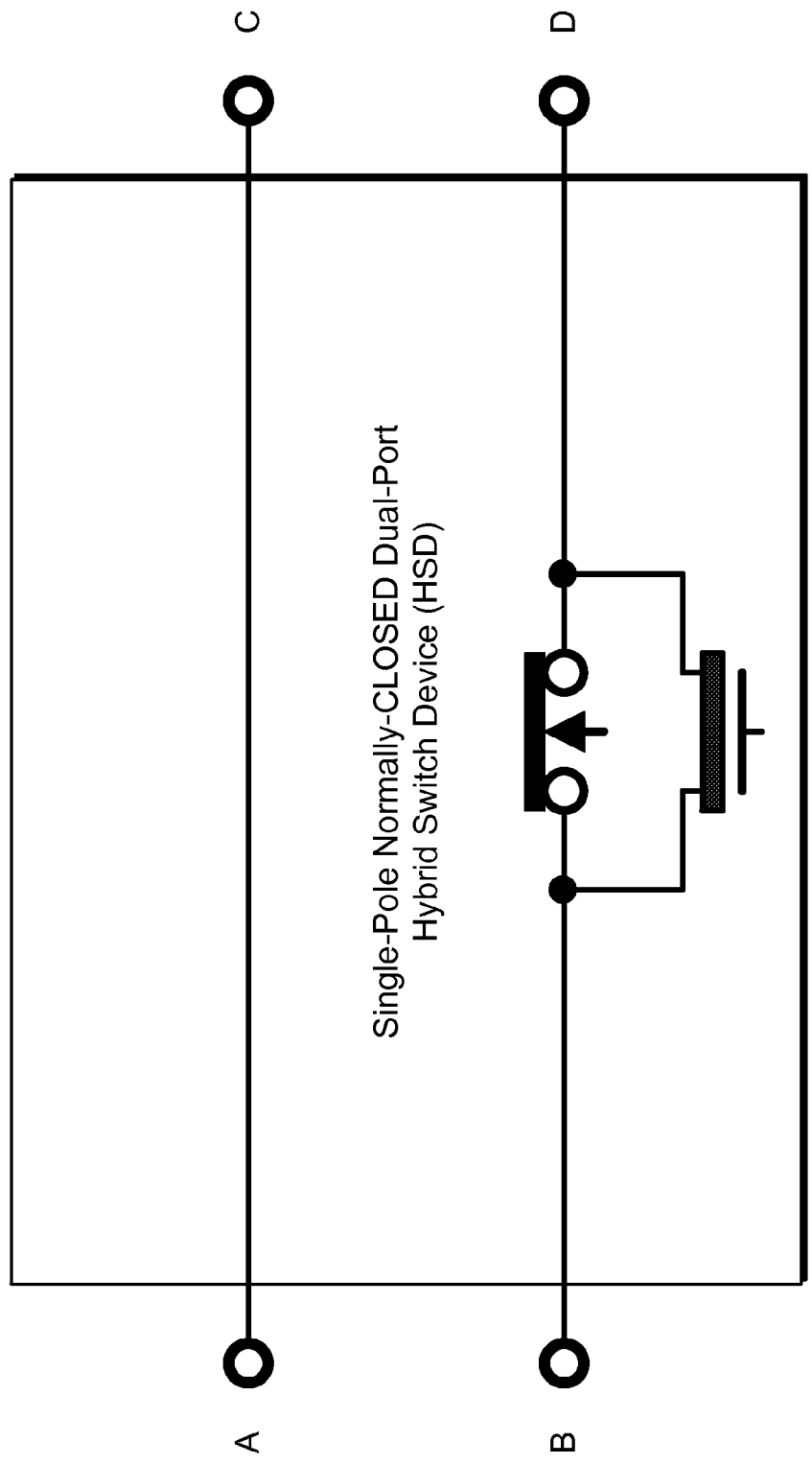
FIG. 27 illustrates a preferred exemplary embodiment of a single-pole normally-CLOSED dual-port hybrid switch device (HSD)
Figure 28:
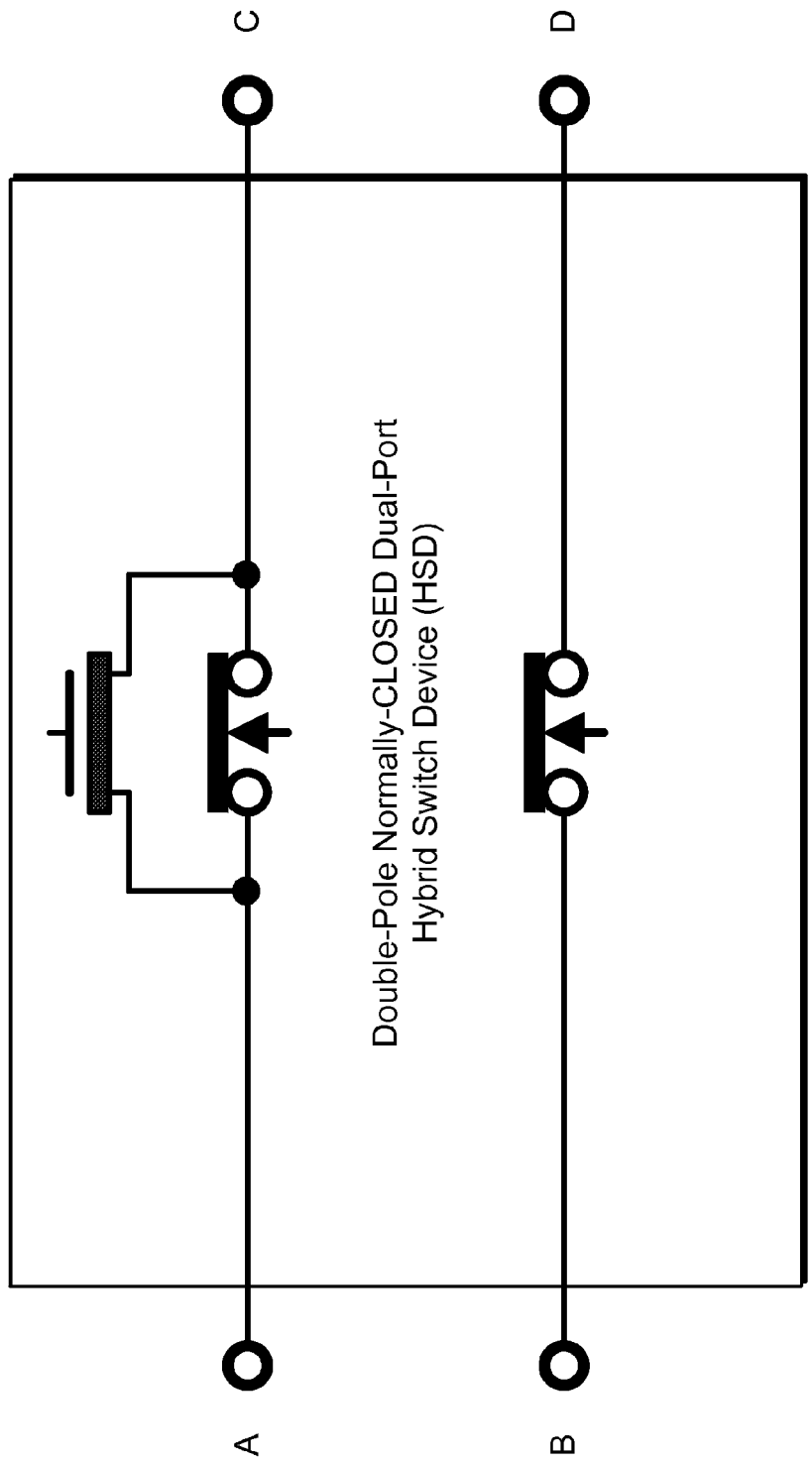
FIG. 28 illustrates a preferred exemplary embodiment of a double-pole normally-CLOSED dual-port hybrid switch device (HSD)
Figure 29:
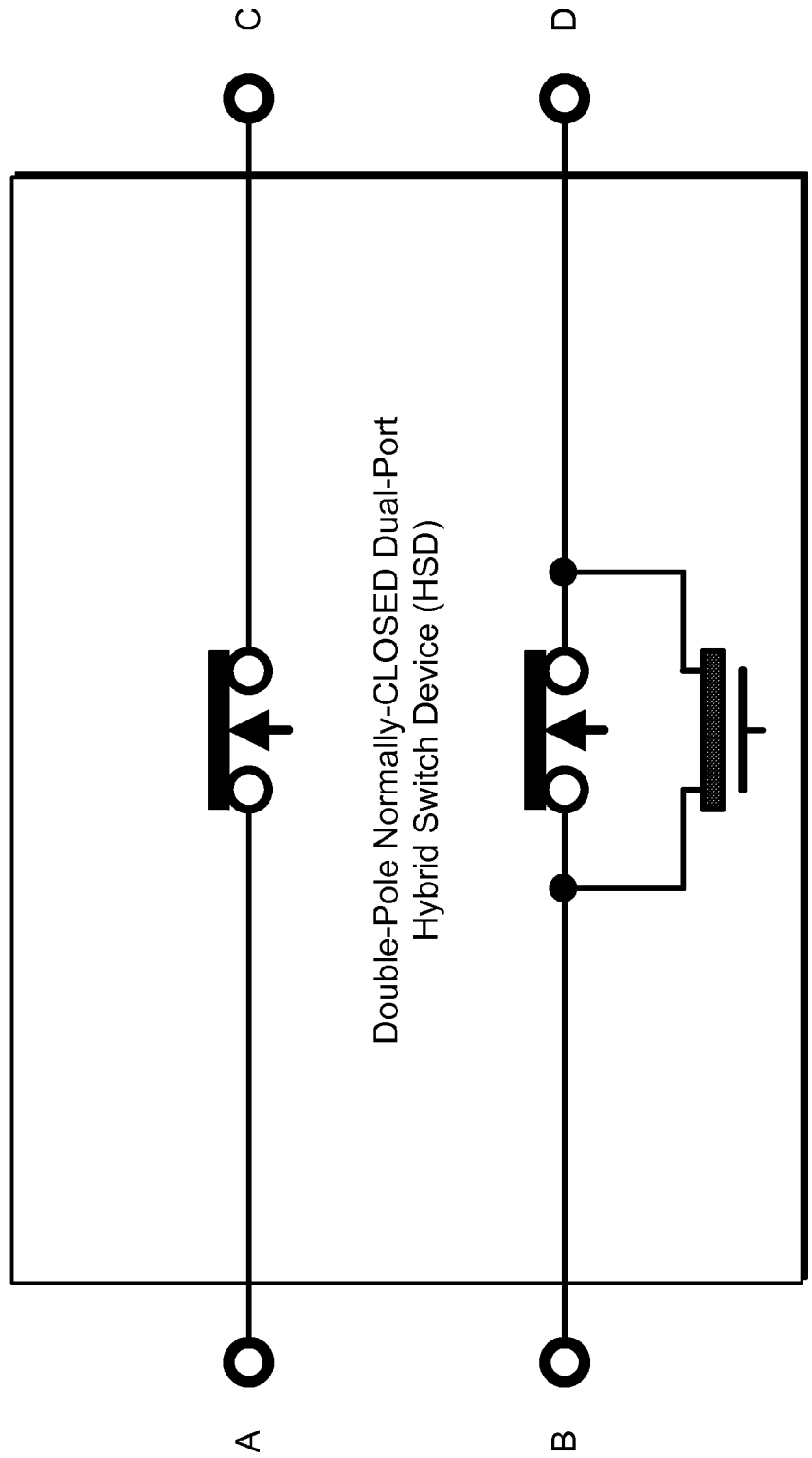
FIG. 29 illustrates a preferred exemplary embodiment of a double-pole normally-CLOSED dual-port hybrid switch device (HSD)

The diagrams provided in FIG. 21 (2100)-FIG. 30 (3000) depict a variety of normally-OPEN and normally-CLOSED HSD configurations and some configurations in which the dual-port relay configuration implements a combination of HSD components as well as conventional relay switching (FIG. (2300)-FIG. 24 (2400) and FIG. 28 (2800)-FIG. 29 (2900)).

Exemplary Dual-Input Power Supplies (3300)-(4400)

While a wide variety of invention embodiments is anticipated by the present invention, several preferred examples will now be provided by way of illustration to teach the scope of the claimed invention. Within each of these examples, a schematic diagram will be provided along with an exemplary timing diagram. All voltage sensing and MOSFET controls are implemented by an operate/release controller (ORC) that is not depicted in these diagrams.

Common-Ground with HSD 4-NO+4 MOSFETS (3300)-(3400)

Figure 33:
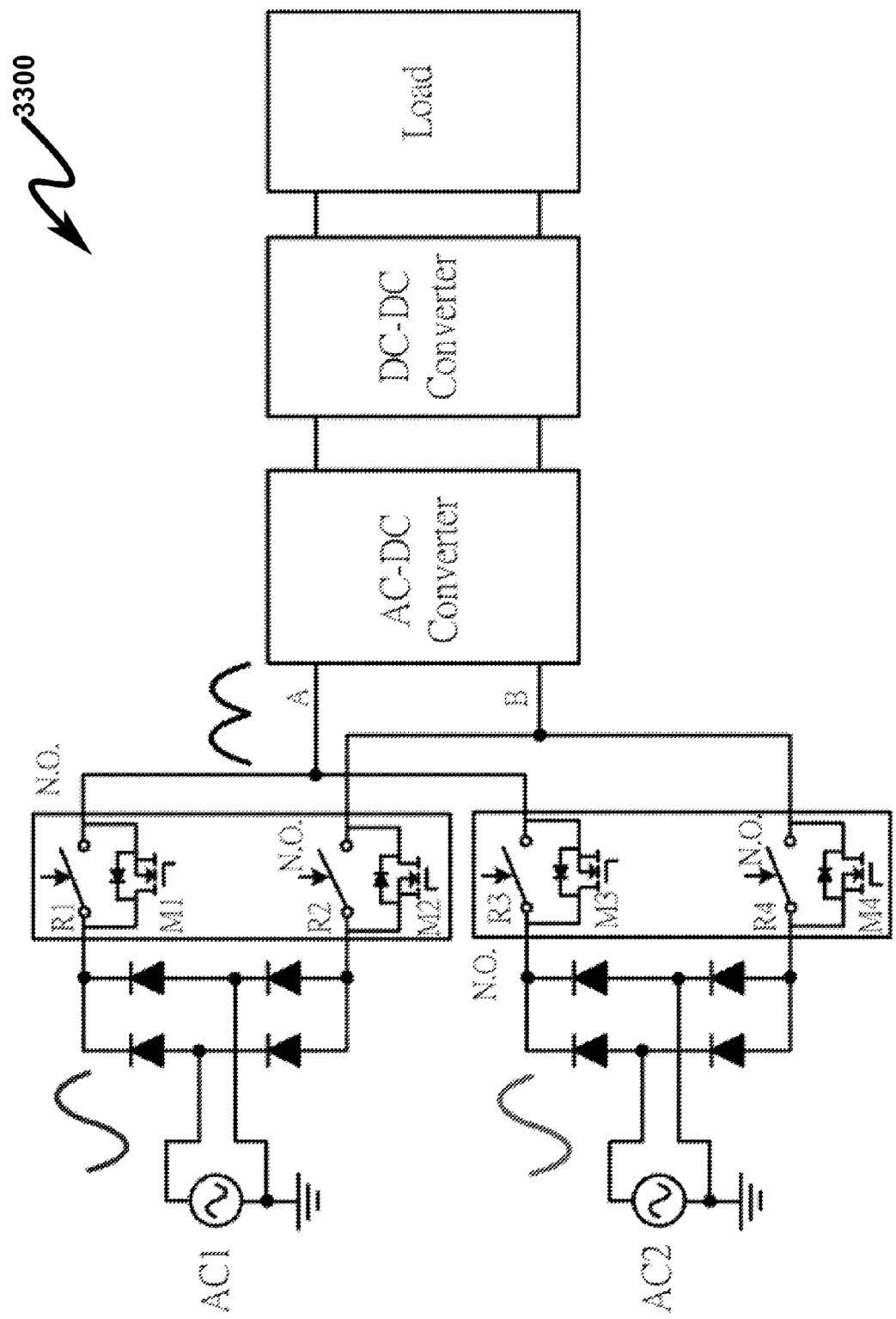
FIG. 33 illustrates a schematic depicting a preferred exemplary invention embodiment common-ground dual-input power supply comprising a HSD having four normally-open relays and four MOSFETs.
Figure 34:
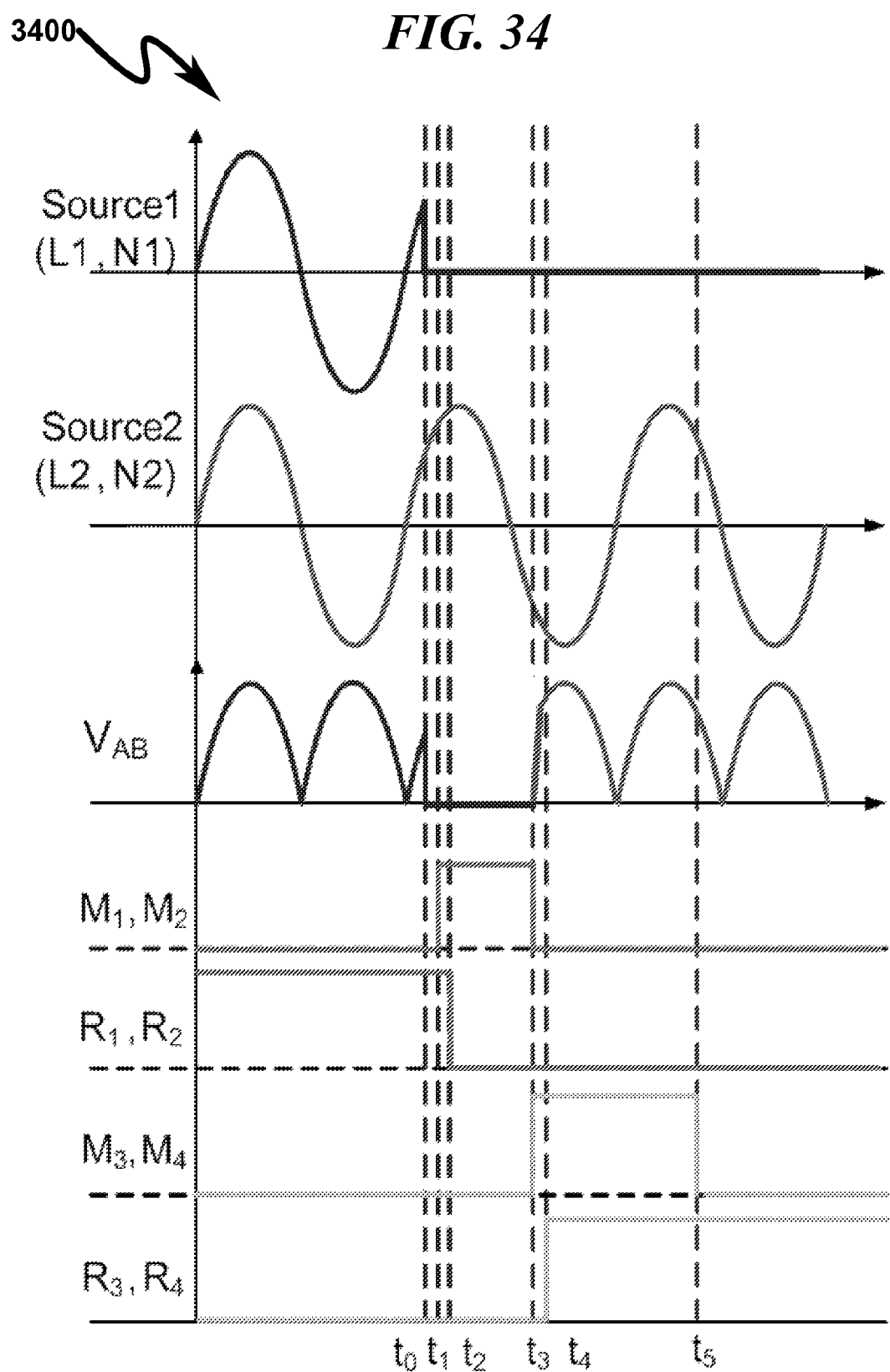
FIG. 34 illustrates a timing diagram of a preferred exemplary invention embodiment common-ground dual-input power supply comprising a HSD having four normally-open relays and four MOSFETs.

FIG. 33 (3300) depicts a common-ground dual-input power supply with four normally-open relays and four MOSFETs. FIG. 34 (3400) depicts key waveforms of the dual-input power supply with four normally-open relays and four MOSFETs. The applicable timing states are as follows:

| Item | Description |
| --- | --- |
| $t_0$-$t_1$ | MCU Operation Time |
| $t_1$-$t_2$ | Delay Time for Inrush Current Limiter |
| $t_2$-$t_3$ | Relay Release Time |
| $t_3$-$t_4$ | Delay Time for Inrush Current Limiter |
| $t_4$-$t_5$ | Relay Operate Time |

At $t=t_0$, the source AC1 has failed. The voltage $V_{AB}$ has dropped to zero.

At $t=t_1$, the MOSFETs $M_1$ and $M_2$ are turned on, which will allow the relay to have a zero-voltage cut-off.

At $t=t_2$, the relay $R_1$ and $R_2$ are turned off. The time of $t_2$ to $t_3$ is determined by the RELEASE time for the relay.

At $t=t_3$, the MOSFETs $M_3$ and $M_4$ are turned on, which will allow the relay to have a zero-voltage turn-on.

At $t=t_4$, relays $R_3$ and $R_4$ are turned on. The time of $t_4$ to $t_5$ is determined by the OPERATE time for the relay.

Common-Ground with HSD 2-NO+2-NC+4 MOSFETS (3500)-(3600)

Figure 35:
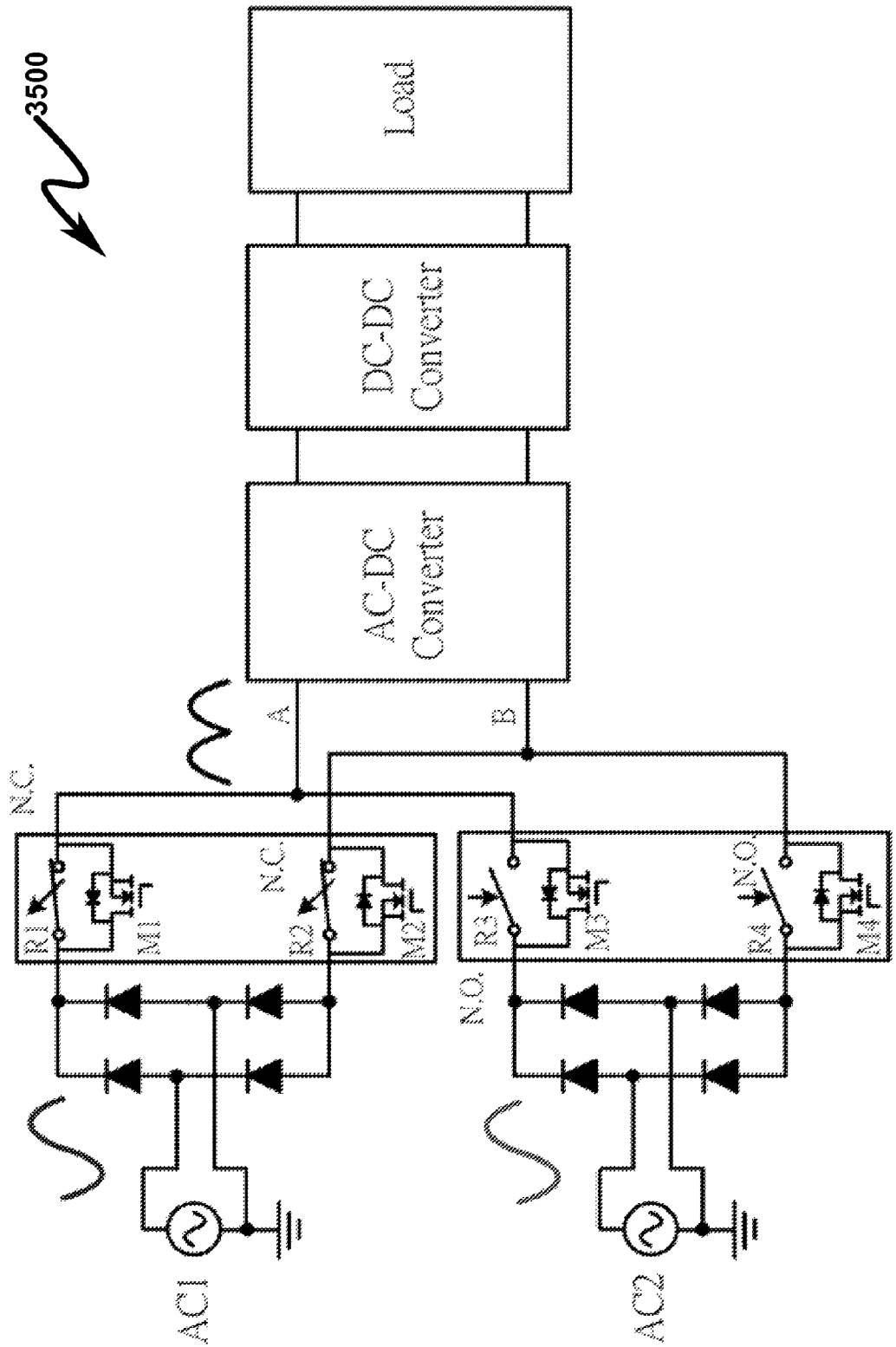
FIG. 35 illustrates a schematic depicting a preferred exemplary invention embodiment common-ground dual-input power supply comprising a HSD having two normally-open relays, two normally-closed relays, and four MOSFETs.
Figure 36:
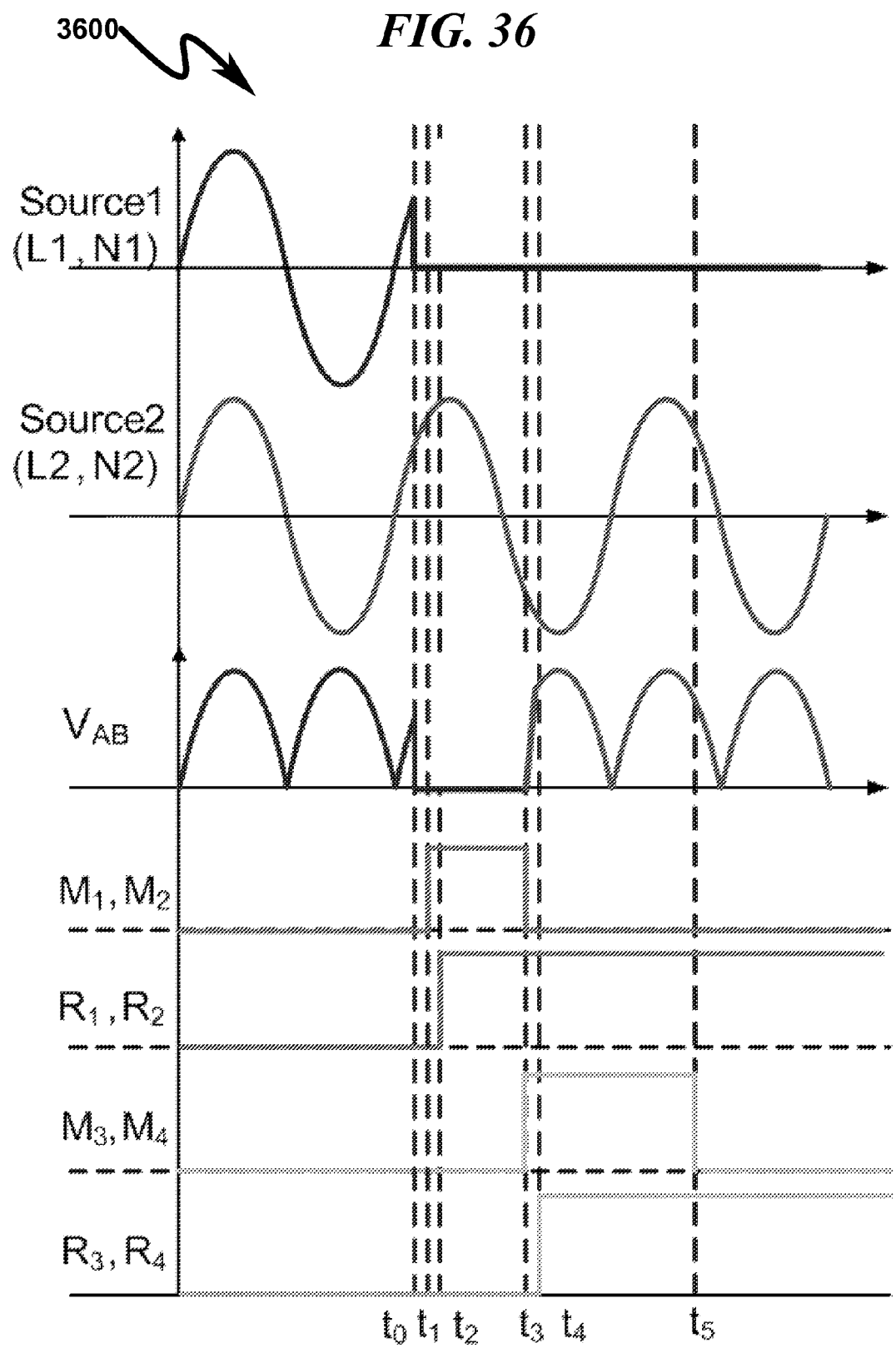
FIG. 36 illustrates a timing diagram of a preferred exemplary invention embodiment common-ground dual-input power supply comprising a HSD having two normally-open relays, two normally-closed relays, and four MOSFETs.

FIG. 35 (3500) depicts a common-ground dual-input power supply with two normally-open relays, two normally-closed relays, and four MOSFETs. FIG. 36 (3600) depicts key waveforms of the dual-input power supply with two normally-open relays, two normally-closed relays, and four MOSFETs. The applicable timing states are as follows:

| Item | Description |
| --- | --- |
| $t_0$-$t_1$ | MCU Operation Time |
| $t_1$-$t_2$ | Delay Time for Inrush Current Limiter |
| $t_2$-$t_3$ | Relay Release Time |
| $t_3$-$t_4$ | Delay Time for Inrush Current Limiter |
| $t_4$-$t_5$ | Relay Operate Time |

At $t=t_0$, the source AC1 has failed. The voltage $V_{AB}$ has dropped to zero.

At $t=t_1$, the MOSFETs $M_1$ and $M_2$ are turned on, which will allow the relay to have a zero-voltage cut-off.

At $t=t_2$, the relay $R_1$ and $R_2$ are turned off. The time of $t_2$ to $t_3$ is determined by the RELEASE time for the relay.

At $t=t_3$, the MOSFETs $M_3$ and $M_4$ are turned on, which will allow the relay to have a zero-voltage turn-on.

At $t=t_4$, relays $R_3$ and $R_4$ are turned on. The time of $t_4$ to $t_5$ is determined by the OPERATE time for the relay.

Isolated-Ground with HSD 4-NO+4 MOSFETS (3700)-(3800)

Figure 37:
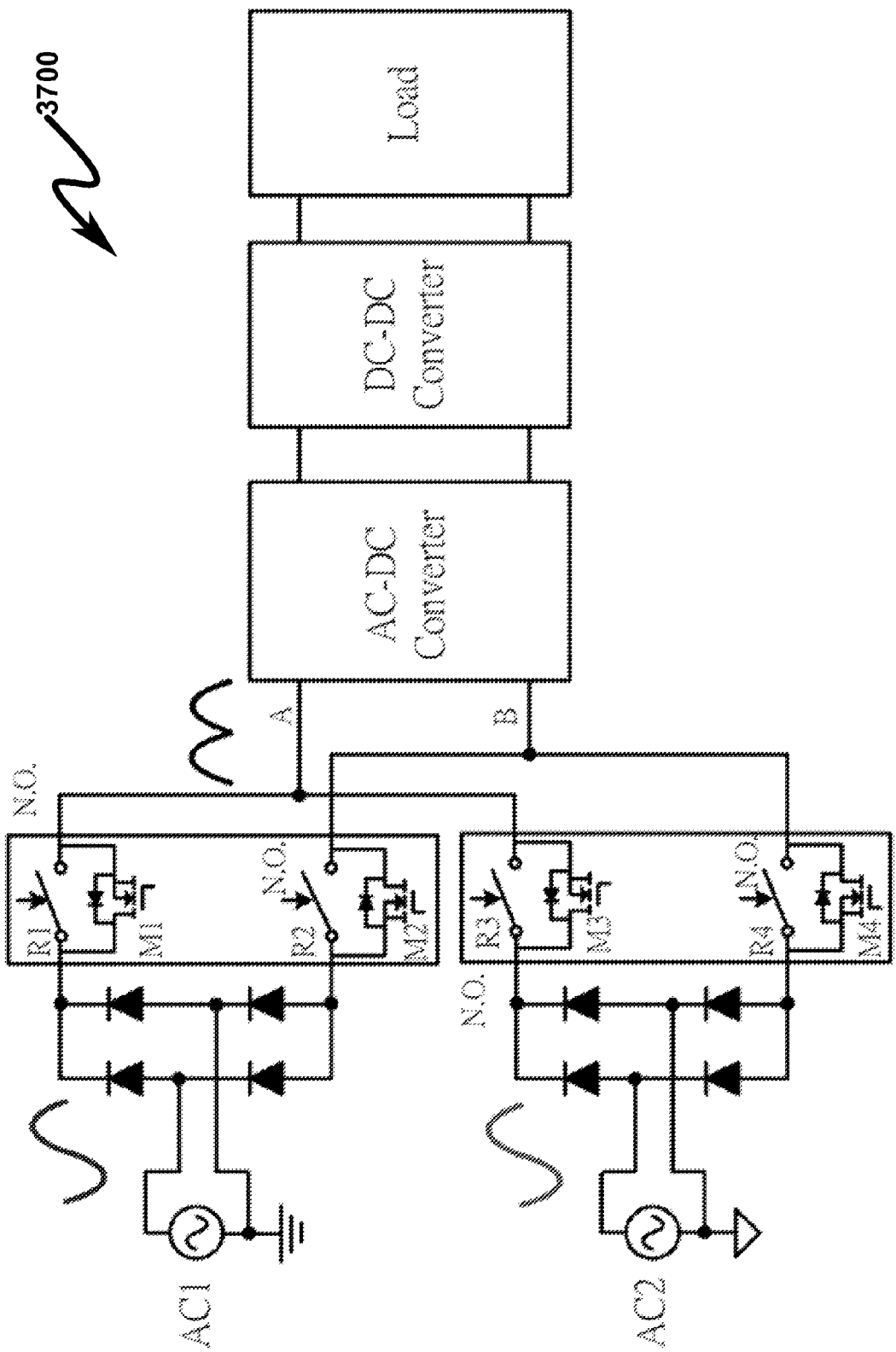
FIG. 37 illustrates a schematic depicting a preferred exemplary invention embodiment isolated-ground dual-input power supply comprising a HSD having four normally-open relays and four MOSFETs.
Figure 38:
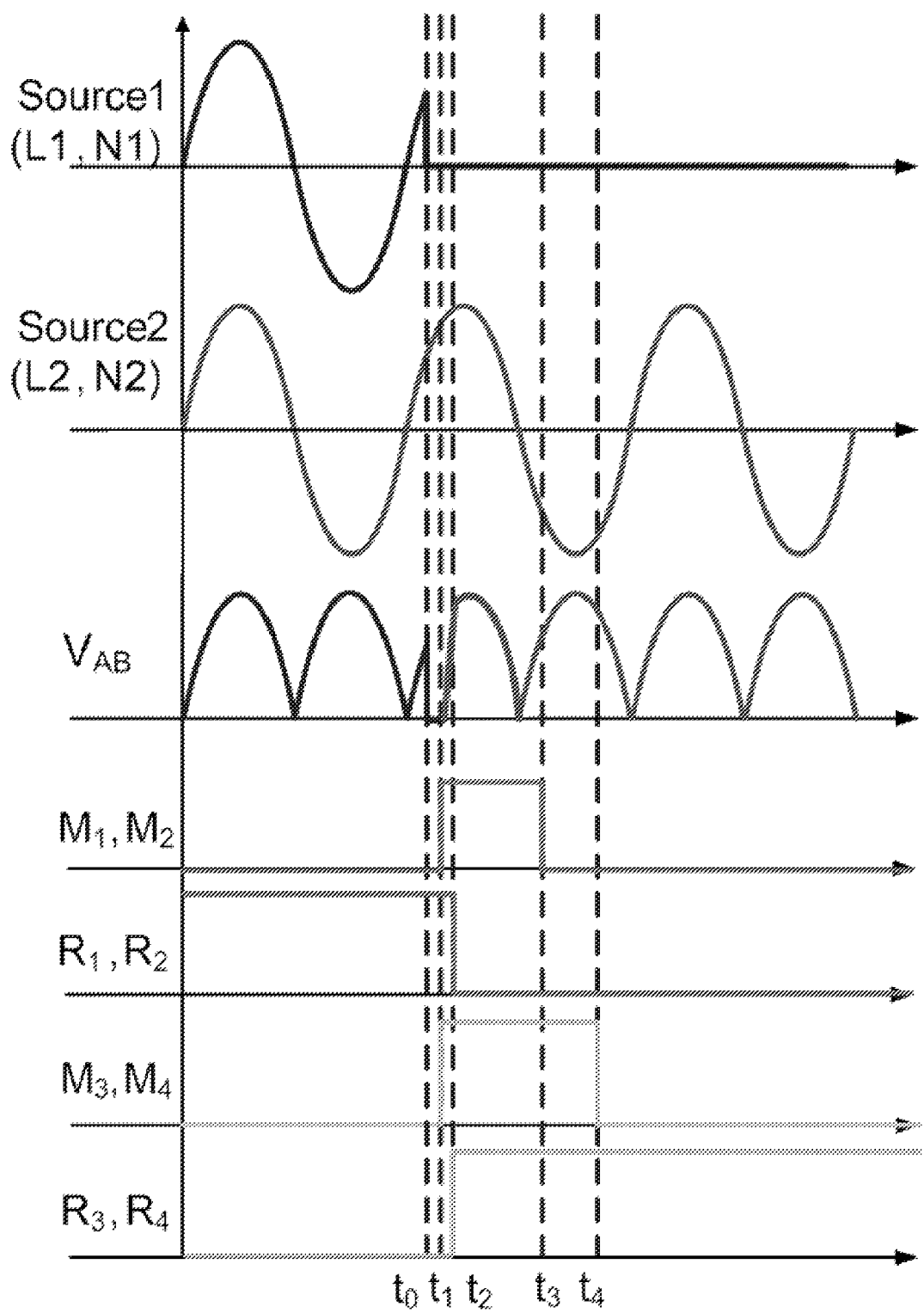
FIG. 38 illustrates a timing diagram of a preferred exemplary invention embodiment isolated-ground dual-input power supply comprising a HSD having four normally-open relays and four MOSFETs.

FIG. 37 (3700) depicts an isolated-ground dual-input power supply with four normally-open relays and four MOSFETs. FIG. 38 (3800) depicts key waveforms of the dual-input power supply with four normally-open relays and four MOSFETs. The applicable timing states are as follows:

| Item | Description |
| --- | --- |
| $t_0$-$t_1$ | MCU Operation Time |
| $t_1$-$t_2$ | Delay Time for Inrush Current Limiter |
| $t_2$-$t_3$ | Relay Release Time |
| $t_3$-$t_4$ | Relay Operate Time |

At $t=t_0$, the source AC1 has failed. The voltage $V_{AB}$ has dropped to zero.

At $t=t_1$, the MOSFETs $M_1$, $M_2$, $M_3$, and $M_4$ are turned on, which will allow the relay to have a zero-voltage turn-on and cut-off.

At $t=t_2$, the relay $R_1$ and $R_2$ are turned off and relay $R_3$ and $R_4$ are turned on. The time of $t_2$ to $t_3$ is determined by the RELEASE time for the relay.

At $t=t_3$, the MOSFETs $M_1$ and $M_2$ are turned off.

At $t=t_4$, the MOSFETs $M_3$ and $M_4$ are turned off. The time of $t_3$ to $t_4$ is determined by the OPERATE time for the relay.

Isolated-Ground with HSD 2-NO+2-NC+4MOSFETS (3900)-(4000)

Figure 39:
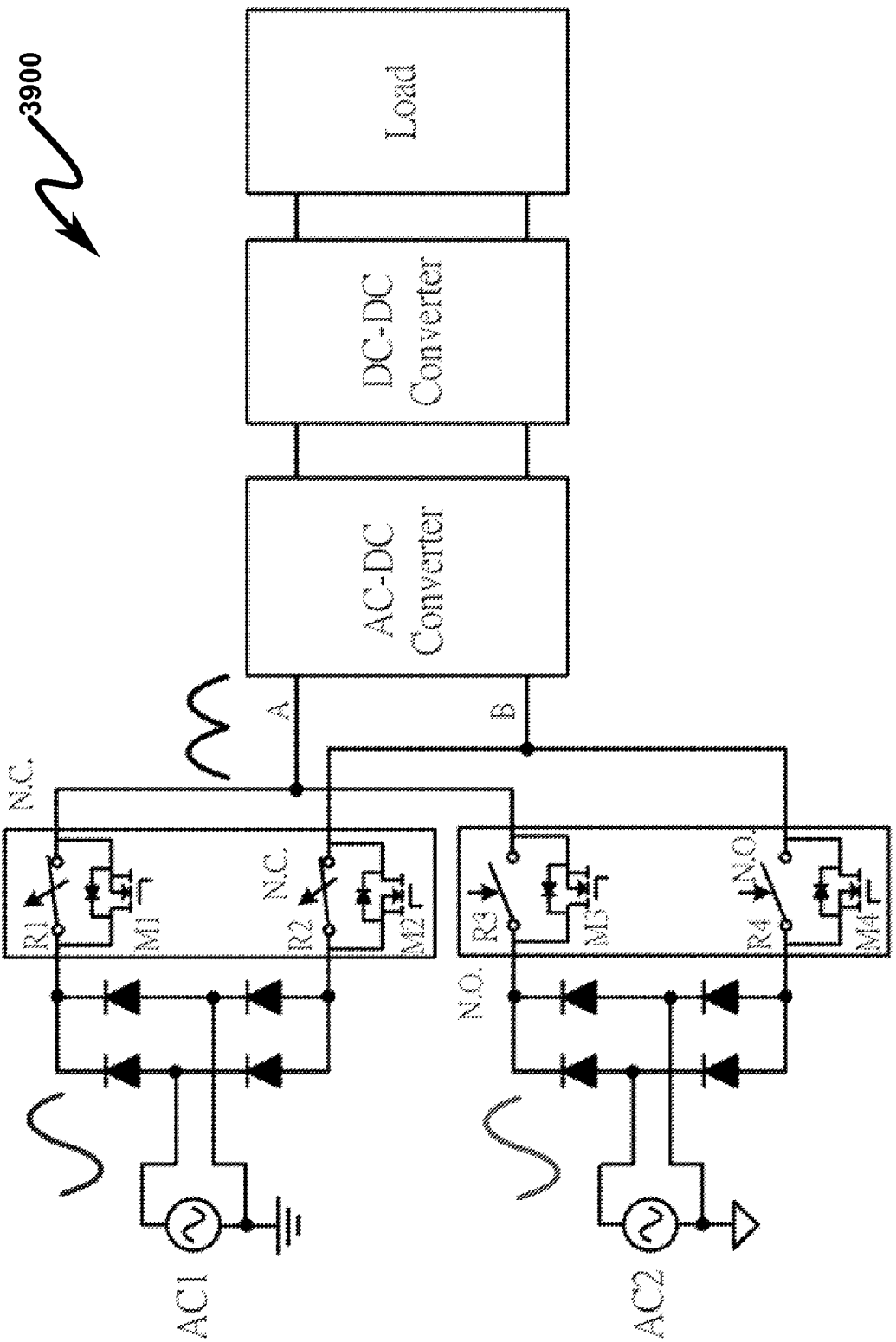
FIG. 39 illustrates a schematic depicting a preferred exemplary invention embodiment isolated-ground dual-input power supply comprising a HSD having two normally-open relays, two normally-closed relays, and four MOSFETs.
Figure 40:
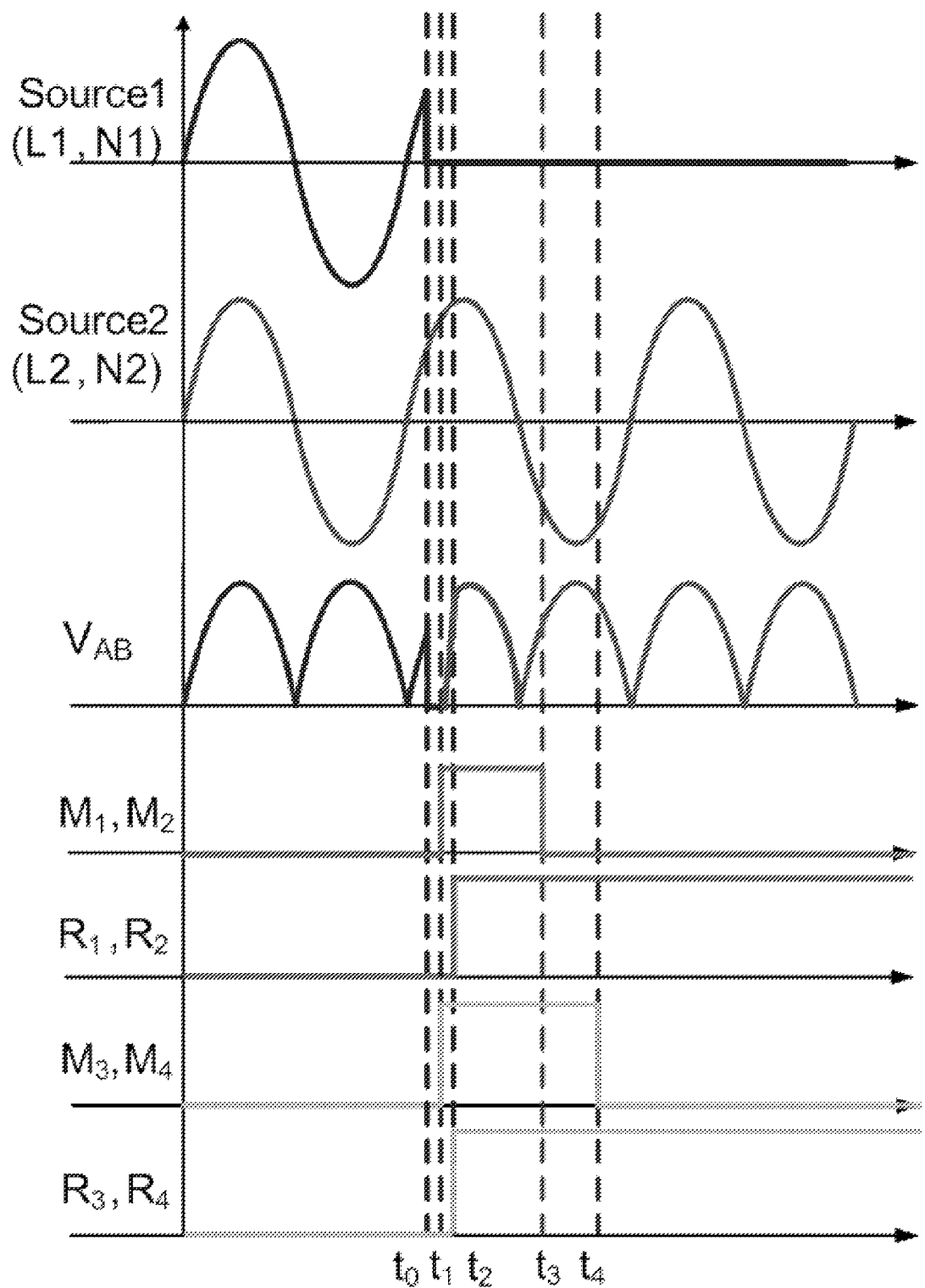
FIG. 40 illustrates a timing diagram of a preferred exemplary invention embodiment isolated-ground dual-input power supply comprising a HSD having two normally-open relays, two normally-closed relays, and four MOSFETs.

FIG. 39 (3900) depicts an isolated-ground dual-input power supply with two normally-open relays, two normally-closed relays, and four MOSFETs. FIG. 40 (4000) depicts key waveforms of the dual-input power supply with two normally-open relays, two normally-closed relays, and four MOSFETs. The applicable timing states are as follows:

| Item | Description |
|---|---|
| $t_0$-$t_1$ | MCU Operation Time |
| $t_1$-$t_2$ | Delay Time for Inrush Current Limiter |
| $t_2$-$t_3$ | Relay Release Time |
| $t_3$-$t_4$ | Relay Operate Time |

At $t=t_0$, the source AC1 has failed. The voltage $V_{AB}$ has dropped to zero.

At $t=t_1$, the MOSFETs $M_1$, $M_2$, $M_3$, and $M_4$ are turned on, which will allow the relay to have a zero-voltage turn-on and cut-off.

At $t=t_2$, the relay $R_1$ and $R_2$ are turned off and relay $R_3$ and $R_4$ are turned on. The time of $t_2$ to $t_3$ is determined by the RELEASE time for the relay.

At $t=t_3$, the MOSFETs $M_1$ and $M_2$ are turned off.

At $t=t_4$, the MOSFETs $M_3$ and $M_4$ are turned off. The time of $t_3$ to $t_4$ is determined by the OPERATE time for the relay.

DC-Backup with HSD 2-NO+2 MOSFETS (4100)-(4200)

Figure 41:
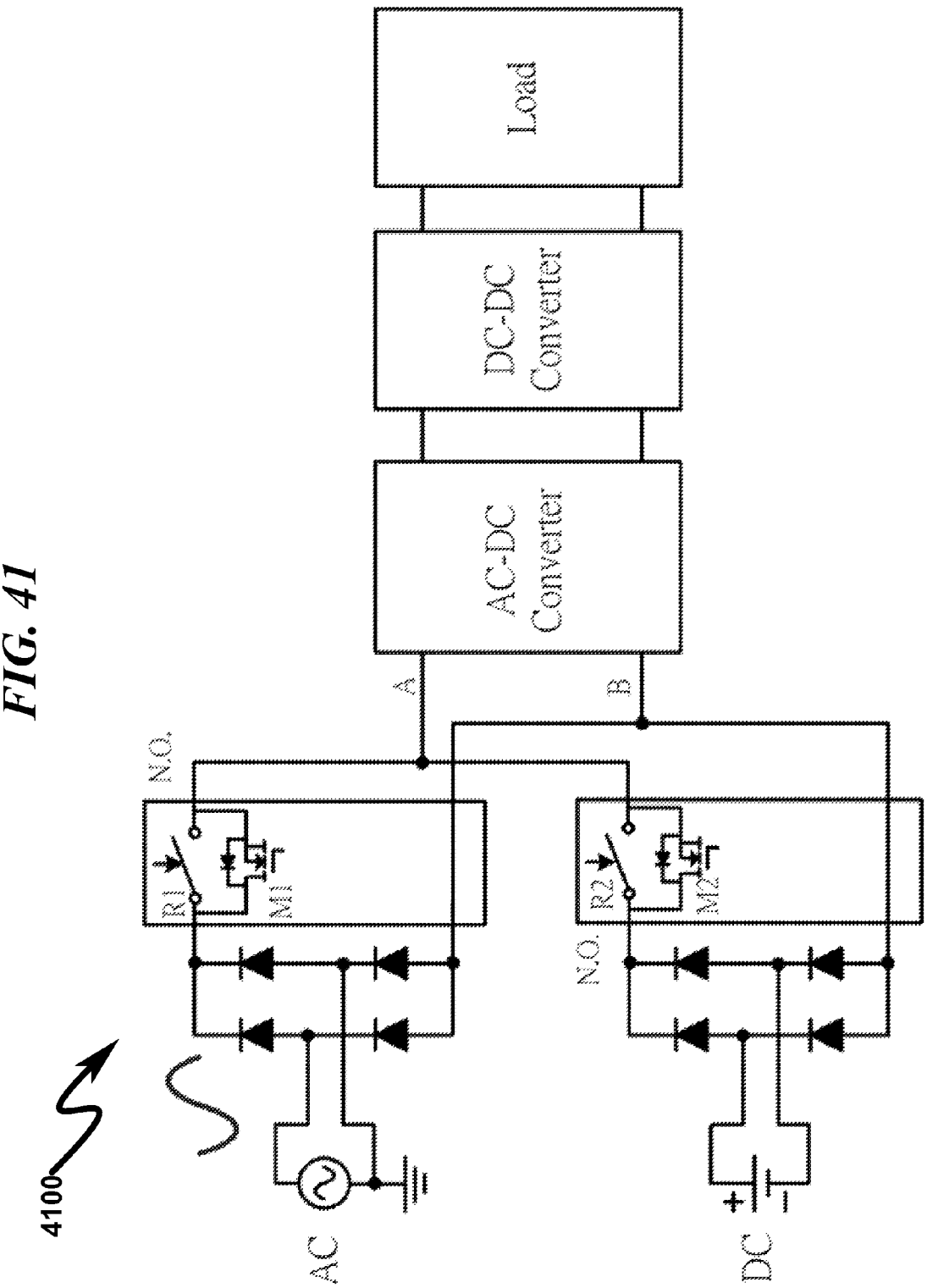
FIG. 41 illustrates a schematic depicting a preferred exemplary invention embodiment DC-backup dual-input power supply comprising a HSD having two normally-open relays and two MOSFETs.
Figure 42:
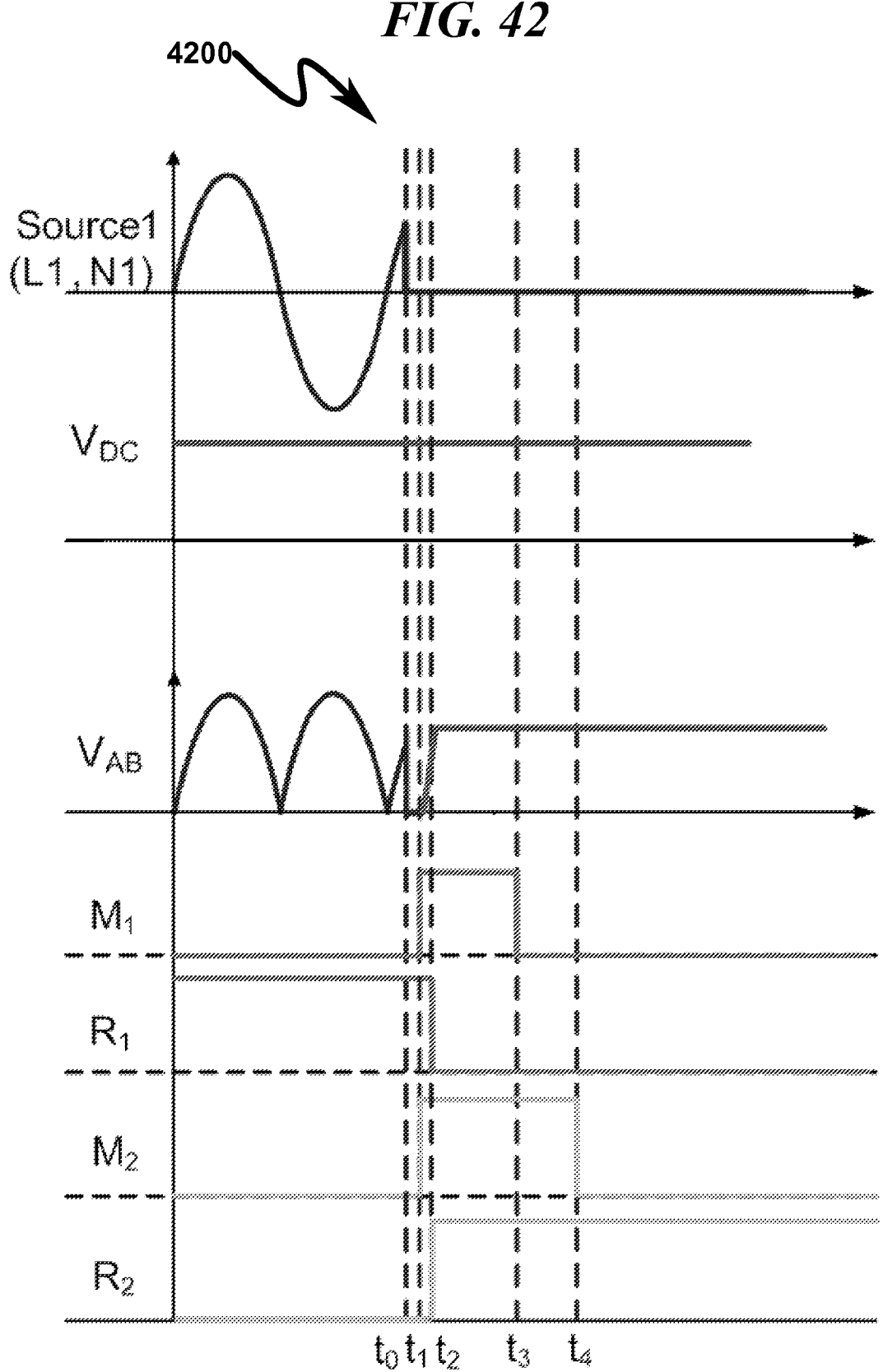
FIG. 42 illustrates a timing diagram of a preferred exemplary invention embodiment DC-backup dual-input power supply comprising a HSD having two normally-open relays and two MOSFETs.

FIG. 41 (4100) depicts a DC-backup dual-input power supply with two normally-open relays and two MOSFETs. FIG. (4200) depicts key waveforms of the dual-input power supply with two normally-open relays and two MOSFETs. The applicable timing states are as follows:

| Item | Description |
|---|---|
| $t_0$-$t_1$ | MCU Operation Time |
| $t_1$-$t_2$ | Delay Time for Inrush Current Limiter |
| $t_2$-$t_3$ | Relay Release Time |
| $t_3$-$t_4$ | Relay Operate Time |

At $t=t_0$, the source AC1 has failed. The voltage $V_{AB}$ has dropped to zero.

At $t=t_1$, the MOSFETs $M_1$ and $M_2$ are turned on, which will allow the relays to have a zero-voltage turn-on and cut-off.

At $t=t_2$, the relay $R_1$ is turned off and relay $R_2$ is turned on. The time of $t_2$ to $t_3$ is determined by the RELEASE time for the relay.

At $t=t_3$, the MOSFET $M_1$ is turned off.

At $t=t_4$, the MOSFET $M_2$ is turned off. The time of $t_3$ to $t_4$ is determined by the OPERATE time for the relay.

DC-Backup with HSD 1-NO+1-NC+2 MOSFETS (4300)-(4400)

Figure 43:
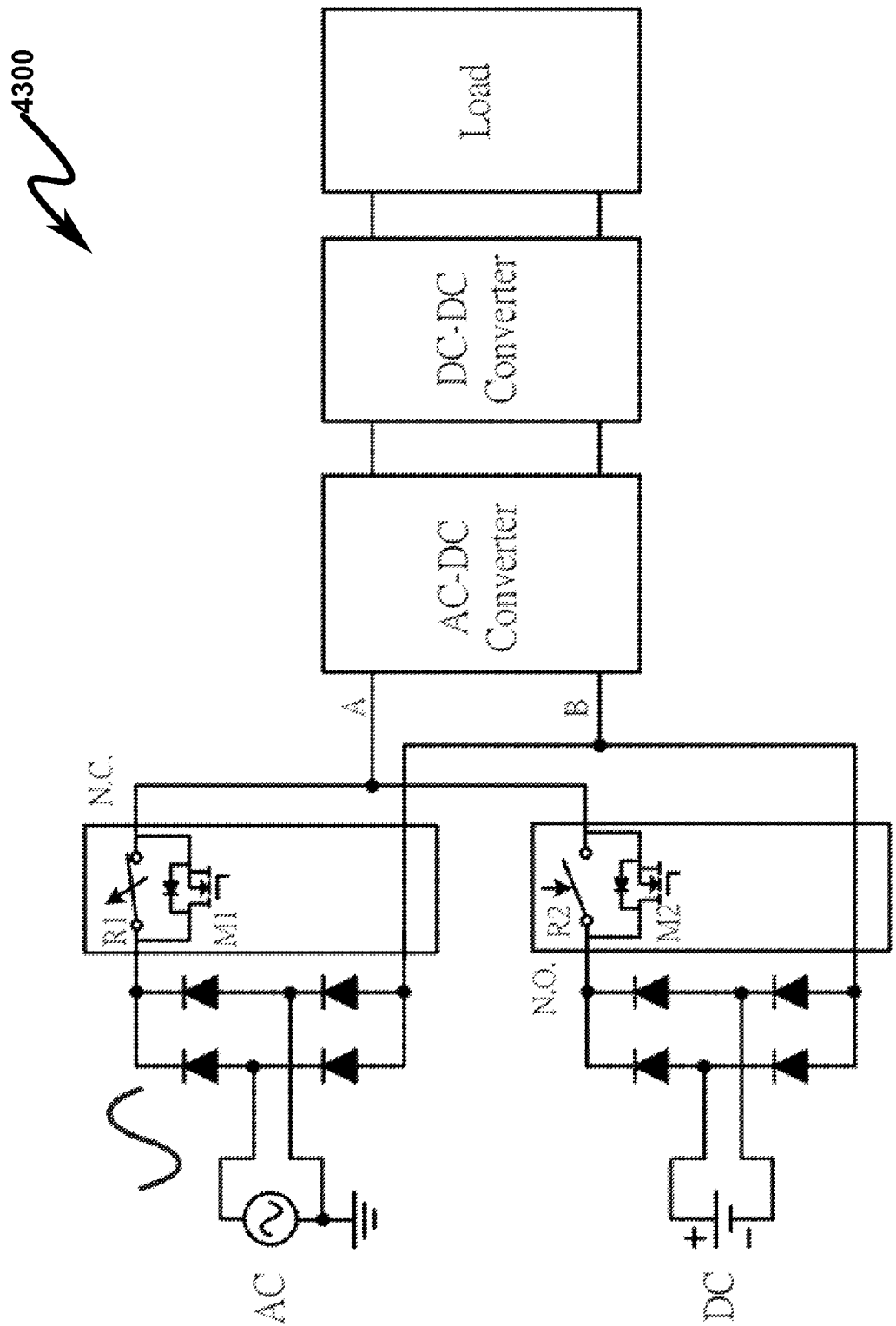
FIG. 43 illustrates a schematic depicting a preferred exemplary invention embodiment DC-backup dual-input power supply comprising a HSD having a normally-open relay, a normally-closed relay, and two MOSFETs.
Figure 44:
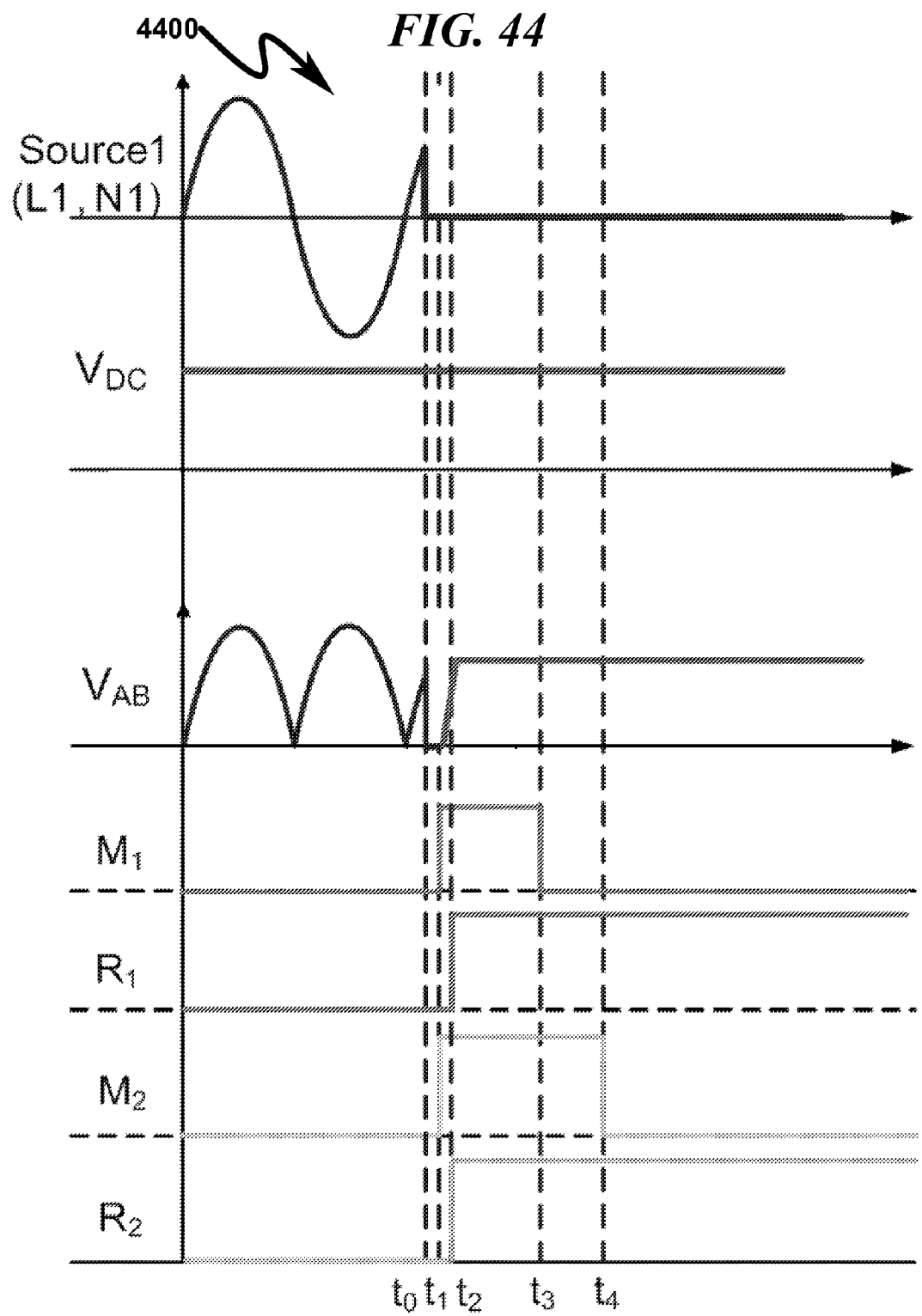
FIG. 44 illustrates a timing diagram of a preferred exemplary invention embodiment DC-backup dual-input power supply comprising a HSD having a normally-open relay, a normally-closed relay, and two MOSFETs.

FIG. 43 (4300) depicts a DC-backup dual-input power supply with one normally-open relay, one normally-closed relay, and two MOSFETs. FIG. 44 (4400) depicts key waveforms of the dual-input power supply with one normally-open relay, one normally-closed relay, and two MOSFETs. The applicable timing states are as follows:

| Item | Description |
|---|---|
| $t_0$-$t_1$ | MCU Operation Time |
| $t_1$-$t_2$ | Delay Time for Inrush Current Limiter |
| $t_2$-$t_3$ | Relay Release Time |
| $t_3$-$t_4$ | Relay Operate Time |

At $t=t_0$, the source AC1 has failed. The voltage $V_{AB}$ has dropped to zero.

At $t=t_1$, the MOSFETs $M_1$ and $M_2$ are turned on, which will allow the relays to have a zero-voltage turn-on and cut-off.

At $t=t_2$, the relay $R_1$ is turned on and relay $R_2$ is turned on. The time of $t_2$ to $t_3$ is determined by the RELEASE time for the relay.

At $t=t_3$, the MOSFET $M_1$ is turned off.

At $t=t_4$, the MOSFET $M_2$ is turned off. The time of $t_3$ to $t_4$ is determined by the OPERATE time for the relay.

Bidirectional Hybrid Switch Device (BSD) (4500)-(5600)

Figure 45:
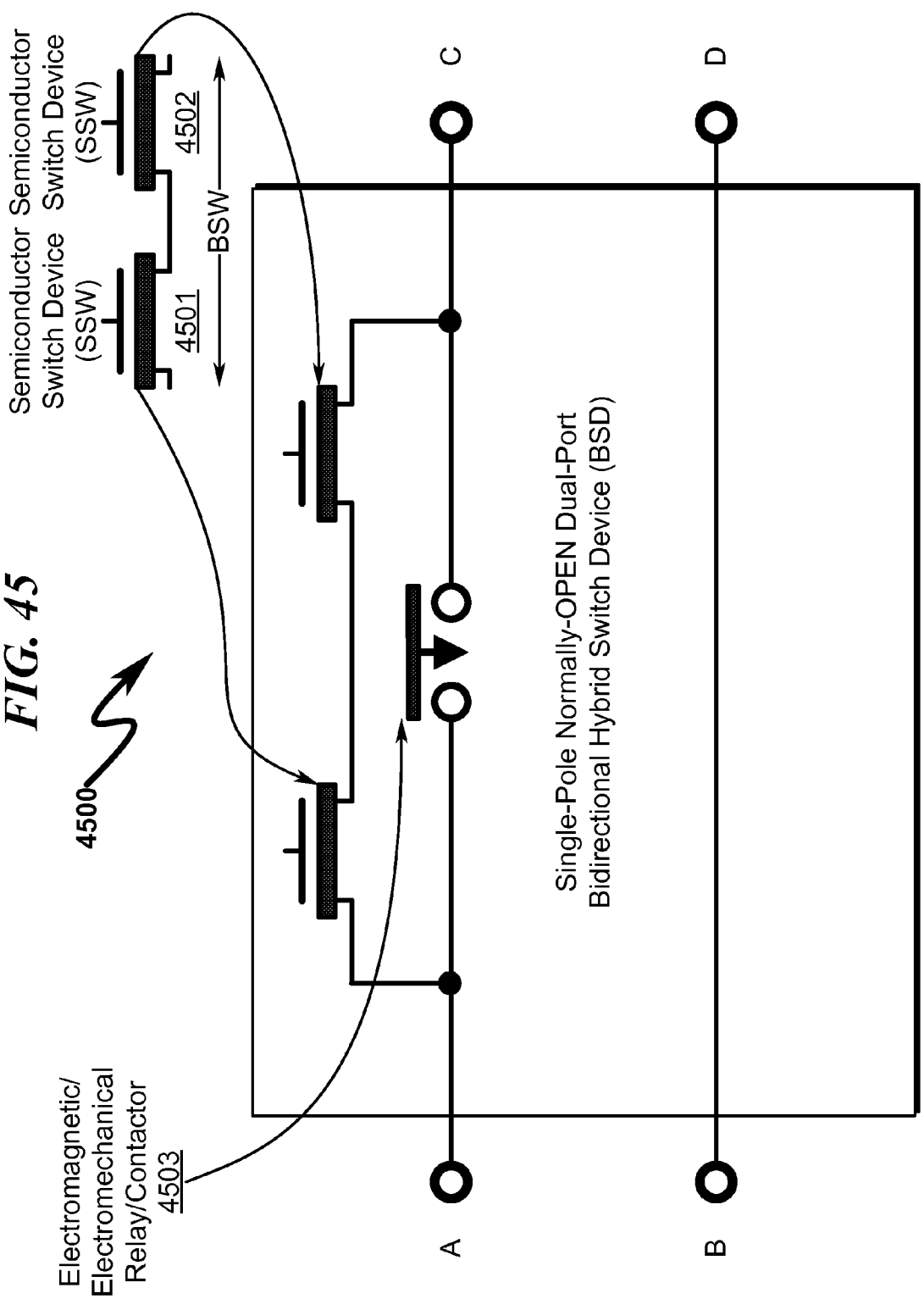
FIG. 45 illustrates a preferred exemplary embodiment of a single-pole normally-OPEN dual-port bidirectional hybrid switch device (BSD)
Figure 46:
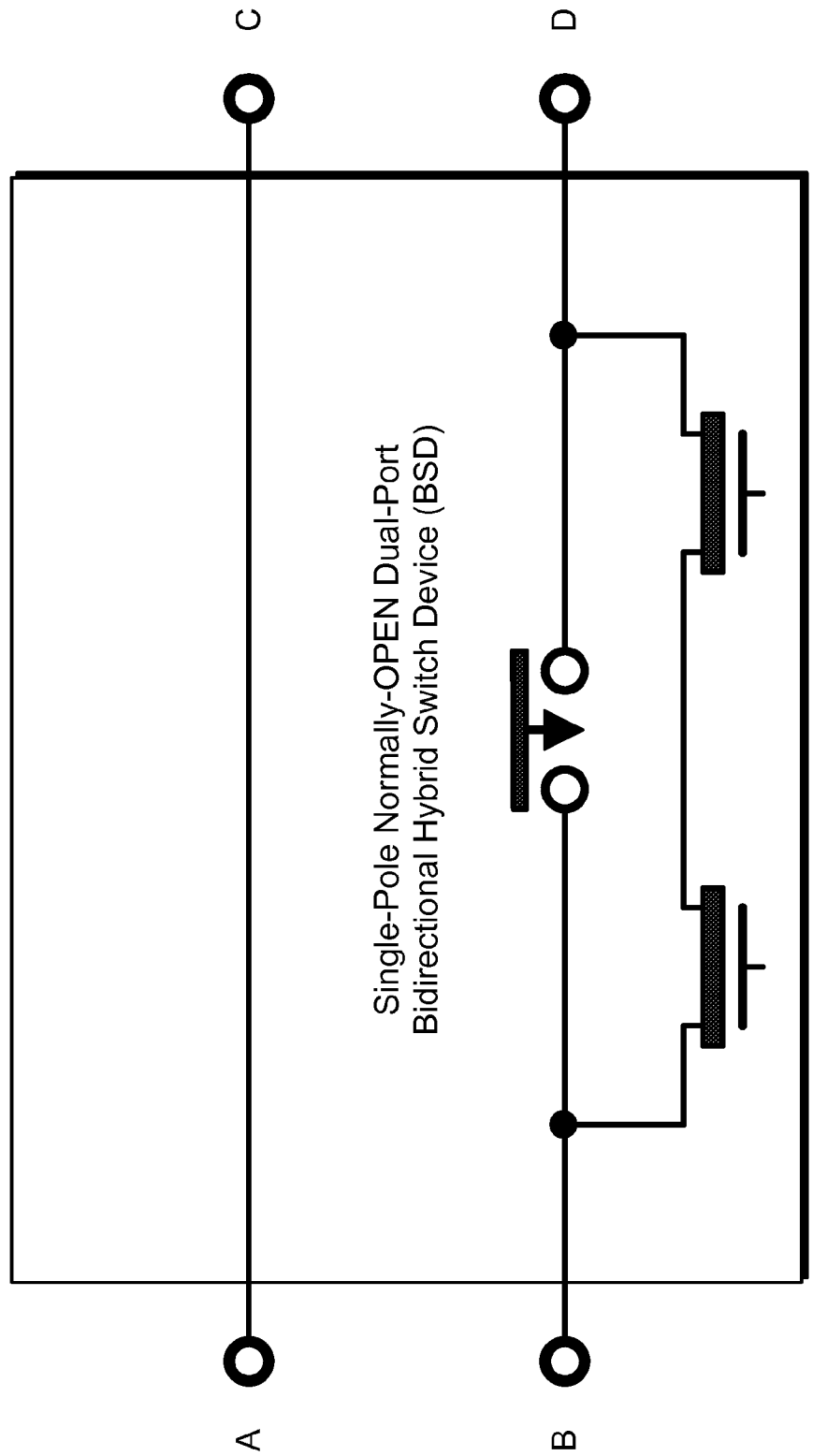
FIG. 46 illustrates a preferred exemplary embodiment of a single-pole normally-OPEN dual-port bidirectional hybrid switch device (BSD)
Figure 54:
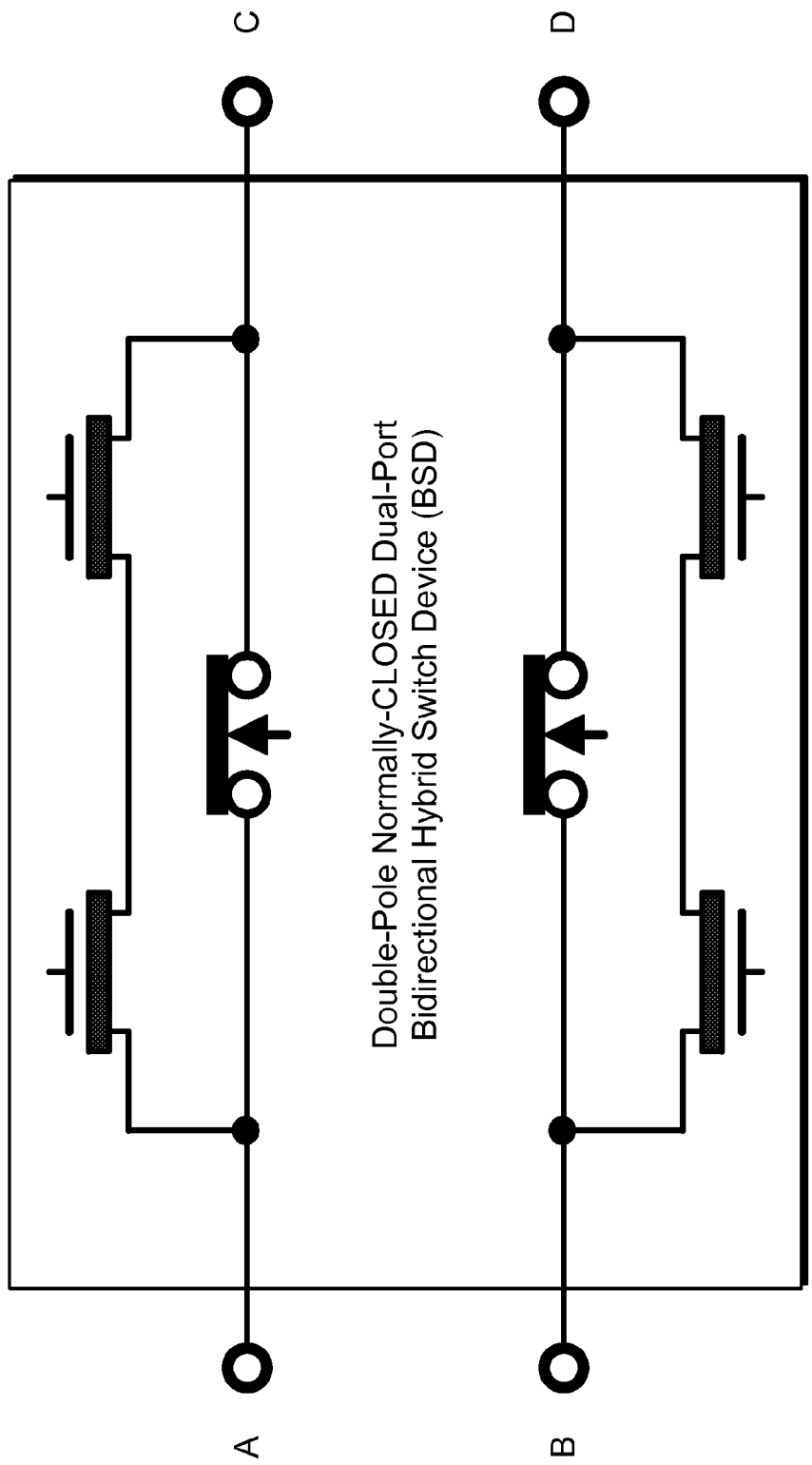
FIG. 54 illustrates a preferred exemplary embodiment of a double-pole normally-CLOSED dual-port bidirectional hybrid switch device (BSD)
Figure 55:
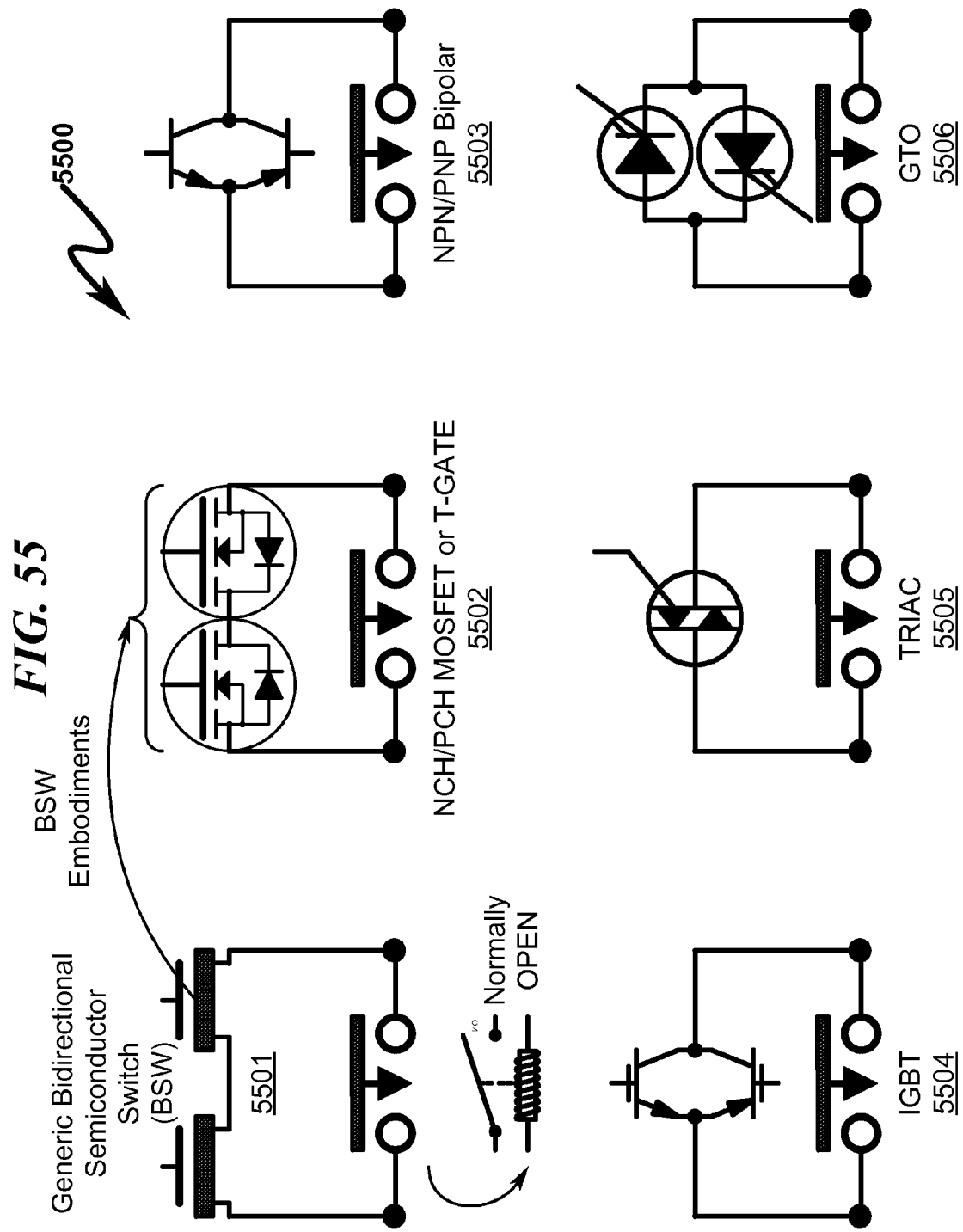
FIG. 55 illustrates several exemplary implementations of the SSW configurations utilized in creating a bidirectional hybrid switch device (BSD)
Figure 56:
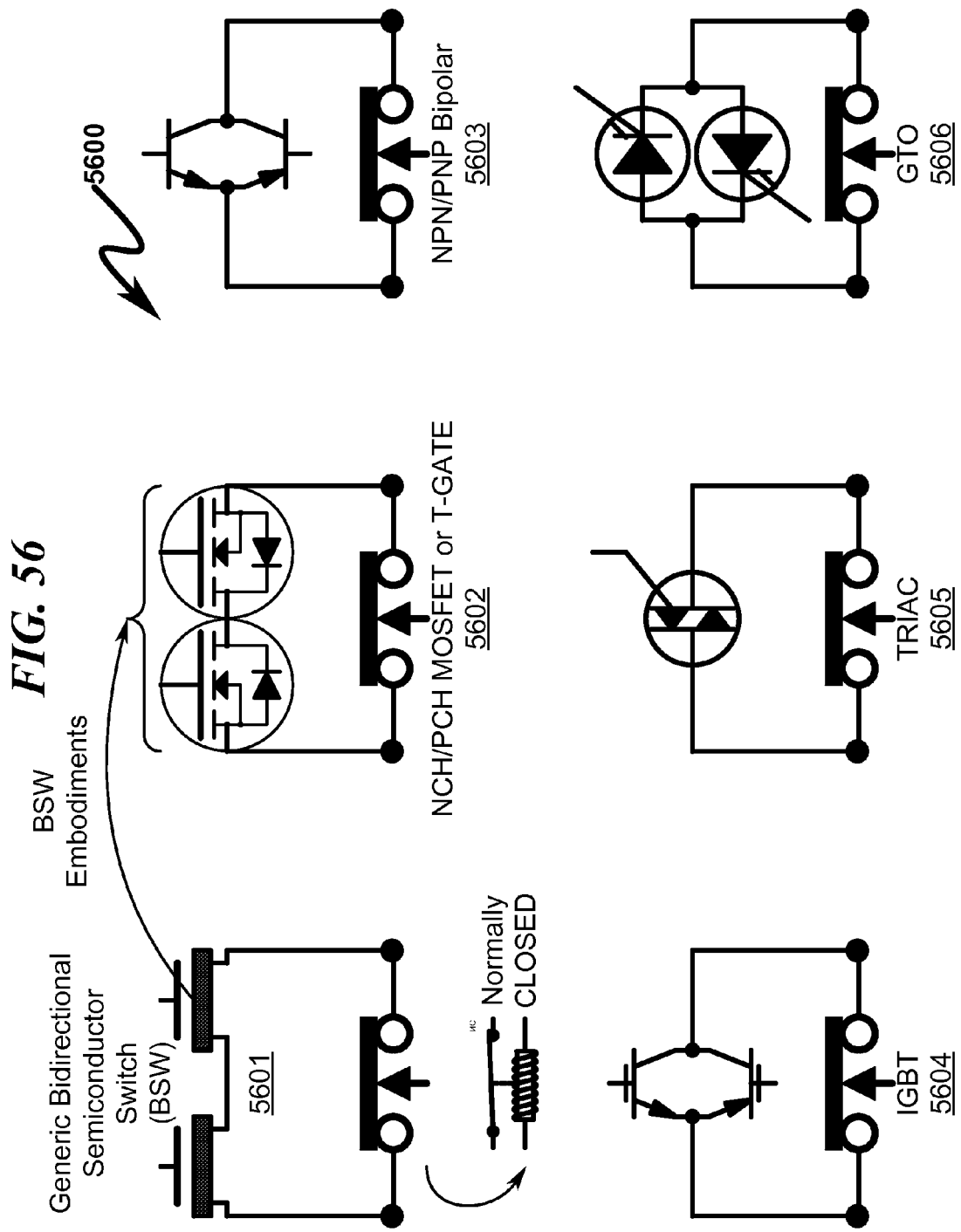
FIG. 56 illustrates several exemplary implementations of the SSW configurations utilized in creating a bidirectional hybrid switch device (BSD)

The present invention anticipates the use of a hybrid switch device (HSD) that may be configured in a bidirectional fashion as generally depicted in FIG. 45 (4500)-FIG. 54 (5400) as a general replacement for conventional relays used in prior art dual input power supply systems. Since the prior art relay configurations discussed above have applicable OPERATE/RELEASE timings, each of these prior art systems has a significant delay between the transition from the PPS to the SPS and visa-versa. The present invention combines the use of electromechanical relays with bidirectional semiconductor switch devices (BSW) (4501, 4502) that are generically depicted in FIG. 45 (4500)-FIG. 54 (5400) in parallel with the electromagnetic/electromechanical relay (4503). Further details on anticipated implementations of the BSW (4501, 4502) are provided in FIG. 55 (5500) which depicts normally-OPEN switch configurations and in FIG. 56 (5600) which depicts normally-CLOSED switch configurations. Within this context, the generic BSW component (5501, 5601) may comprise NCH and/or PCH MOSFETs (5502, 5602) and/or T-GATEs, NPN and/or PNP bipolar transistors (5503, 5603), insulated gate bipolar transistors (IGBTs, NPN and PNP variants) (5504, 5604), TRI-ACs (5505, 5605), gate turn-off thyristors (GTOs) (5506, 5606) and combinations of these devices connected in series opposition to form a bidirectional semiconductor switch (BSW) paralleled with the electromagnetic relay.

Figure 47:
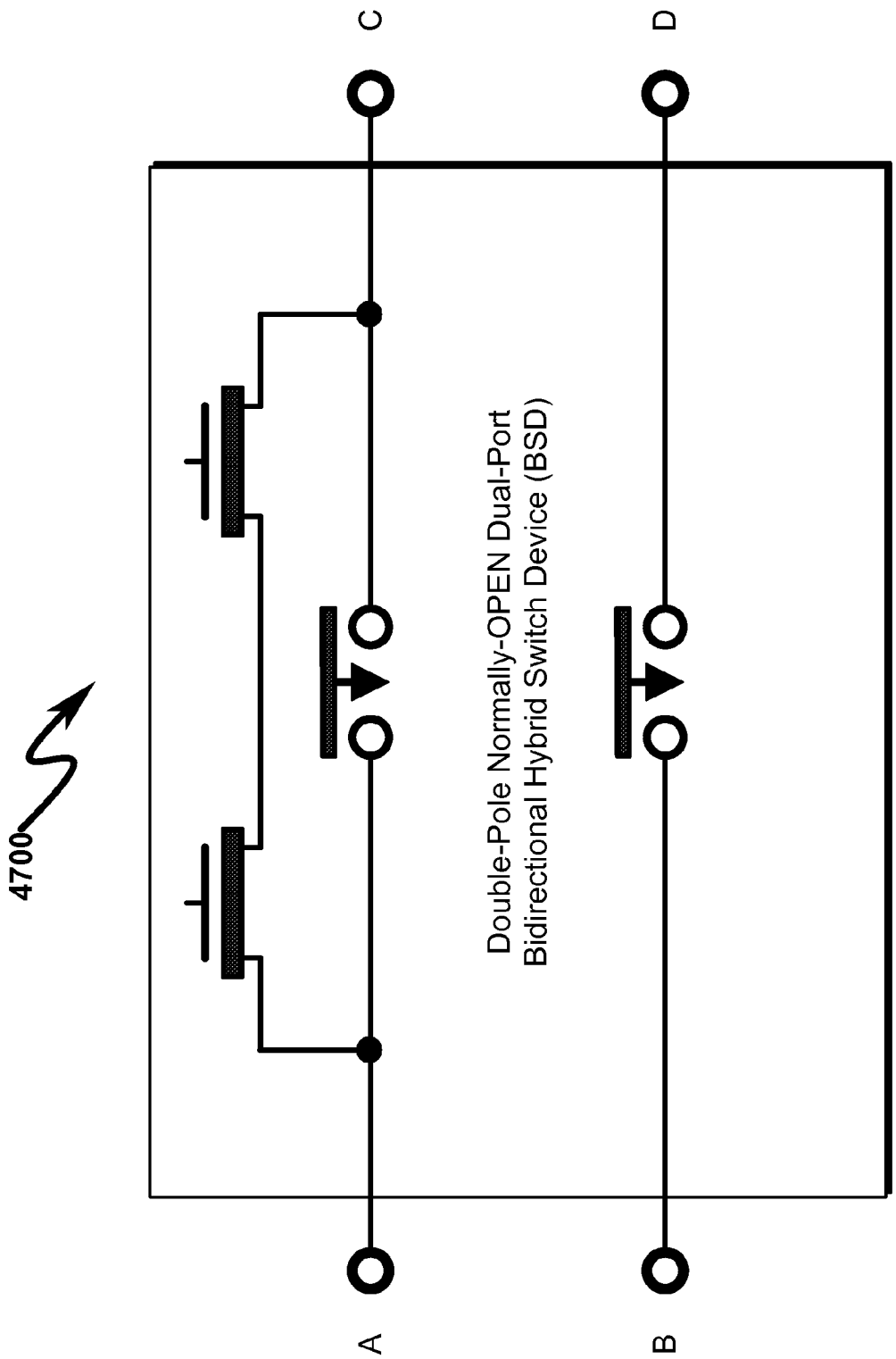
FIG. 47 illustrates a preferred exemplary embodiment of a double-pole normally-OPEN dual-port bidirectional hybrid switch device (BSD)
Figure 48:
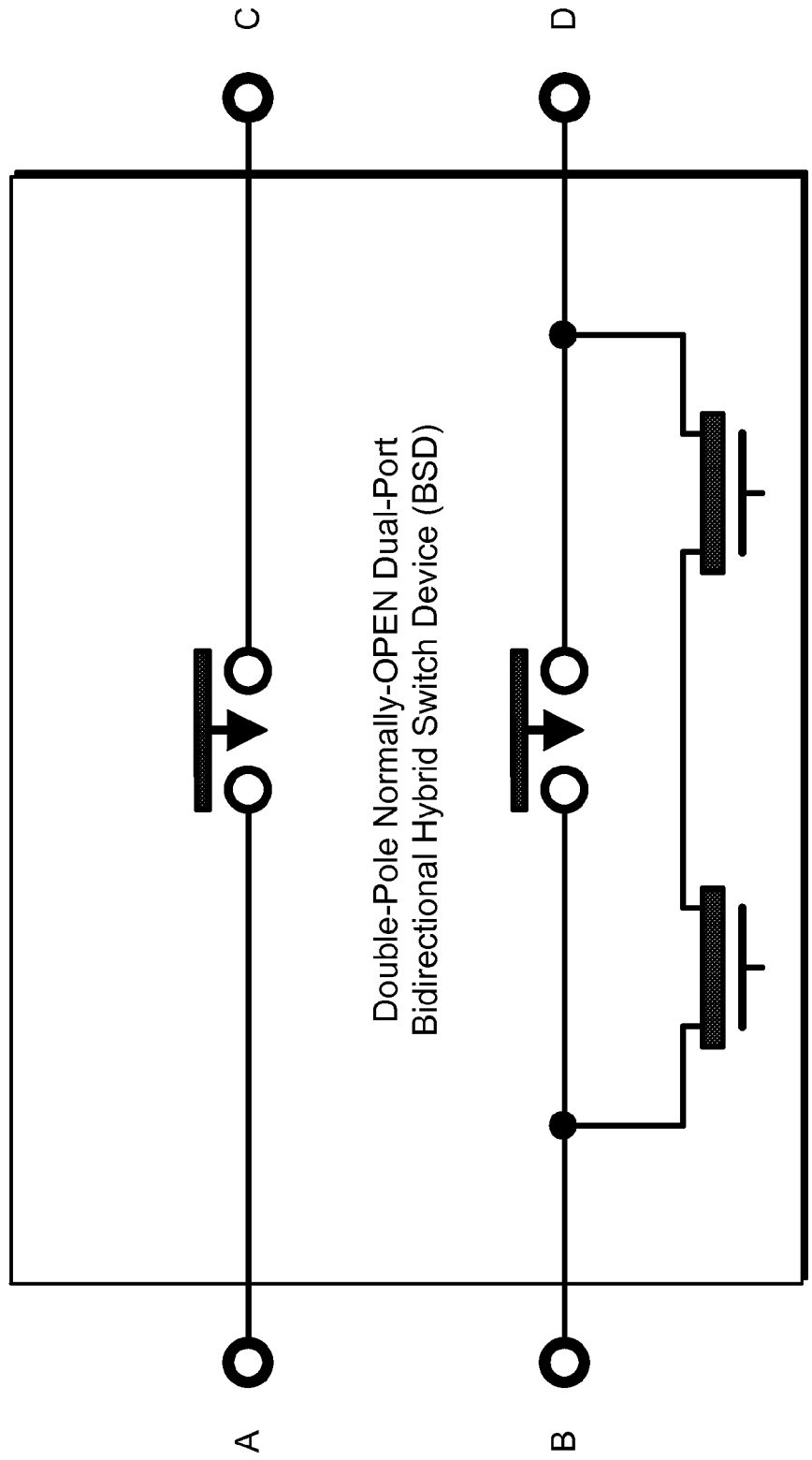
FIG. 48 illustrates a preferred exemplary embodiment of a double-pole normally-OPEN dual-port bidirectional hybrid switch device (BSD)
Figure 49:
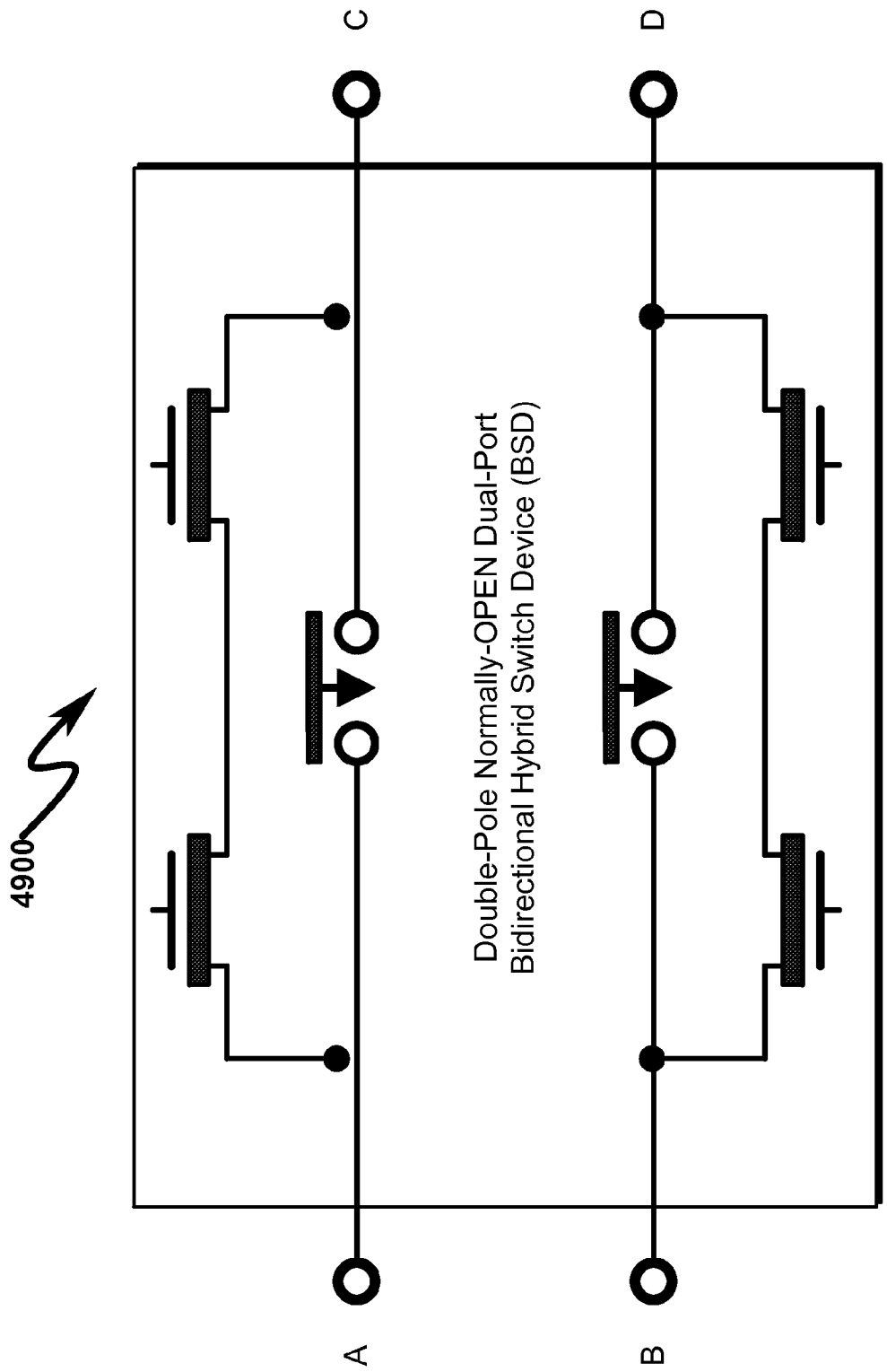
FIG. 49 illustrates a preferred exemplary embodiment of a double-pole normally-OPEN dual-port bidirectional hybrid switch device (BSD)
Figure 50:
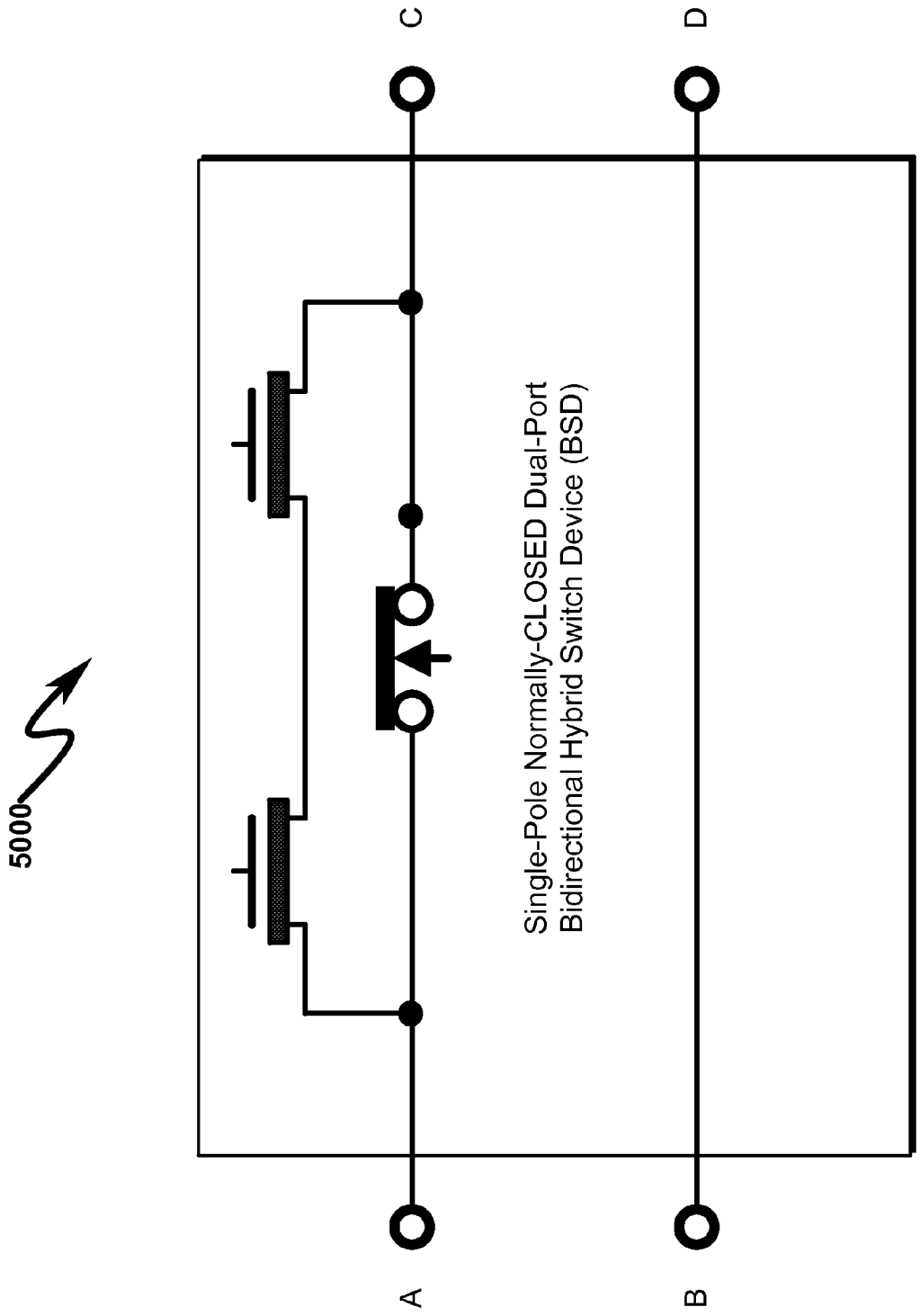
FIG. 50 illustrates a preferred exemplary embodiment of a single-pole normally-CLOSED dual-port bidirectional hybrid switch device (BSD)
Figure 51:
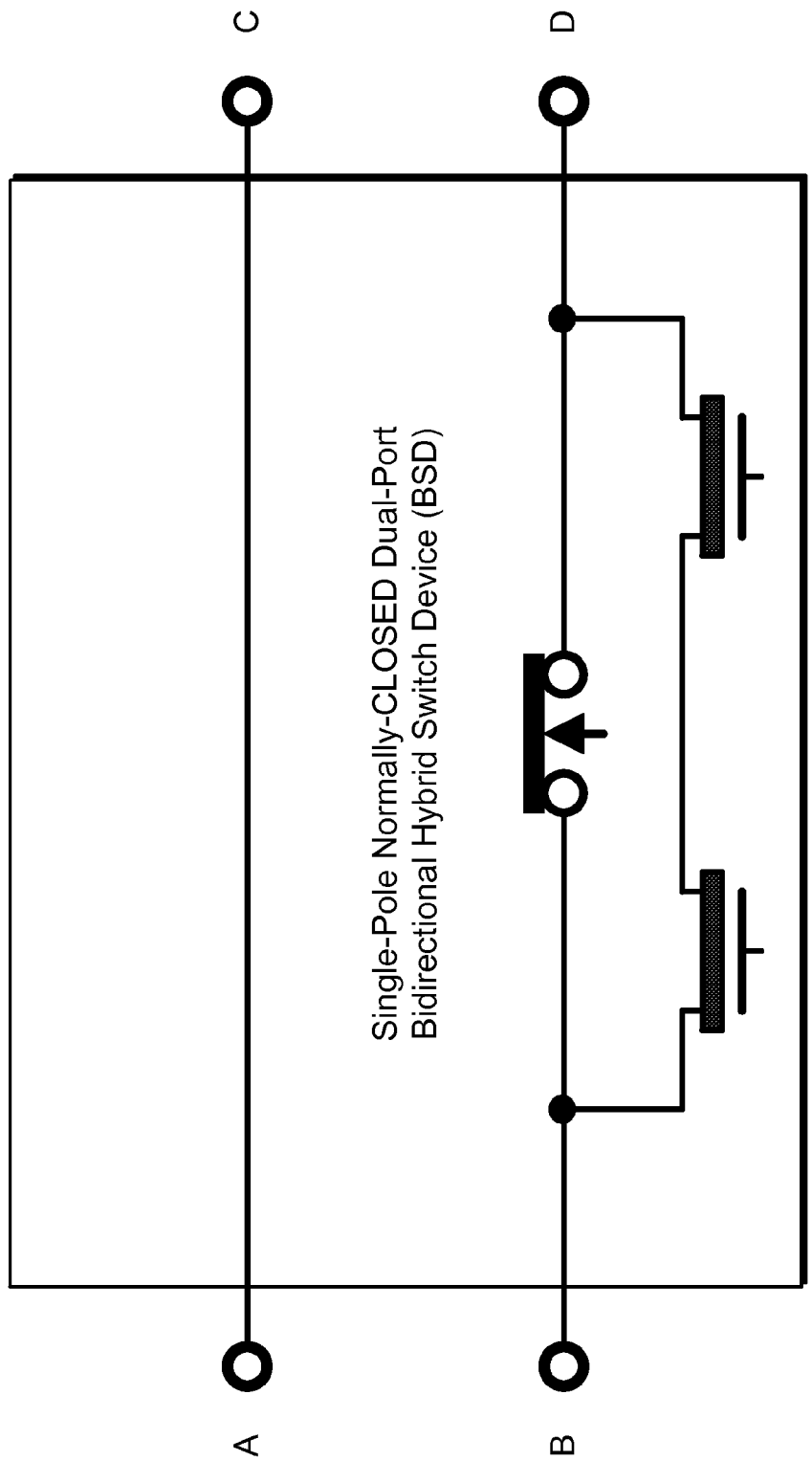
FIG. 51 illustrates a preferred exemplary embodiment of a single-pole normally-CLOSED dual-port bidirectional hybrid switch device (BSD)
Figure 52:
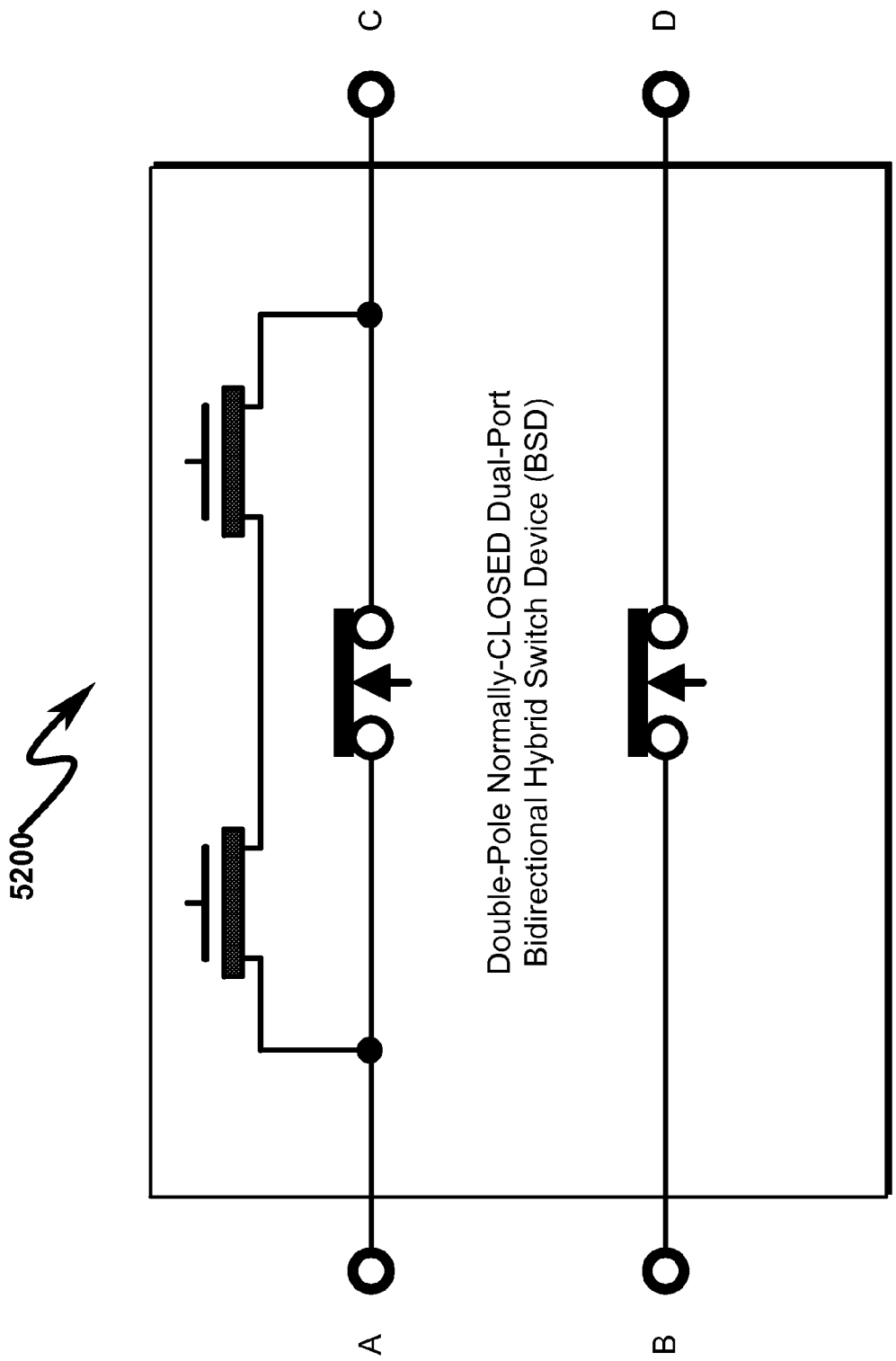
FIG. 52 illustrates a preferred exemplary embodiment of a double-pole normally-CLOSED dual-port bidirectional hybrid switch device (BSD)
Figure 53:
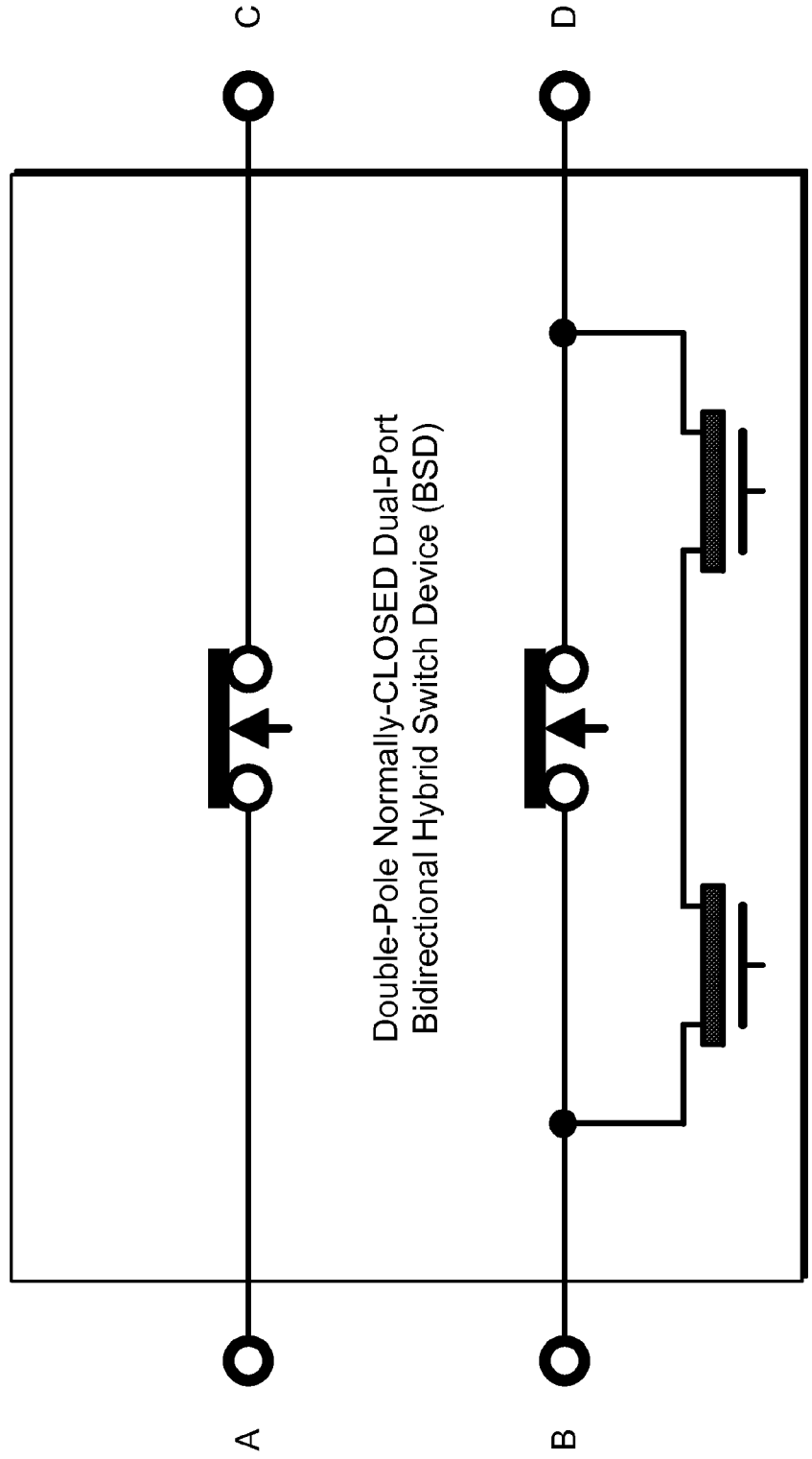
FIG. 53 illustrates a preferred exemplary embodiment of a double-pole normally-CLOSED dual-port bidirectional hybrid switch device (BSD)

The diagrams provided in FIG. 45 (4500)-FIG. 54 (5400) depict a variety of normally-OPEN and normally-CLOSED BSD configurations and some configurations in which the dual-port relay configuration implements a combination of BSD components as well as conventional relay switching (FIG. 47 (4700)-FIG. 48 (4800) and FIG. 52 (5200)-FIG. 53 (5300)).

Exemplary Dual-Input Power Supply with BSD (5700)-(6400)

While a wide variety of invention embodiments is anticipated by the present invention that may incorporate the BSD as described above, several preferred examples will now be provided by way of illustration to teach the scope of the claimed invention. Within each of these examples, a schematic diagram will be provided along with an exemplary timing diagram. All voltage sensing and MOSFET controls are implemented by an operate/release controller (ORC) that is not depicted in these diagrams.

Common-Ground with HSD+BSD 4-NO+8 MOSFETS (5700)-(5800)

Figure 57:
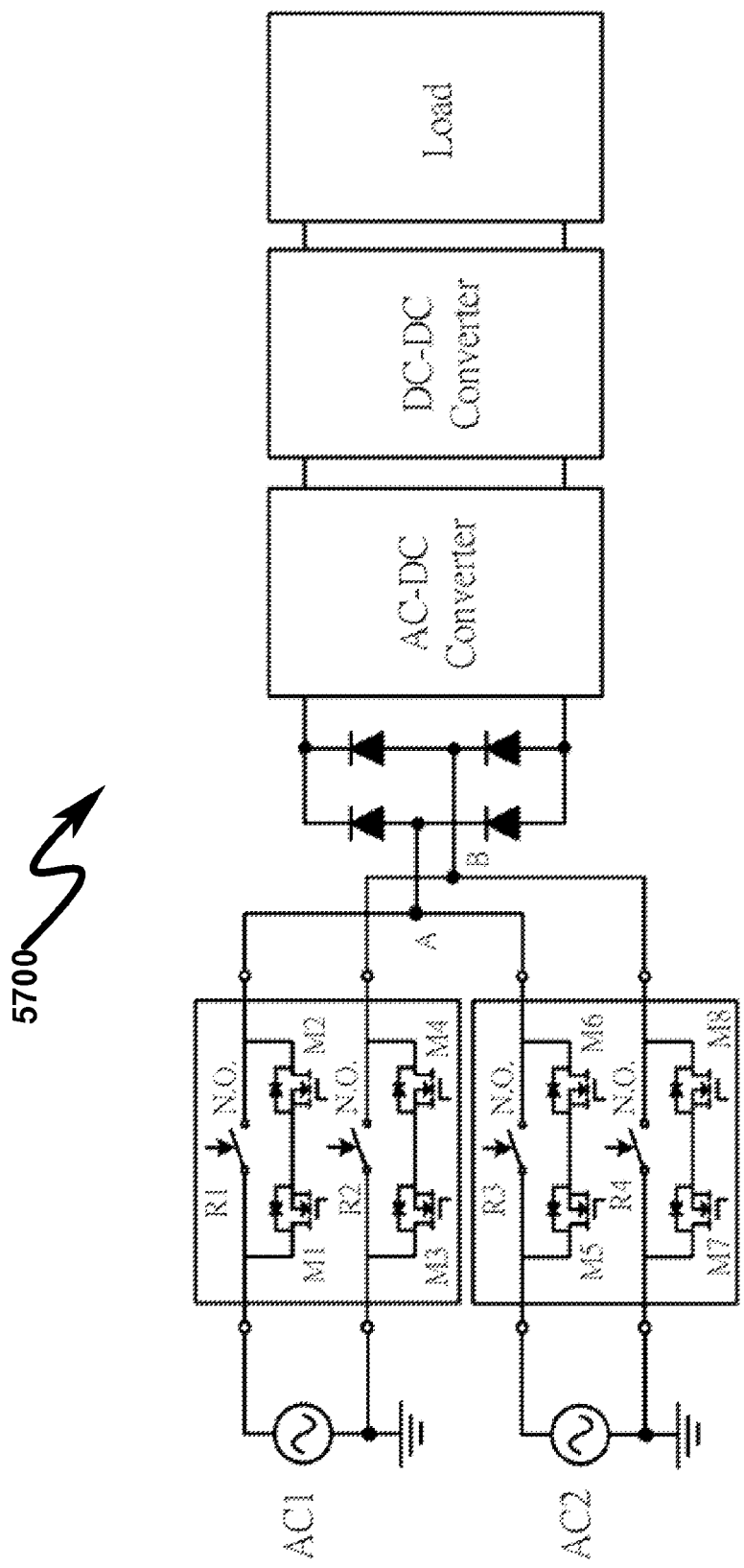
FIG. 57 illustrates a schematic depicting a preferred exemplary invention embodiment common-ground dual-input power supply comprising a HSD having four normally-open relays and eight MOSFETs configured as a bidirectional switch device (BSD)
Figure 58:
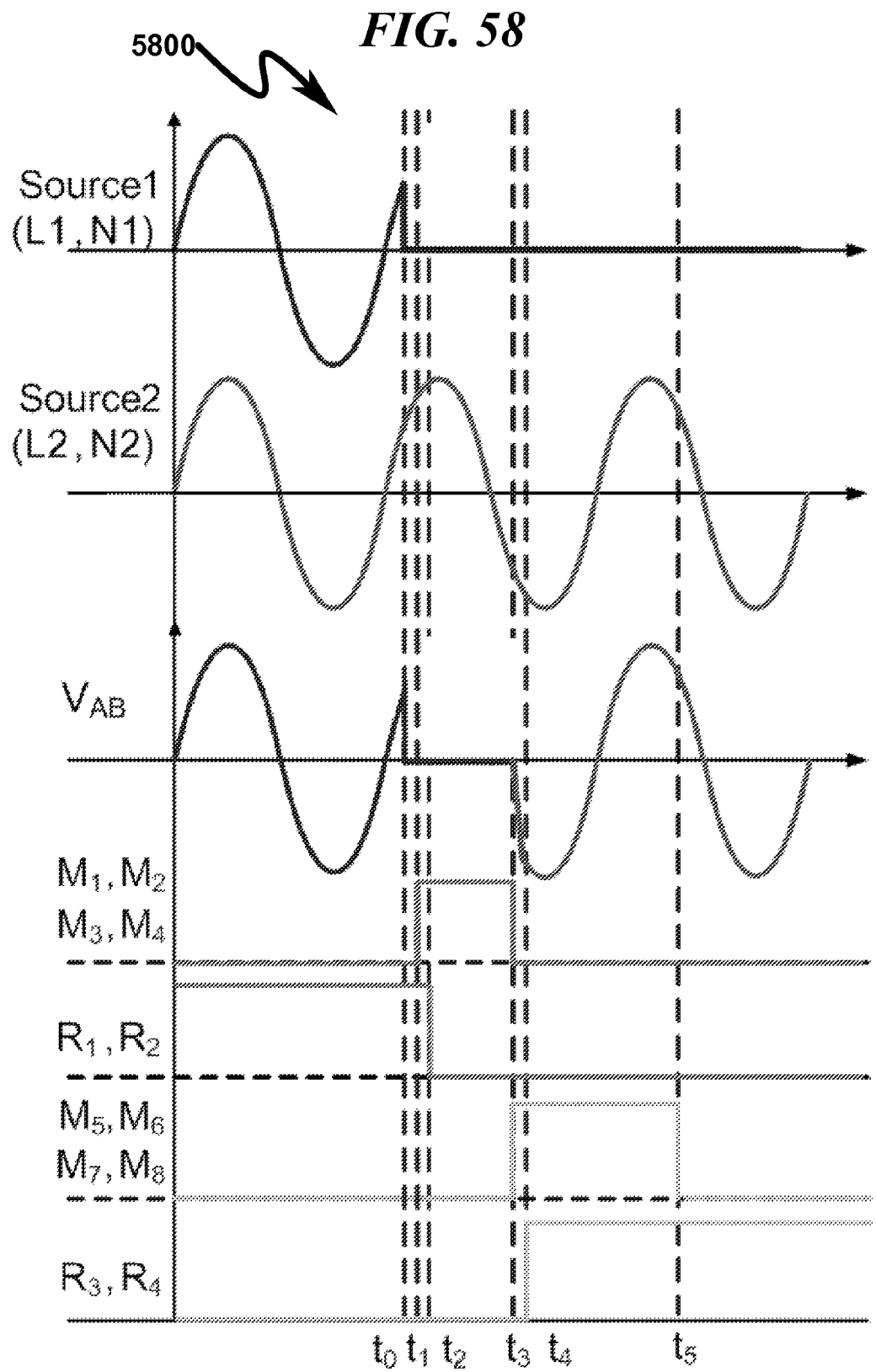
FIG. 58 illustrates a timing diagram of a preferred exemplary invention embodiment common-ground dual-input power supply comprising a HSD having four normally-open relays and eight MOSFETs configured as a bidirectional switch device (BSD)

FIG. 57 (5700) depicts a common-ground dual-input power supply with four normally-open relays and eight MOSFETs. FIG. 58 (5800) depicts key waveforms of the dual-input power supply with four normally-open relays and eight BSD-configured MOSFETs. The applicable timing states are as follows:

| Item | Description |
| --- | --- |
| $t_0$-$t_1$ | MCU Operation Time |
| $t_1$-$t_2$ | Delay Time for Inrush Current Limiter |
| $t_2$-$t_3$ | Relay Release Time |
| $t_3$-$t_4$ | Delay Time for Inrush Current Limiter |
| $t_4$-$t_5$ | Relay Operate Time |

At $t=t_0$, the source AC1 has failed. The voltage $V_{AB}$ has dropped to zero.

At $t=t_1$, the MOSFETs $M_1$+$M_2$ and $M_3$+$M_4$ are turned on, which will allow the relay to have a zero-voltage cut-off.

At $t=t_2$, the relay $R_1$ and $R_2$ are turned off. The time of $t_2$ to $t_3$ is determined by the RELEASE time for the relay.

At $t=t_3$, the MOSFETs $M_5$+$M_6$ and $M_7$+$M_8$ are turned on, which will allow the relay to have a zero-voltage turn-on.

At $t=t_4$, relays $R_3$ and $R_4$ are turned on. The time of $t_4$ to $t_5$ is determined by the OPERATE time for the relay.

Common-Ground with HSD+BSD 2-NO+2-NC+8 MOSFETS (5900)-(6000)

Figure 59:
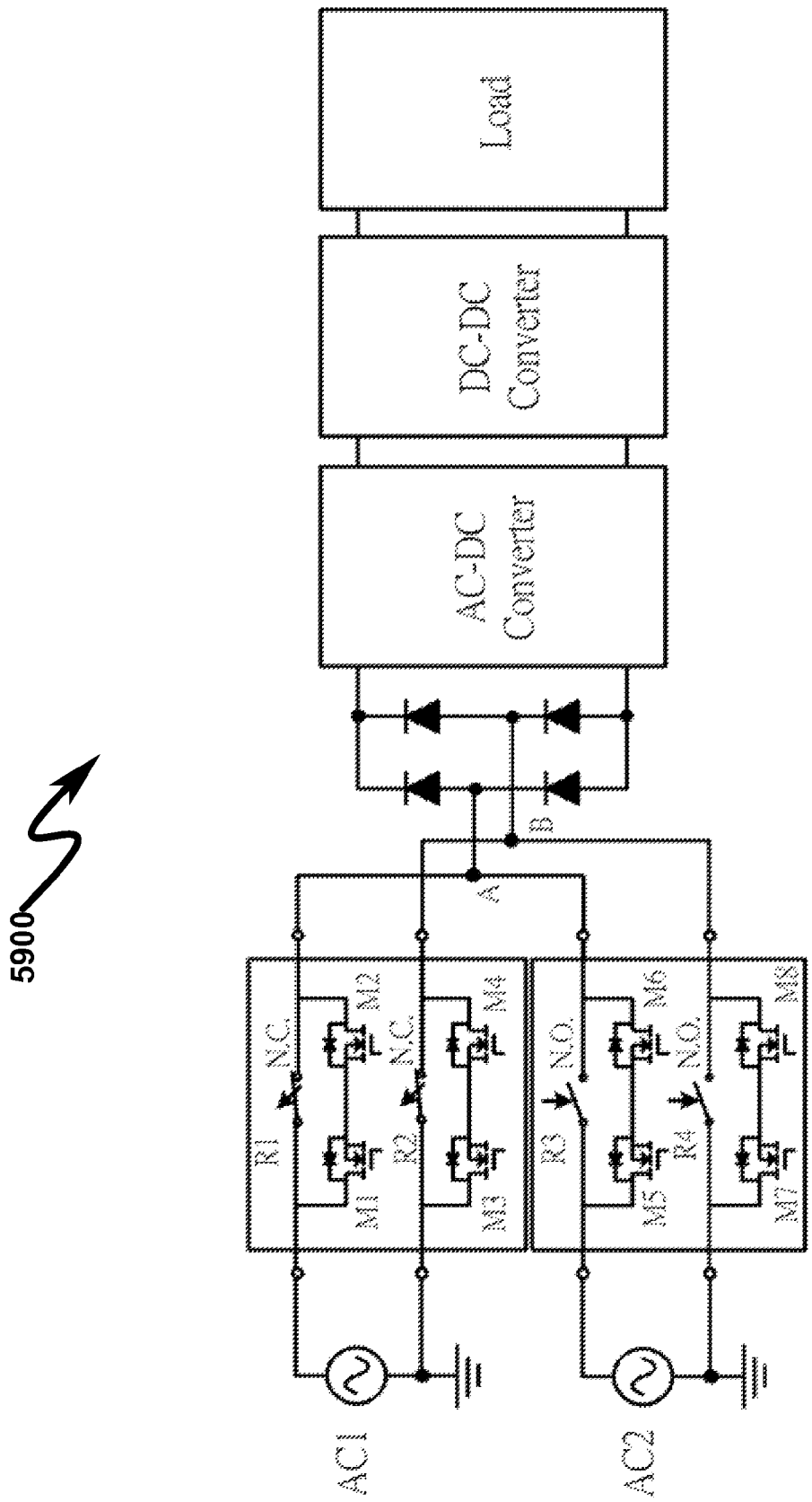
FIG. 59 illustrates a schematic depicting a preferred exemplary invention embodiment common-ground dual-input power supply comprising a HSD having two normally-open relays, two normally-closed relays, and eight MOSFETs configured as a bidirectional switch device (BSD)
Figure 60:
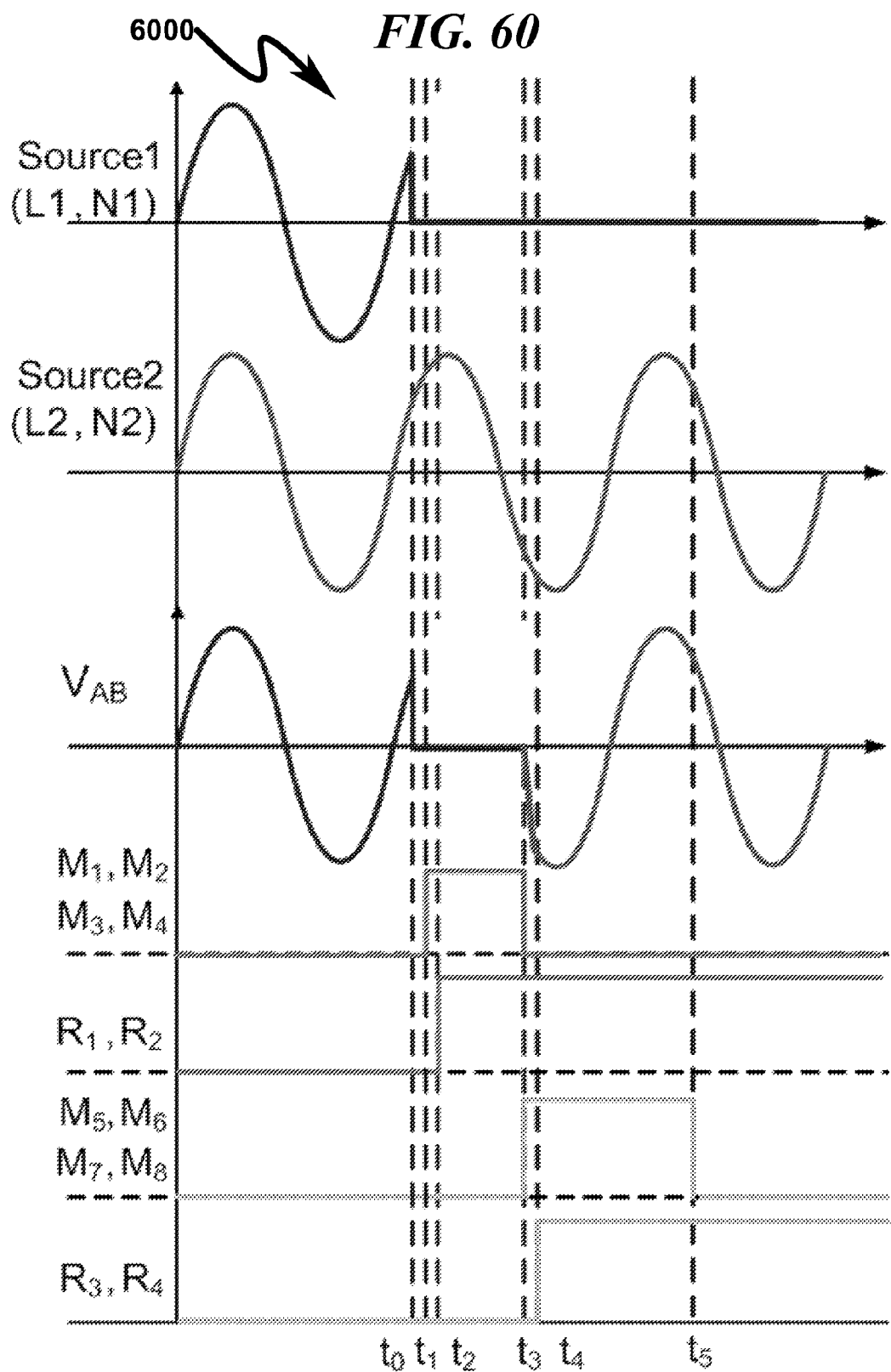
FIG. 60 illustrates a timing diagram of a preferred exemplary invention embodiment common-ground dual-input power supply comprising a HSD having two normally-open relays, two normally-closed relays, and eight MOSFETs configured as a bidirectional switch device (BSD)

FIG. 59 (5900) depicts a common-ground dual-input power supply with two normally-open relays, two normally-closed relays, and eight MOSFETs. FIG. 60 (6000) depicts key waveforms of the dual-input power supply with two normally-open relays, two normally-closed relays, and eight BSD-configured MOSFETs. The applicable timing states are as follows:

| Item | Description |
| --- | --- |
| $t_0$-$t_1$ | MCU Operation Time |
| $t_1$-$t_2$ | Delay Time for Inrush Current Limiter |
| $t_2$-$t_3$ | Relay Release Time |
| $t_3$-$t_4$ | Delay Time for Inrush Current Limiter |
| $t_4$-$t_5$ | Relay Operate Time |

At $t=t_0$, the source AC1 has failed. The voltage $V_{AB}$ has dropped to zero.

At $t=t_1$, the MOSFETs $M_1$+$M_2$ and $M_3$+$M_4$ are turned on, which will allow the relay to have a zero-voltage cut-off.

At $t=t_2$, the relay $R_1$ and $R_2$ are turned off. The time of $t_2$ to $t_3$ is determined by the RELEASE time for the relay.

At $t=t_3$, the MOSFETs $M_5$+$M_6$ and $M_7$+$M_8$ are turned on, which will allow the relay to have a zero-voltage turn-on.

At $t=t_4$, relays $R_3$ and $R_4$ are turned on. The time of $t_4$ to $t_5$ is determined by the OPERATE time for the relay.

DC-Backup with HSD+BSD 2-NO+4 MOSFETS (6100)-(6200)

Figure 61:
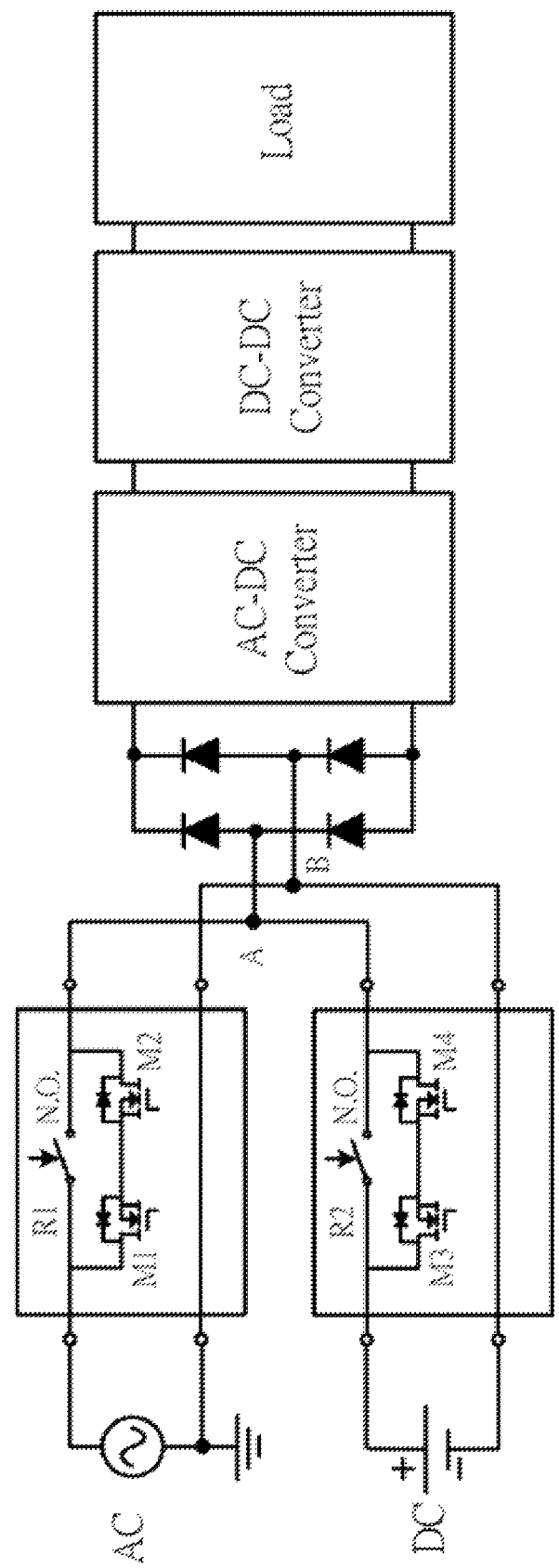
FIG. 61 illustrates a schematic depicting a preferred exemplary invention embodiment DC-backup dual-input power supply comprising a HSD having two normally-open relays and four MOSFETs configured as a bidirectional switch device (BSD)
Figure 62:
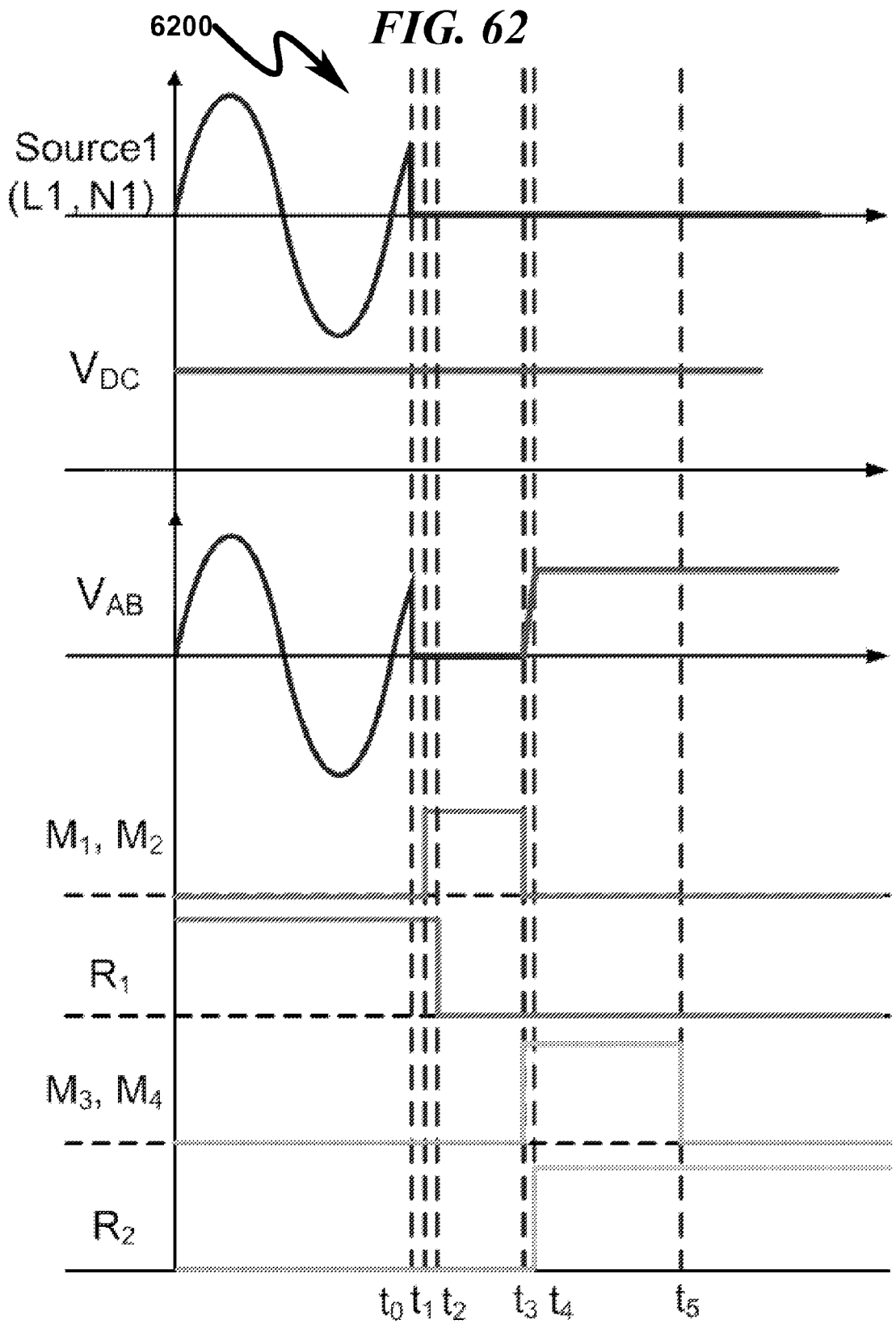
FIG. 62 illustrates a timing diagram of a preferred exemplary invention embodiment DC-backup dual-input power supply comprising a HSD having two normally-open relays and four MOSFETs configured as a bidirectional switch device (BSD)

FIG. 61 (6100) depicts a DC-backup dual-input power supply with two normally-open relays and four MOSFETs. FIG. (6200) depicts key waveforms of the dual-input power supply with two normally-open relays and four BSD-configured MOSFETs. The applicable timing states are as follows:

| Item | Description |
| --- | --- |
| $t_0$-$t_1$ | MCU Operation Time |
| $t_1$-$t_2$ | Delay Time for Inrush Current Limiter |
| $t_2$-$t_3$ | Relay Release Time |
| $t_3$-$t_4$ | Relay Operate Time |

At $t=t_0$, the source AC1 has failed. The voltage $V_{AB}$ has dropped to zero.

At $t=t_1$, the MOSFETs $M_1$ and $M_2$ are turned on, which will allow the relays to have a zero-voltage turn-on and cut-off.

At $t=t_2$, the relay $R_1$ is turned off and relay $R_2$ is turned on. The time of $t_2$ to $t_3$ is determined by the RELEASE time for the relay.

At $t=t_3$, the MOSFET $M_1$ is turned off.

At $t=t_4$, the MOSFET $M_2$ is turned off. The time of $t_3$ to $t_4$ is determined by the OPERATE time for the relay.

DC-Backup with HSD+BSD 1-NO+1-NC+4 MOSFETS (6300)-(6400)

Figure 63:
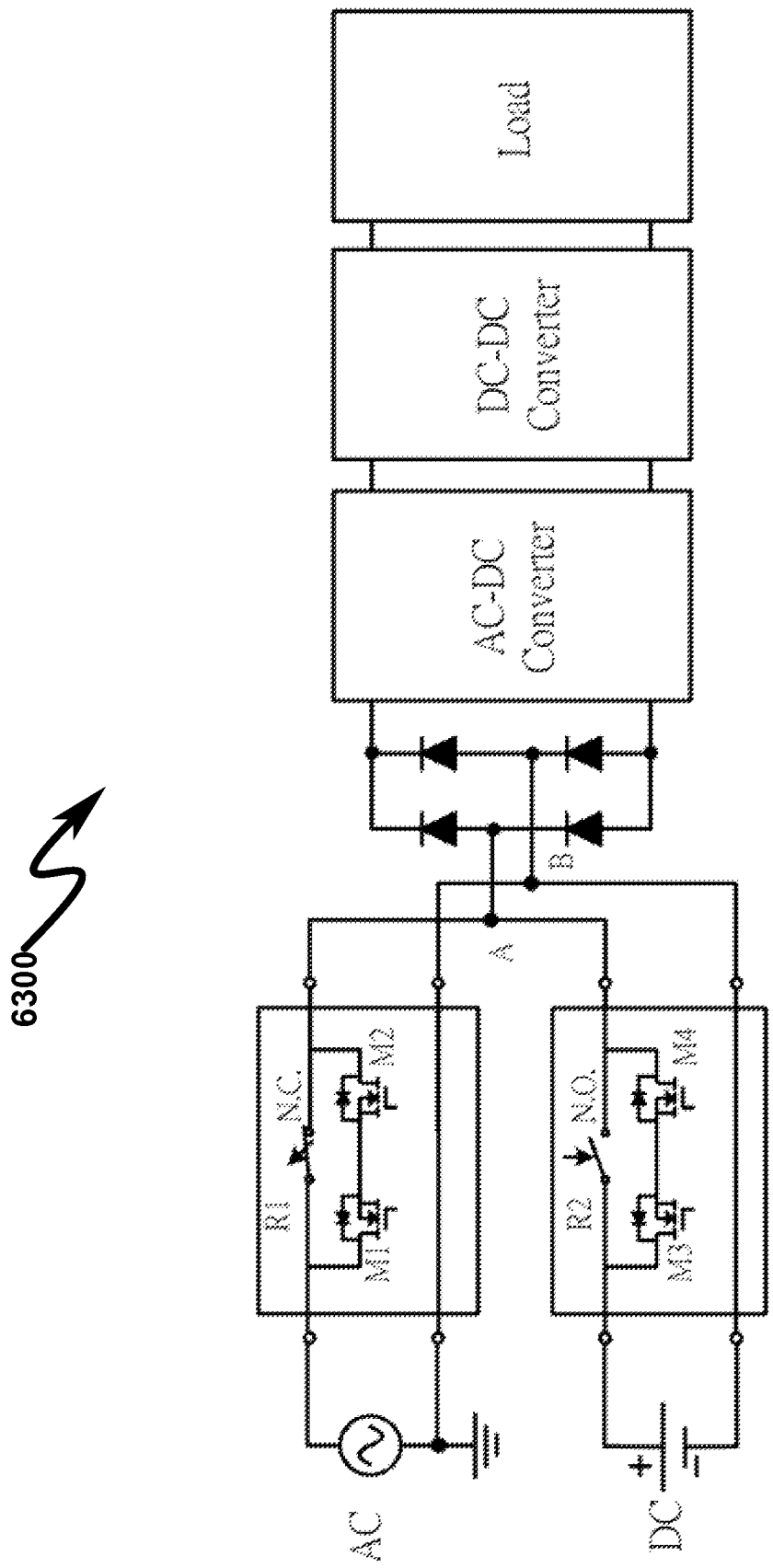
FIG. 63 illustrates a schematic depicting a preferred exemplary invention embodiment DC-backup dual-input power supply comprising a HSD having a normally-open relay, a normally-closed relay, and four MOSFETs configured as a bidirectional switch device (BSD)
Figure 64:
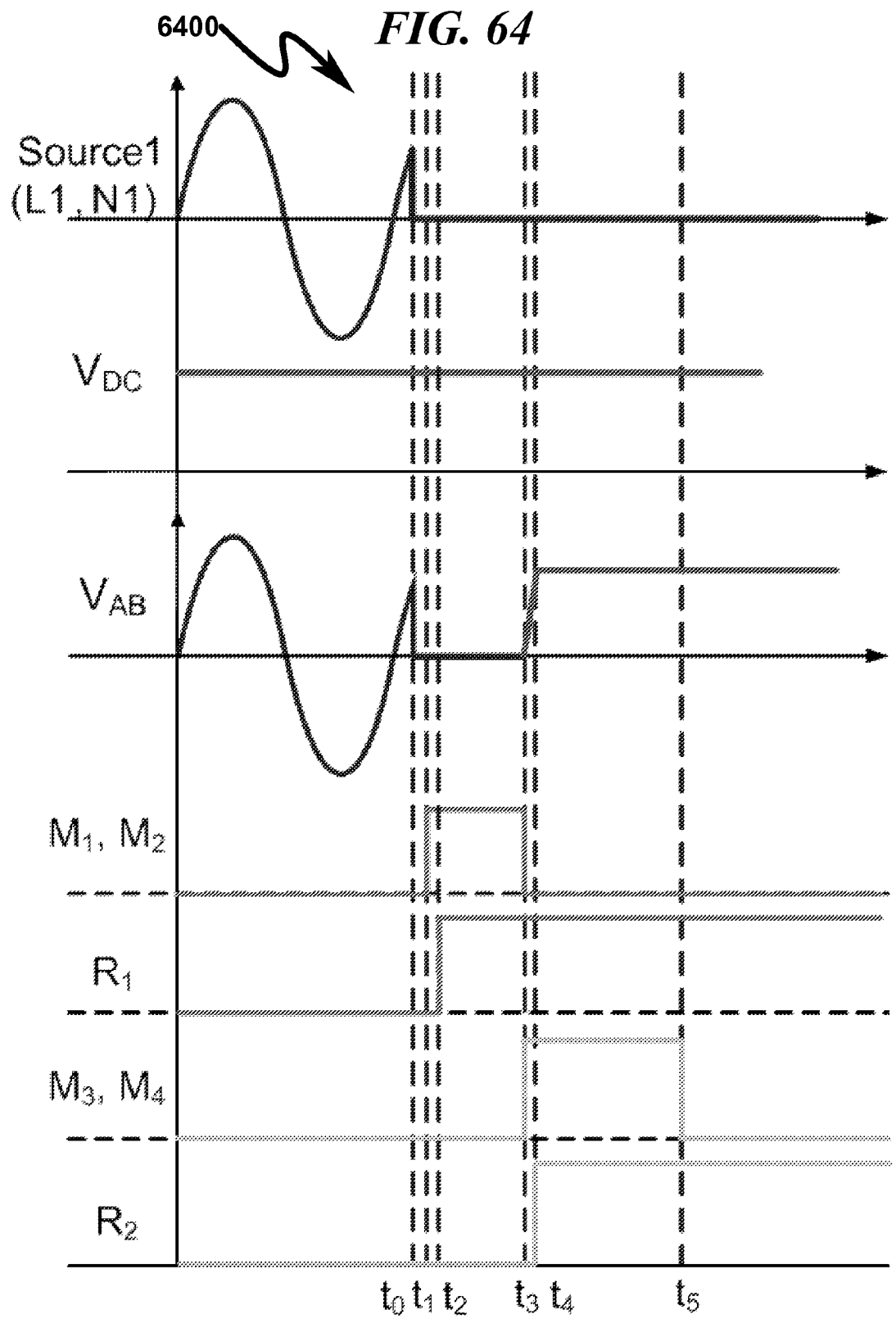
FIG. 64 illustrates a timing diagram of a preferred exemplary invention embodiment DC-backup dual-input power supply comprising a HSD having a normally-open relay, a normally-closed relay, and four MOSFETs configured as a bidirectional switch device (BSD)

FIG. 63 (6300) depicts a DC-backup dual-input power supply with one normally-open relay, one normally-closed relay, and four MOSFETs. FIG. 64 (6400) depicts key waveforms of the dual-input power supply with one normally-open relay, one normally-closed relay, and four BSD-configured MOSFETs. The applicable timing states are as follows:

| Item | Description |
| --- | --- |
| $t_0$-$t_1$ | MCU Operation Time |
| $t_1$-$t_2$ | Delay Time for Inrush Current Limiter |
| $t_2$-$t_3$ | Relay Release Time |
| $t_3$-$t_4$ | Relay Operate Time |

At $t=t_0$, the source AC1 has failed. The voltage $V_{AB}$ has dropped to zero.

At $t=t_1$, the MOSFETs $M_1$+$M_2$ and $M_3$+$M_4$ are turned on, which will allow the relays to have a zero-voltage turn-on and cut-off.

At $t=t_2$, the relay $R_1$ is turned on and relay $R_2$ is turned on. The time of $t_2$ to $t_3$ is determined by the RELEASE time for the relay.

At $t=t_3$, the MOSFETs $M_1$+$M_2$ are turned off.

At $t=t_4$, the MOSFETs $M_3$+$M_4$ are turned off. The time of $t_3$ to $t_4$ is determined by the OPERATE time for the relay.

Exemplary Common Ground Switching Method (6500)-(7200)

While a variety of primary/secondary switching methodologies are anticipated using the system hardware described herein, several methodologies are preferred when the PPS and SPS system have a common ground. One such methodology will now be discussed in terms of an exemplary system embodiment as generally depicted in FIG. 65 (6500), the associated timing diagram depicted in FIG. 66 (6600), and the flowcharts of FIG. 67 (6700)-FIG. 72 (7200).

Hardware Configuration Context (6500)

Figure 65:
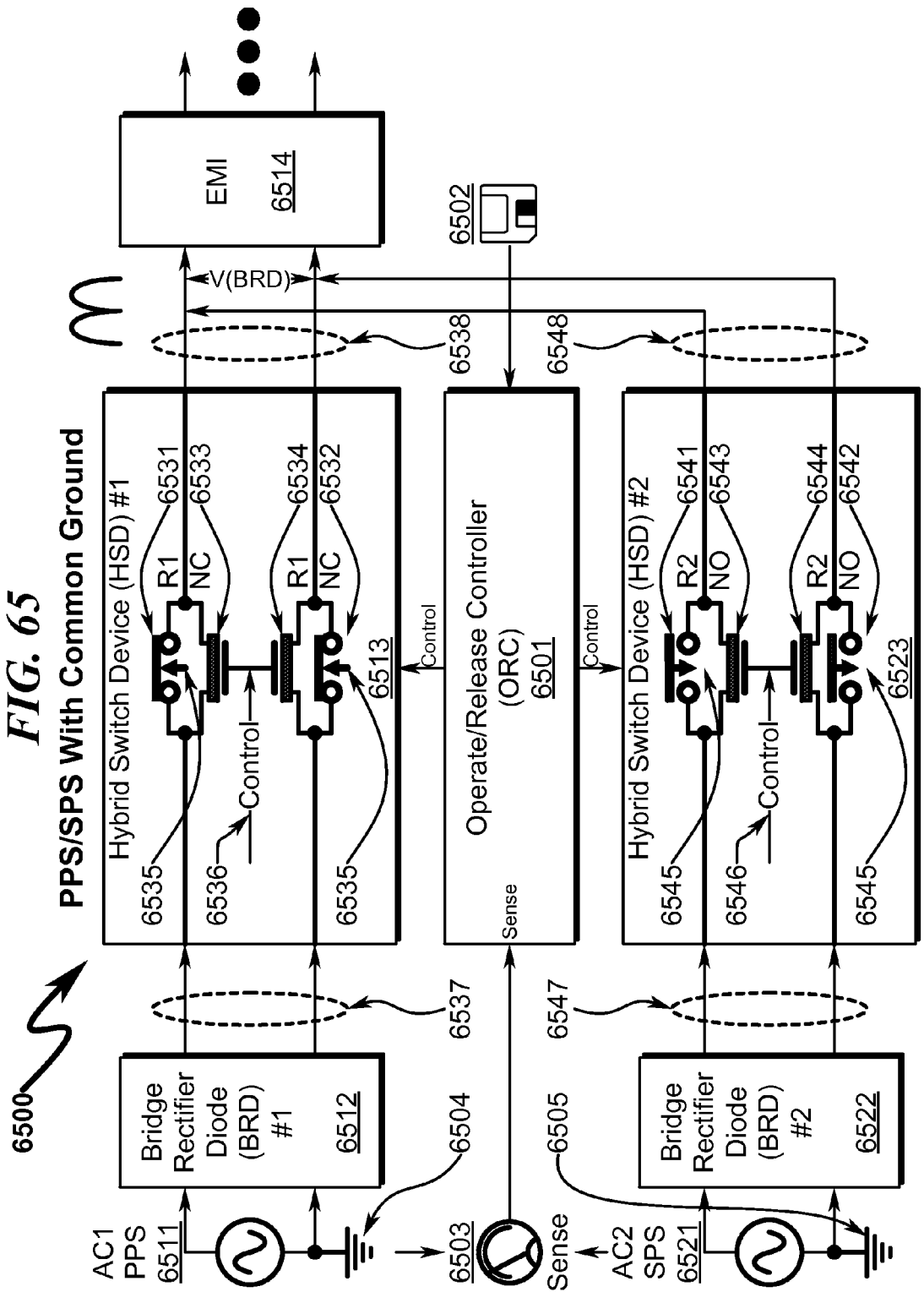
FIG. 65 illustrates a block diagram of a preferred exemplary invention embodiment wherein the PPS and SPS have a common ground.

Referencing FIG. 65 (6500), the exemplary system context in which the switching method is applied consists of a primary AC power source (AC1/PPS) (6511) and a secondary AC power source (AC2/SPS) (6521) having a common ground connection (6504, 6505) that feed individual bridge rectifier diode structures (6512, 6522) whose output is individually switched by a primary hybrid switch device (PHS) (6513) and a secondary hybrid switch device (SHS) (6523) under control of an operate/release controller (ORC) (6501) that may execute instructions read from a computer-readable medium (6502) based on sense inputs (6503) from the PPS (6511) and SPS (6521) power sources.

The HSD structures (6513, 6523) depicted incorporate switched contacts for both ports of the dual port (4-wire) connections between the HSD input port (6537, 6547) and HSD output ports (6538, 6548). The switched contacts in this example each incorporate primary electromagnetic relays (PER) (6531, 6532) and secondary electromagnetic relays (SER) (6541, 6542) in parallel with primary/secondary (PSD/SSD) semiconductor switching devices (6533, 6534, 6543, 6544). PER/SER control (6535, 6545) and PSD/SSD control (6536, 6546) are provided by the operate/release controller (ORC) (6501) (under control of machine instructions retrieved from the machine-readable media (6502)) and timed based on inputs from sensing (6503) of the PPS (6511) and SPS (6521) state.

Timing Diagram (6600)

Figure 66:
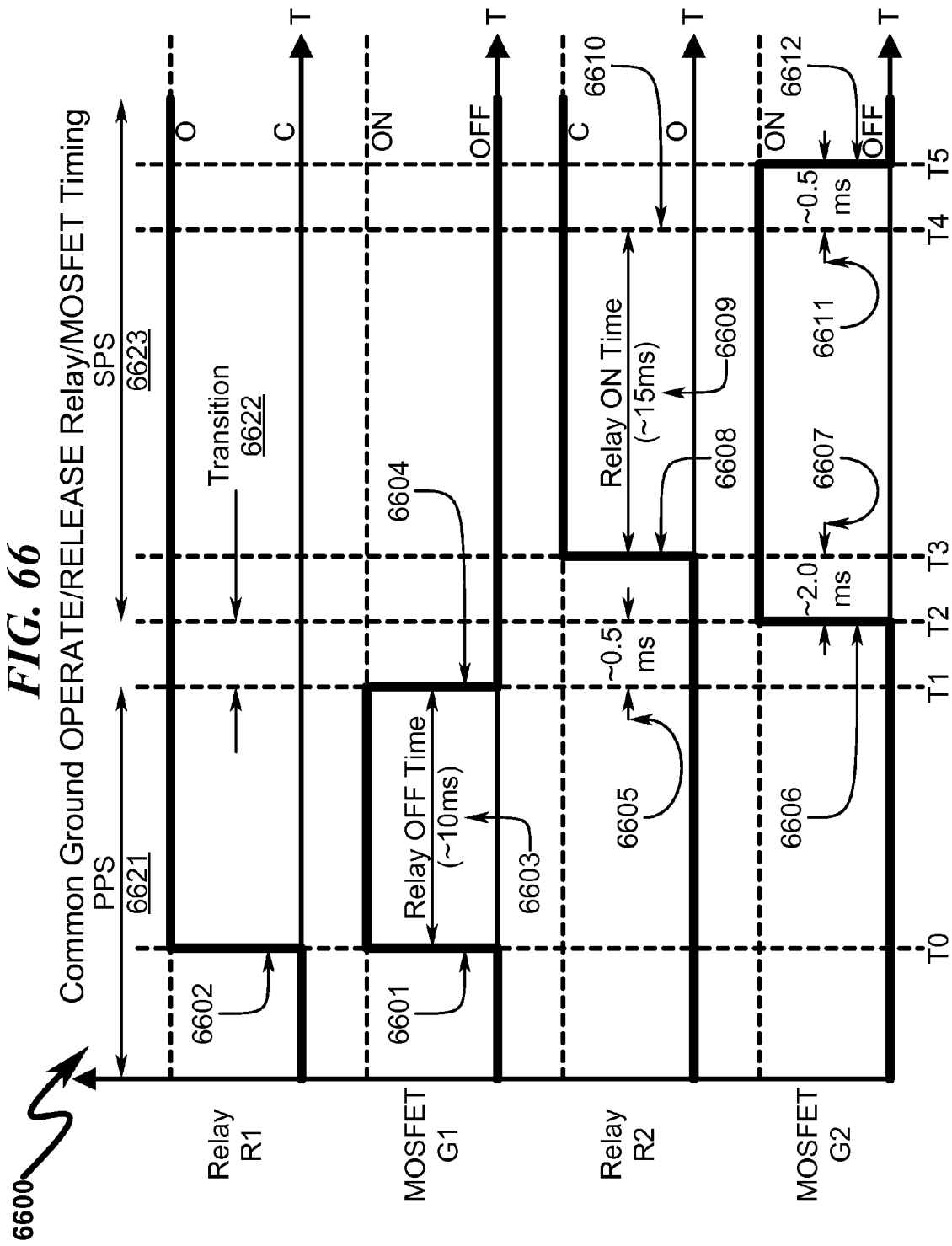
FIG. 66 illustrates a timing diagram of a preferred exemplary invention embodiment wherein the PPS and SPS have a common ground.

Referencing the timing diagram of FIG. 66 (6600), it can be seen that in this configuration the system is configured in a PPS-to-SPS transition to first supply power from the PPS (6621), followed by a transition zone (6622) in which neither the PPS nor SPS supplies power, followed by a period in which power is sourced from the SPS (6623). In the event of a PPS power failure the PSD is first activated at T0 (6601). Simultaneously or subsequently the relay R1 is activated (6602) (to transition relay R1 from normally CLOSED to OPEN state). A delay is incorporated (6603) to permit the relay R1 to transition from CLOSED to OPEN. At this point, the PSD is deactivated at T1 (6604) and a delay (6605) is incorporated to ensure that it is fully OFF before transitioning to SSP power. After the PSD delay (6605) expires, the SSD device is activated at T2 (6606) and a delay (6607) is incorporated to ensure conduction of the SSD device is operational before the SPS power source is activated. Once the SSD delay (6607) has expired, relay R1 is activated at T3 (6608) (to transition from a normally OPEN state to a CLOSED state) to activate the SPS power source. A R2 relay activation delay (6609) is incorporated to allow time for the R2 relay to actually complete contact and settle any contact bounce activity. After the R2 relay activation delay (6609) has expired at T4 (6610), a SSD overlap delay (6611) is incorporated to ensure an overlap of conduction between the R2 relay and the SSD. Once the SSD overlap delay (6611) has expired, the SSD is deactivated at T5 (6612) and conduction occurs solely using the R2 relay contacts. While the PPS-to-SPS transition sequence has been illustrated, one skilled in the art will recognize that the SPS-to-PPS transition is simply the reverse of this operational sequence and that exemplary transition times illustrated may vary widely based on application context.

Method Flowchart (6700)-(7200)

Figure 67:
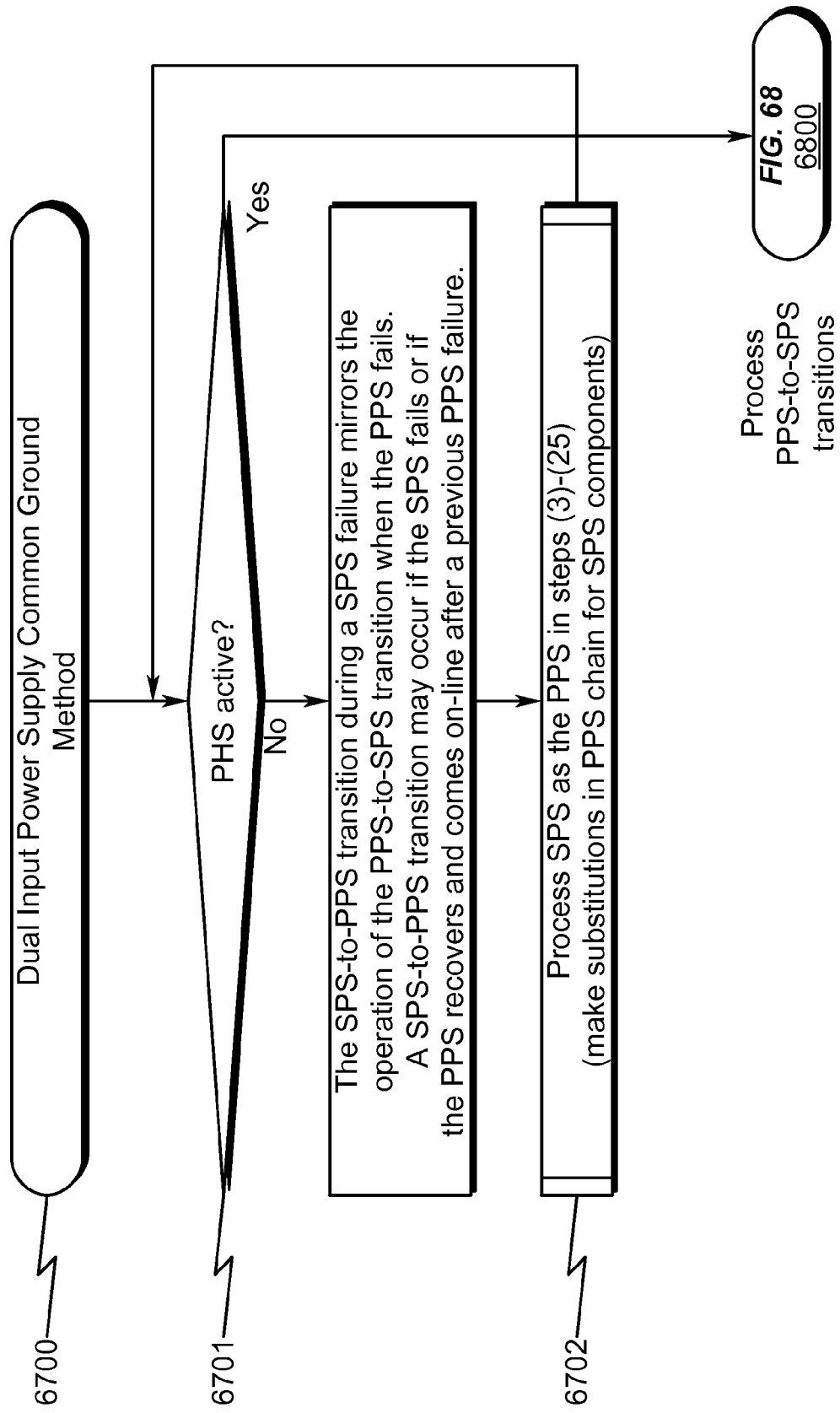
FIG. 67 illustrates a main flowchart depicting the operation of a preferred exemplary invention method embodiment wherein the PPS and SPS have a common ground.
Figure 68:
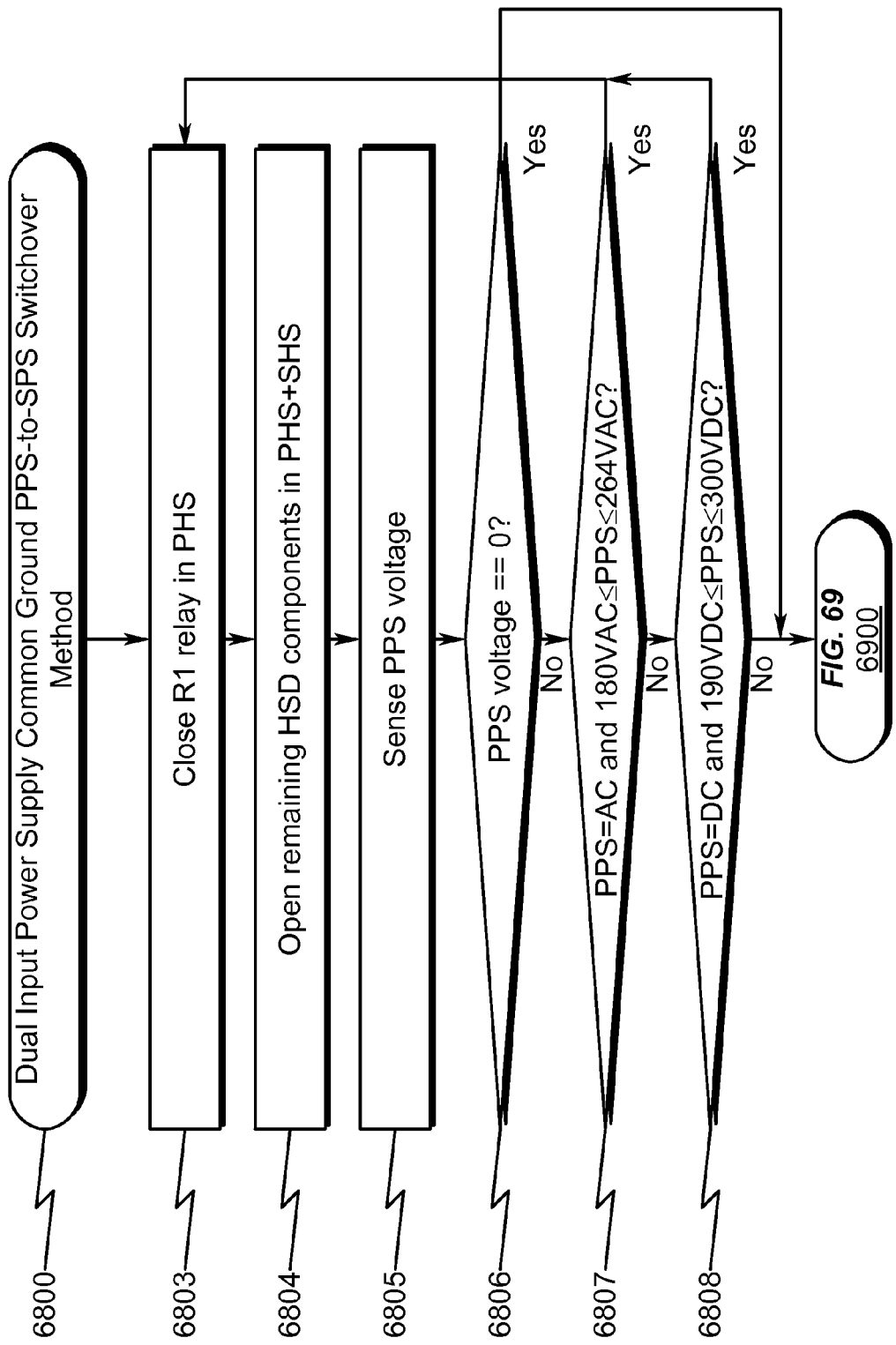
FIG. 68 illustrates a PPS-to-SPS switchover flowchart depicting the operation of a preferred exemplary invention method embodiment wherein the PPS and SPS have a common ground.
Figure 69:
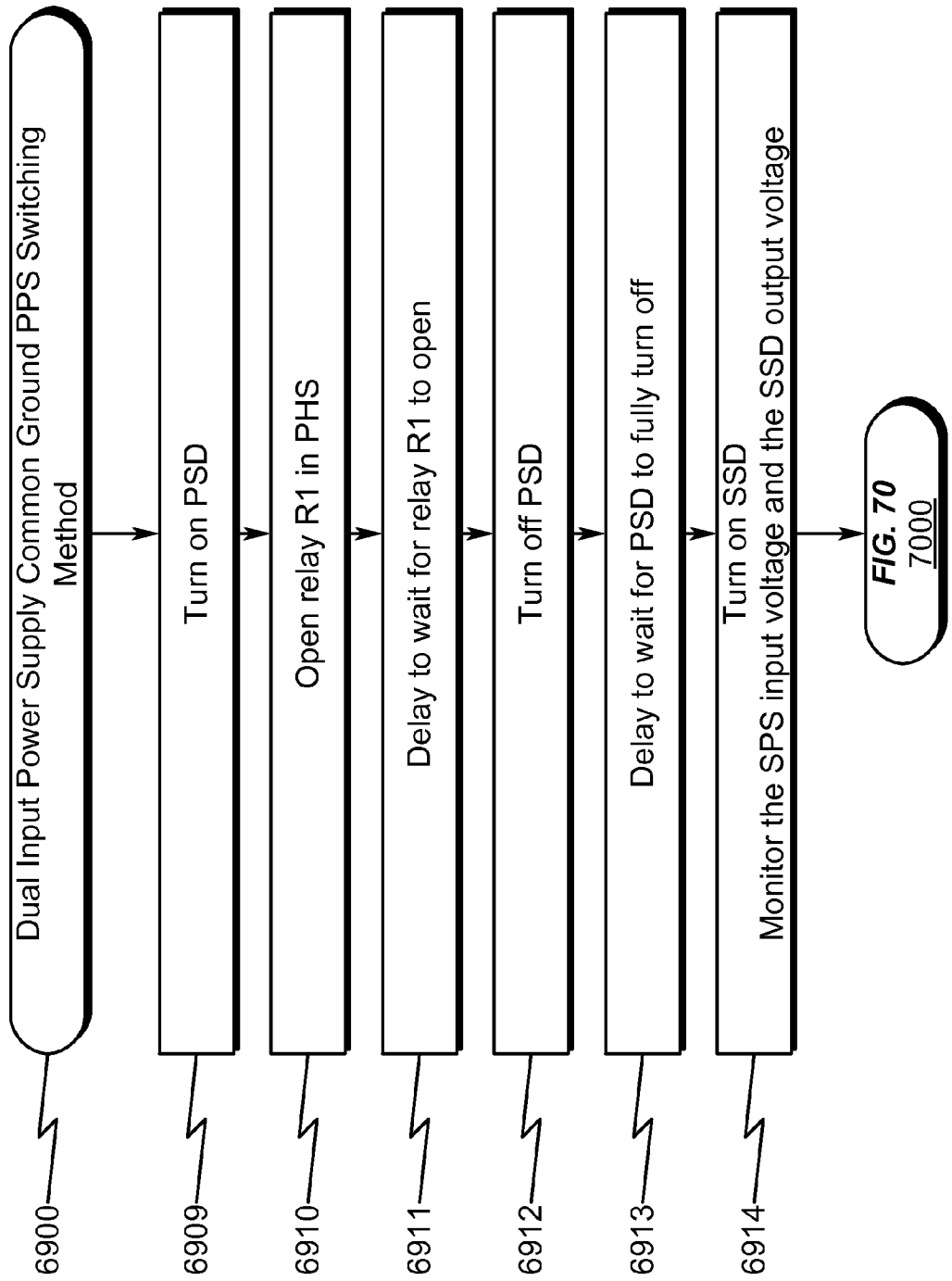
FIG. 69 illustrates a PPS switching flowchart depicting the operation of a preferred exemplary invention method embodiment wherein the PPS and SPS have a common ground.
Figure 70:
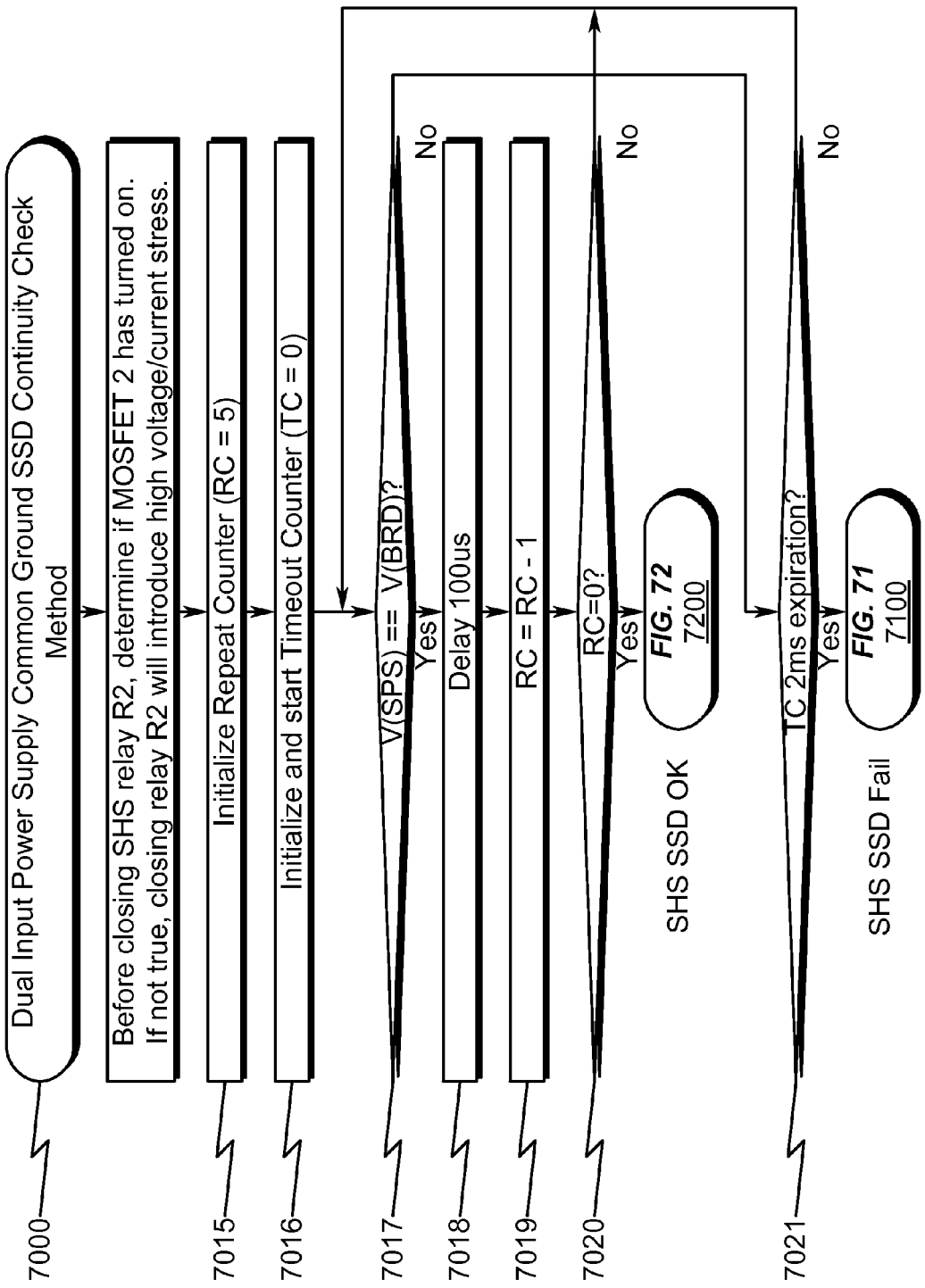
FIG. 70 illustrates a SSD continuity check flowchart depicting the operation of a preferred exemplary invention method embodiment wherein the PPS and SPS have a common ground.
Figure 71:
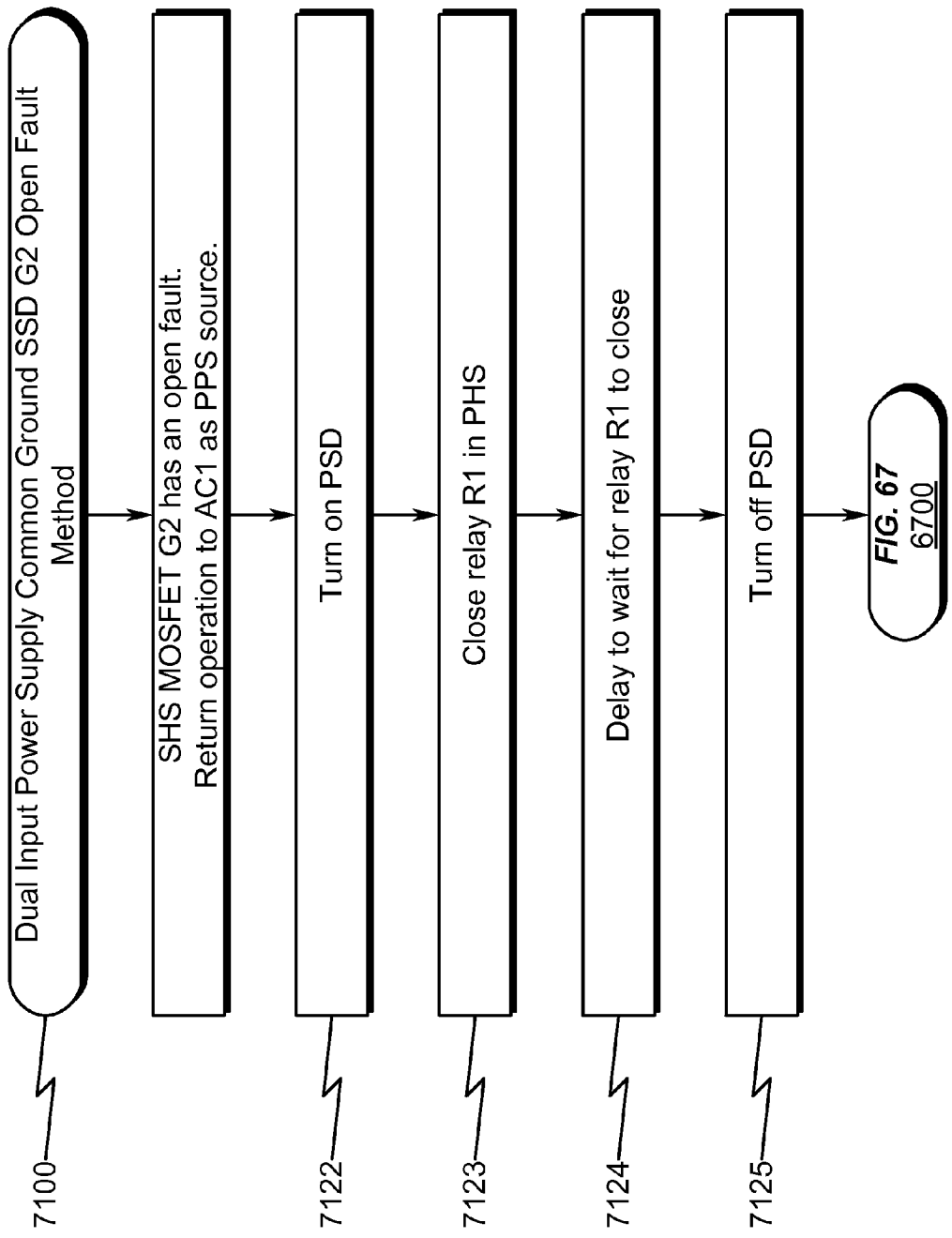
FIG. 71 illustrates a SSD open fault flowchart depicting the operation of a preferred exemplary invention method embodiment wherein the PPS and SPS have a common ground.
Figure 72:
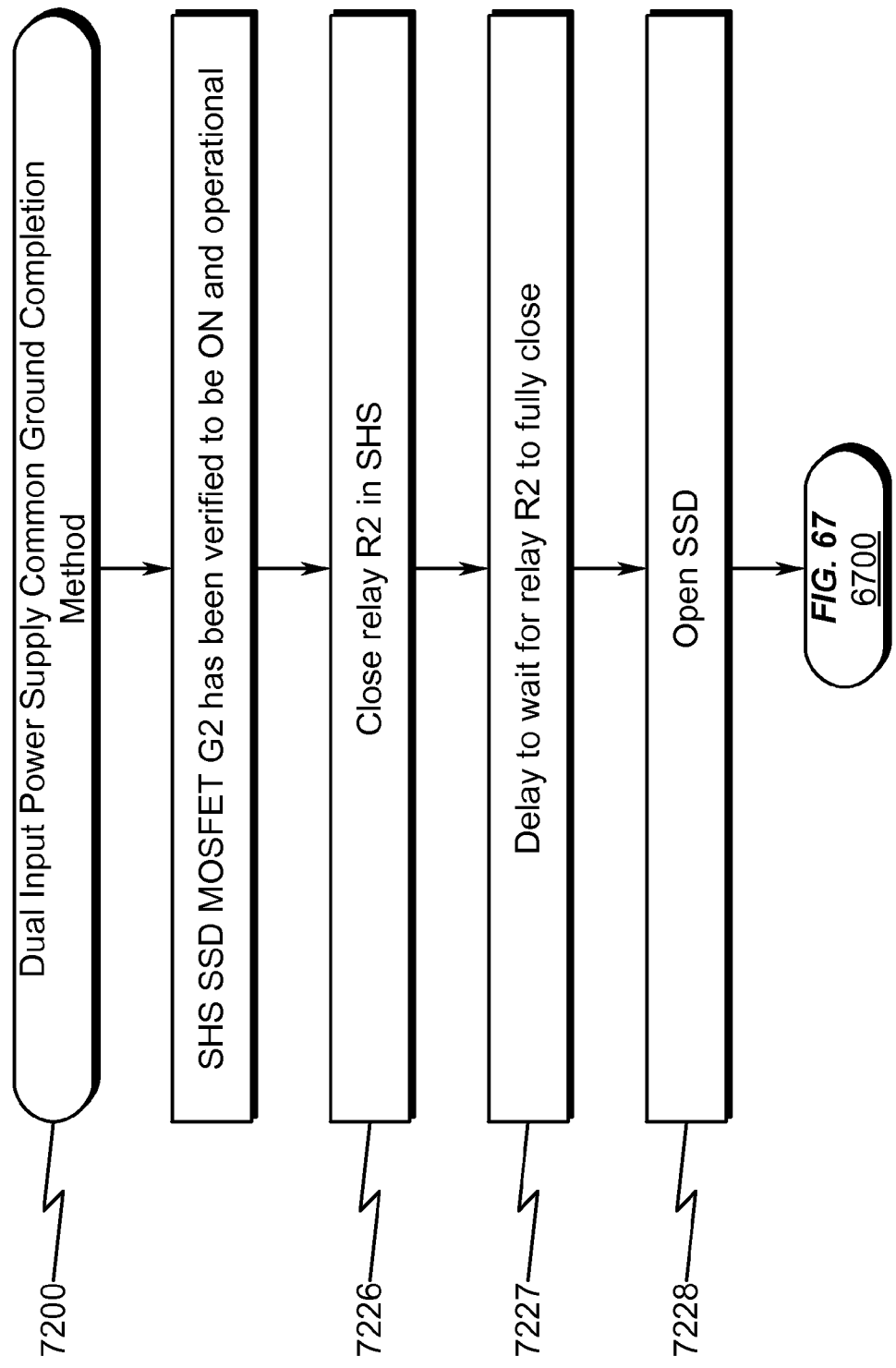
FIG. 72 illustrates a completion flowchart depicting the operation of a preferred exemplary invention method embodiment wherein the PPS and SPS have a common ground.

The system context as depicted in FIG. 65 (6500)-FIG. (6600) is typically associated with an overall methodology as depicted in FIG. 67 (6700)-FIG. 72 (7200). It should be noted that the flowcharts depicted in this example focus on the PPS-to-SPS transition (in the event of a PPS power failure) but may equally be applied to a SPS-to-PPS transition (in the event of a SPS power failure or in situations where the PPS has recovered and should be selected as the active power source). The methodology depicted in the flowcharts addressing a PPS-to-SPS switchover in which the PPS power has failed involves the following steps:

Determine if the PHS is active (PPS is selected as power source), and if so, proceed to step (3) (6701);

Process the SPS as the PPS in steps (3)-(28) and proceed to step (1) (6702);

Close the R1 relay in the PHS (6803);

Open remaining HSD switch components in the PHS and SHS (6804);

Sense the PPS voltage (6805);

Determine if the PPS voltage is zero, indicating that the PPS supply is not operational, and if so, proceed to step (9) (6806);

Determine if the PPS is an AC supply with 180 VAC≤PPS≤264 VAC, and if so, proceed to step (3) (6807);

Determine if the PPS is DC supply with 190 VDC≤PPS≤300 VDC, and if so, proceed to step (3) (6808);

Turn on the PSD (6909);

Open relay R1 in the PHS (6910);

Delay to wait for relay R1 in the PHS to open (6911);

Turn off the PSD (6912);

Delay to wait for the PSD to fully turn off (6913);

Turn on the SSD and monitor input voltage provided by the SPS and output voltage provided by the SSD (6914);

Initialize a repeat counter (RC) to a predetermined value (~5) (7015);

Initialize and start a timeout counter (TC=0) (7016);

Determine if the SPS voltage is equal to an output voltage measured at the output of the SHS, and if not, proceed to step (21) (7017);

Delay 100 microseconds (7018);

Decrement the RC counter (7019);

Determine if the RC counter is zero, and if so, proceed to step (26), otherwise, proceed to step (17) (7020);

Determine if the TC counter has reached a predetermined elapsed time (~2 ms), and if so, proceed to step (22), otherwise proceed to step (17) (7021);

Turn on the PSD (7122);

Close relay R1 in the PHS (7123);

Delay to wait for the relay R1 to close (7124);

Turn off the PSD and proceed to step (1) (7125);

Close relay R2 in the SHS (7226);

Delay to wait for relay R2 to fully close (7227); and

Open the SSD and proceed to step (1) (7228).

One skilled in the art will recognize that these method steps may be augmented or rearranged without limiting the teachings of the present invention. This general method overview may be augmented by the various elements described herein to produce a wide variety of invention embodiments consistent with this overall design description.

Exemplary Isolated Ground Switching Method (7300)-(7600)

While a variety of primary/secondary switching methodologies are anticipated using the system hardware described herein, several methodologies are preferred when the PPS and SPS system do not have a common ground (isolated grounding). One such methodology will now be discussed in terms of an exemplary system embodiment as generally depicted in FIG. 73 (7300), the associated timing diagram depicted in FIG. 74 (7400), and the flowcharts of FIG. 75 (7500)-FIG. 80 (8000).

Hardware Configuration Context (7300)

Figure 73:
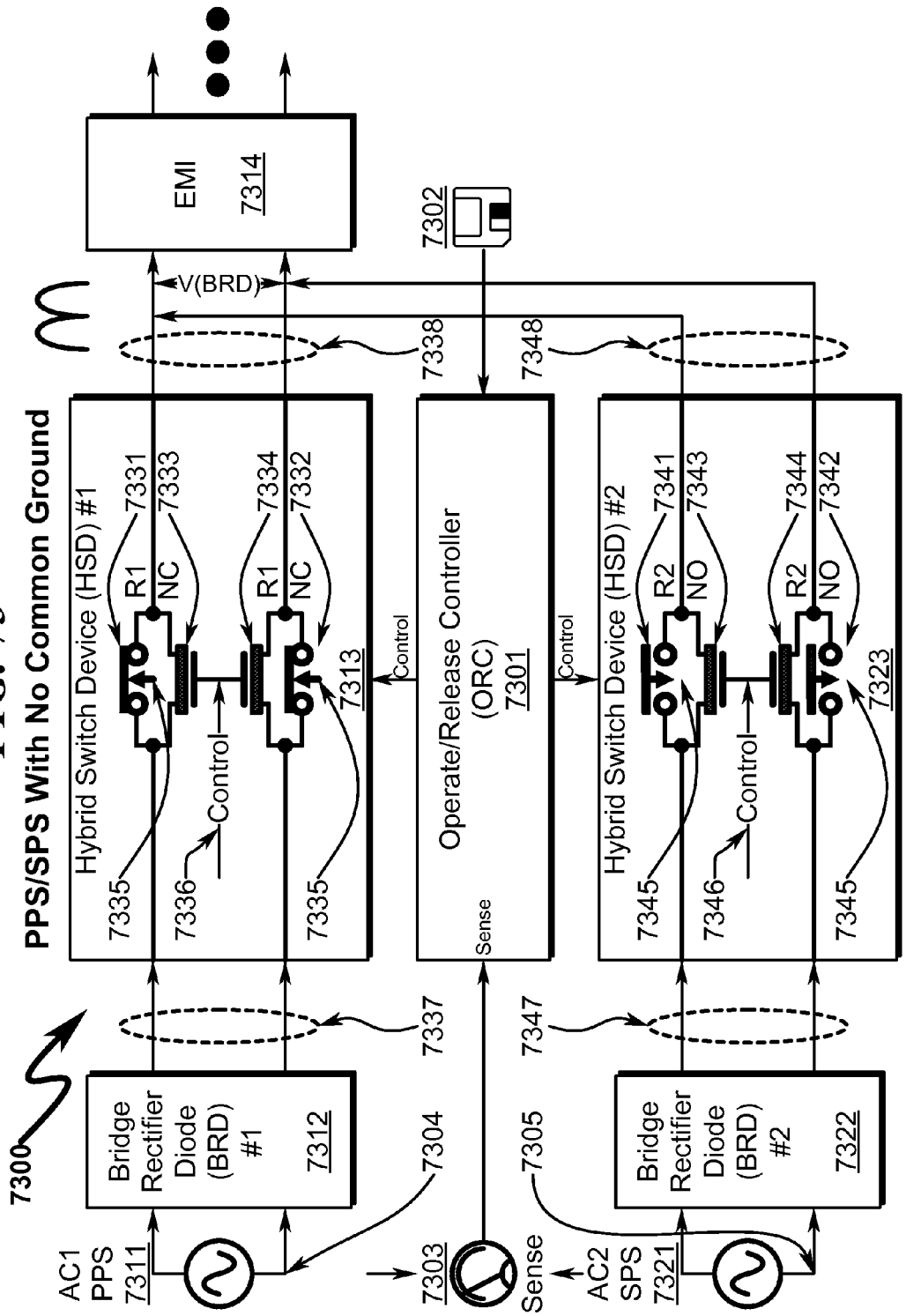
FIG. 73 illustrates a block diagram of a preferred exemplary invention embodiment wherein the PPS and SPS have isolated grounds.

Referencing FIG. 73 (7300), the exemplary system context in which the switching method is applied consists of a primary AC power source (AC1/PPS) (7311) and a secondary AC power source (AC2/SPS) (7321) having isolated ground connections (7304, 7305) that feed individual bridge rectifier diode structures (7312, 7322) whose output is individually switched by a primary hybrid switch device (PHS) (7313) and a secondary hybrid switch device (SHS) (7323) under control of an operate/release controller (ORC) (7301) that may execute instructions read from a computer-readable medium (7302) based on sense inputs (7303) from the PPS (7311) and SPS (7321) power sources.

The HSD structures (7313, 7323) depicted incorporate switched contacts for both ports of the dual port (4-wire) connections between the HSD input port (7337, 7347) and HSD output ports (7338, 7348). The switched contacts in this example each incorporate primary electromagnetic relays (PER) (7331, 7332) and secondary electromagnetic relays (SER) (7341, 7342) in parallel with primary/secondary (PSD/SSD) semiconductor switching devices (7333, 7334, 7343, 7344). PER/SER control (7335, 7345) and SSD control (7336, 7346) are provided by the operate/release controller (ORC) (7301) (under control of machine instructions retrieved from the machine-readable media (7302)) and timed based on inputs from sensing (7303) of the PPS (7311) and SPS (7321) state.

Timing Diagram (7400)

Figure 74:
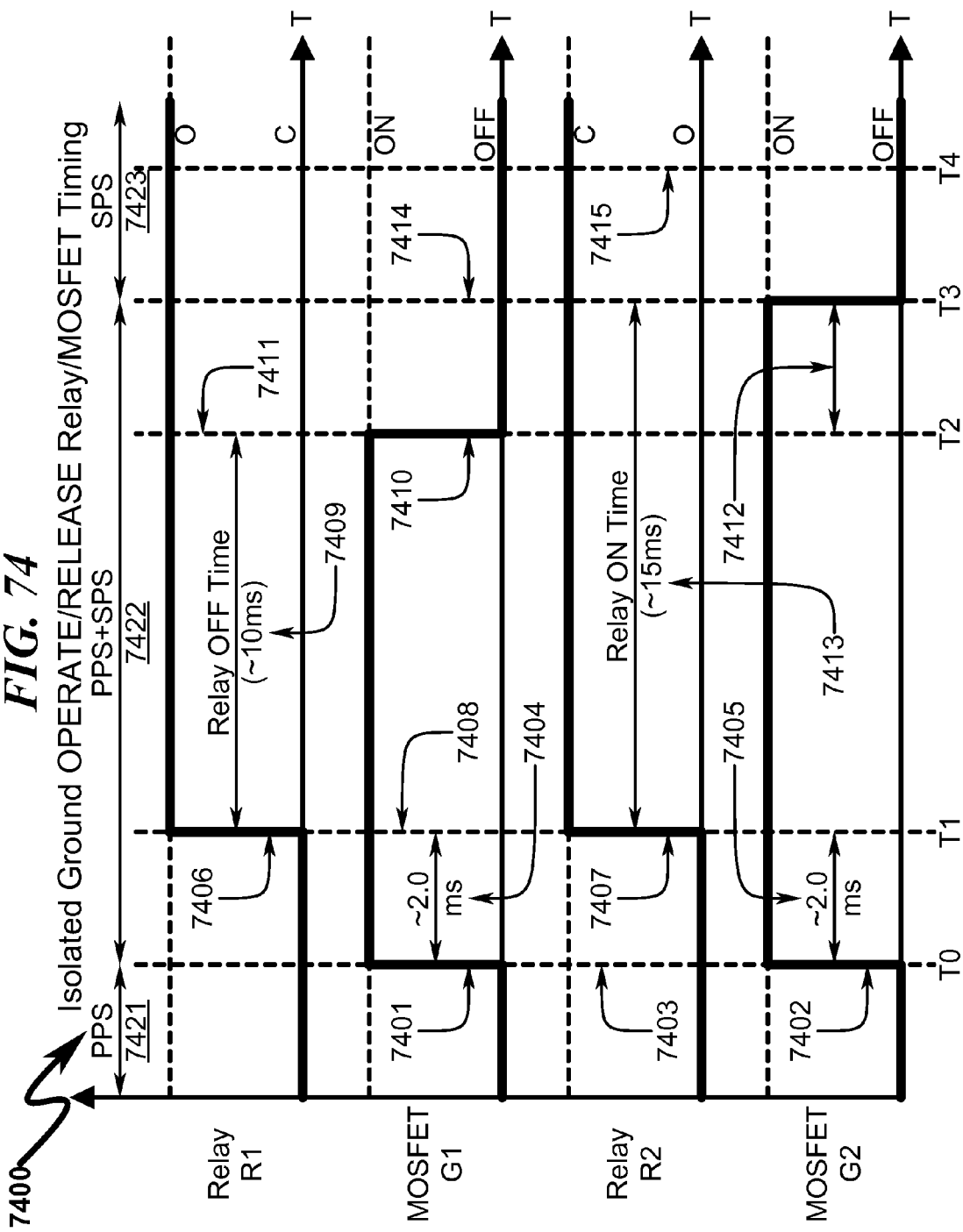
FIG. 74 illustrates a timing diagram of a preferred exemplary invention embodiment wherein the PPS and SPS have isolated grounds.

Referencing the timing diagram of FIG. 74 (7400), it can be seen that in this configuration the system is configured in a PPS-to-SPS transition to first supply power from the PPS (7421), followed by a transition zone (7422) in which both the PPS and SPS supply power, followed by a period in which power is sourced solely from the SPS (7423). Referencing the timing diagram of FIG. 74 (7400), it can be seen that with no common conduction loop between the PPS and the SPS, there is no need to completely break off conduction from the PHS and SHS during the transition between the PPS to the SPS.

In the event of a PPS power failure, the PSD (7401) and SSD (7402) are both activated at T0 (7403) while the PPS is still supplying power to the PLD. A transition delay (7404, 7405) is then incorporated before the simultaneous and/or subsequent activation of relay R1 (7406) and relay R2 (7407) (to transition relay R1 from normally-CLOSED to OPEN state and transition relay R2 from normally-OPEN to CLOSED state) at T1 (7408). A delay is incorporated (7409) to permit the relay R1 to transition from CLOSED to OPEN. At this point, the PSD is deactivated (7410) at T2 (7411) and a delay (7412) is incorporated in the SSD activation time to ensure that it is fully ON before transitioning to SSP relay R2 power. After the SSD delay (7412) expires, the SSD device is deactivated after the relay R2 on-time (7413) at T3 (7414) and power is fully supplied by the SPS at this time. Power supplied to the PLD is provided by the SPS from point T3 (7414) to T4 (7415) and beyond. While the PPS-to-SPS transition sequence has been illustrated, one skilled in the art will recognize that the SPS-to-PPS transition is simply the reverse of this operational sequence and that exemplary transition times illustrated may vary widely based on application context.

Method Flowchart (7500)-(8000)

Figure 75:
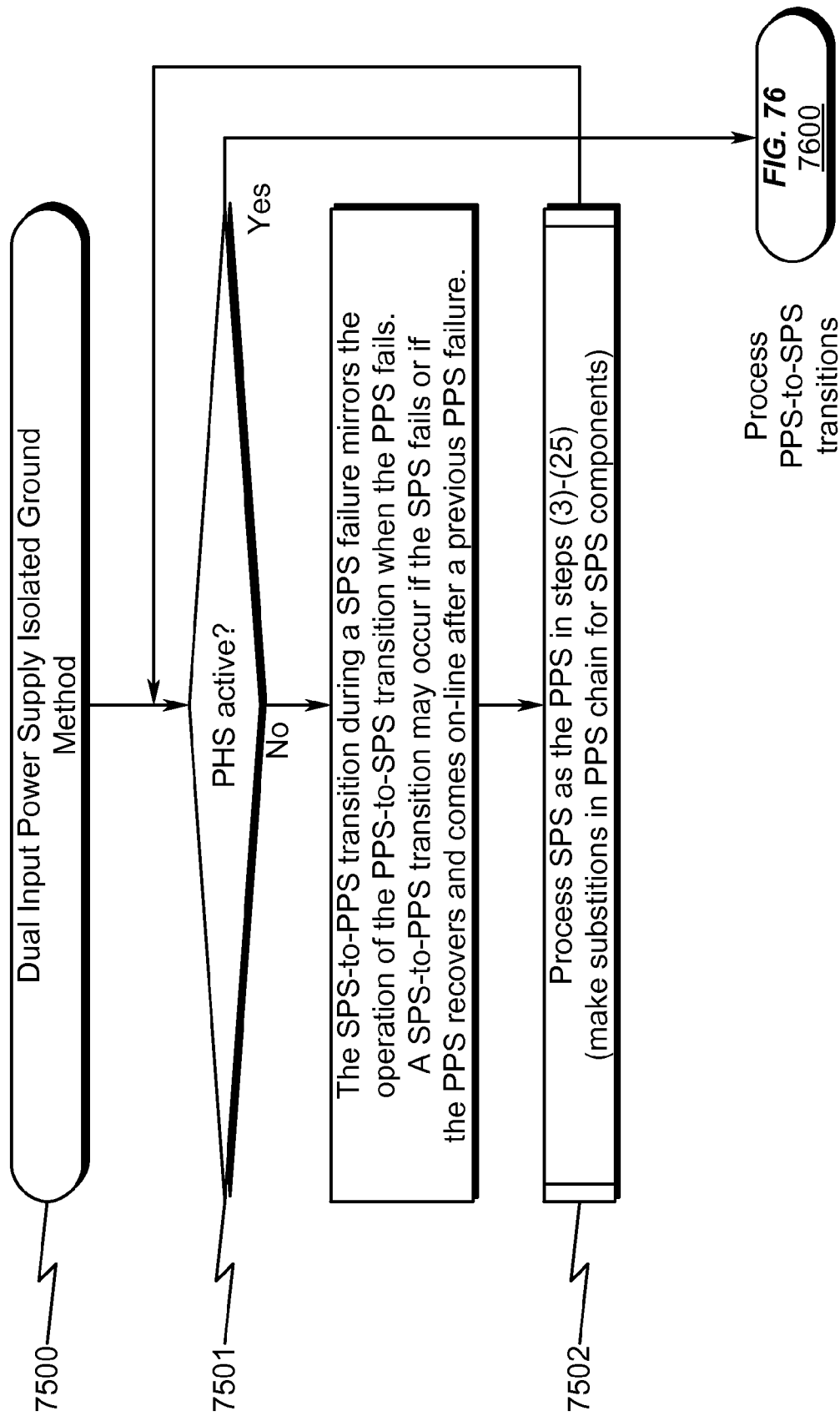
FIG. 75 illustrates a main flowchart depicting the operation of a preferred exemplary invention method embodiment wherein the PPS and SPS have isolated grounds.
Figure 76:
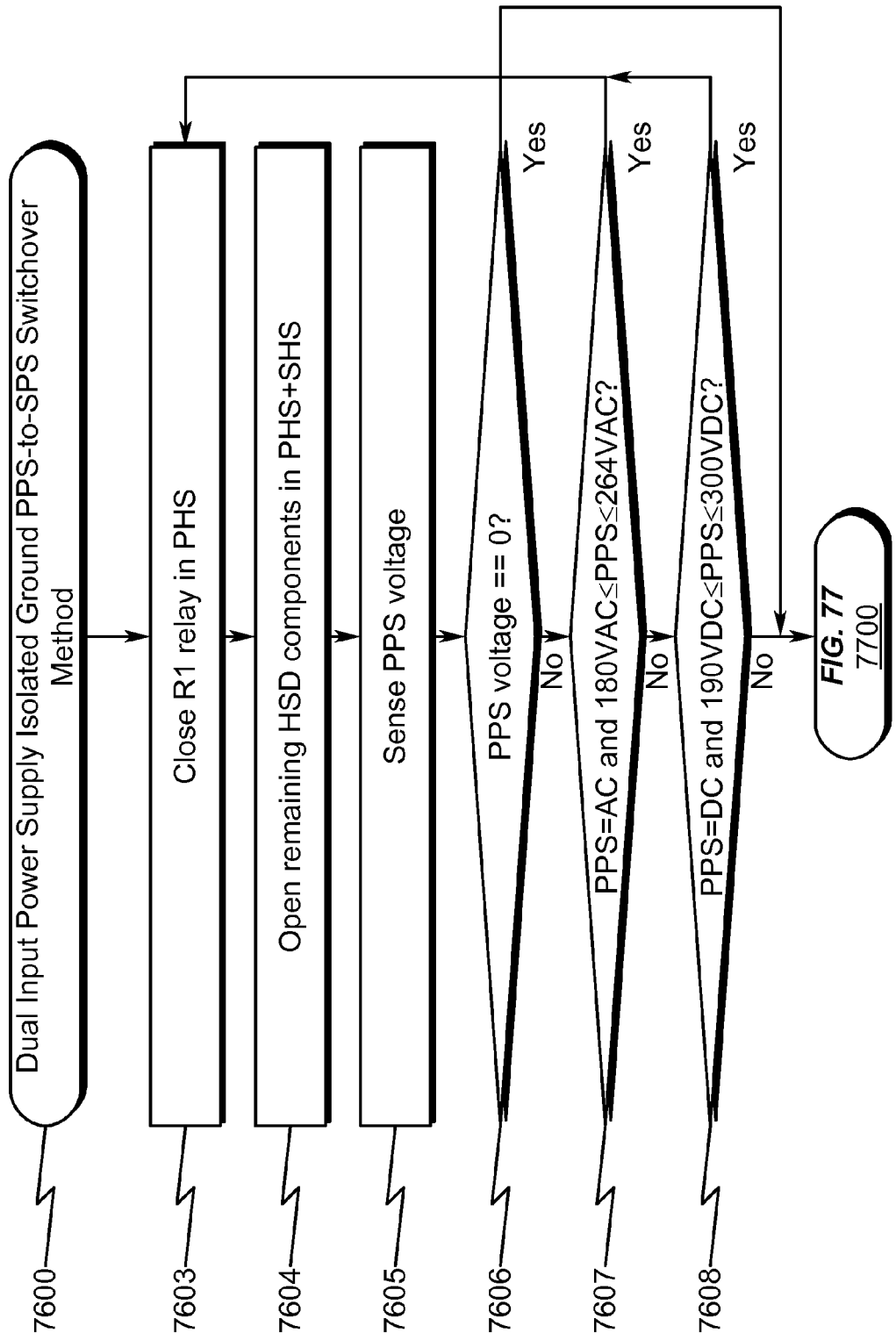
FIG. 76 illustrates a PPS-to-SPS switchover flowchart depicting the operation of a preferred exemplary invention method embodiment wherein the PPS and SPS have isolated grounds.
Figure 77:
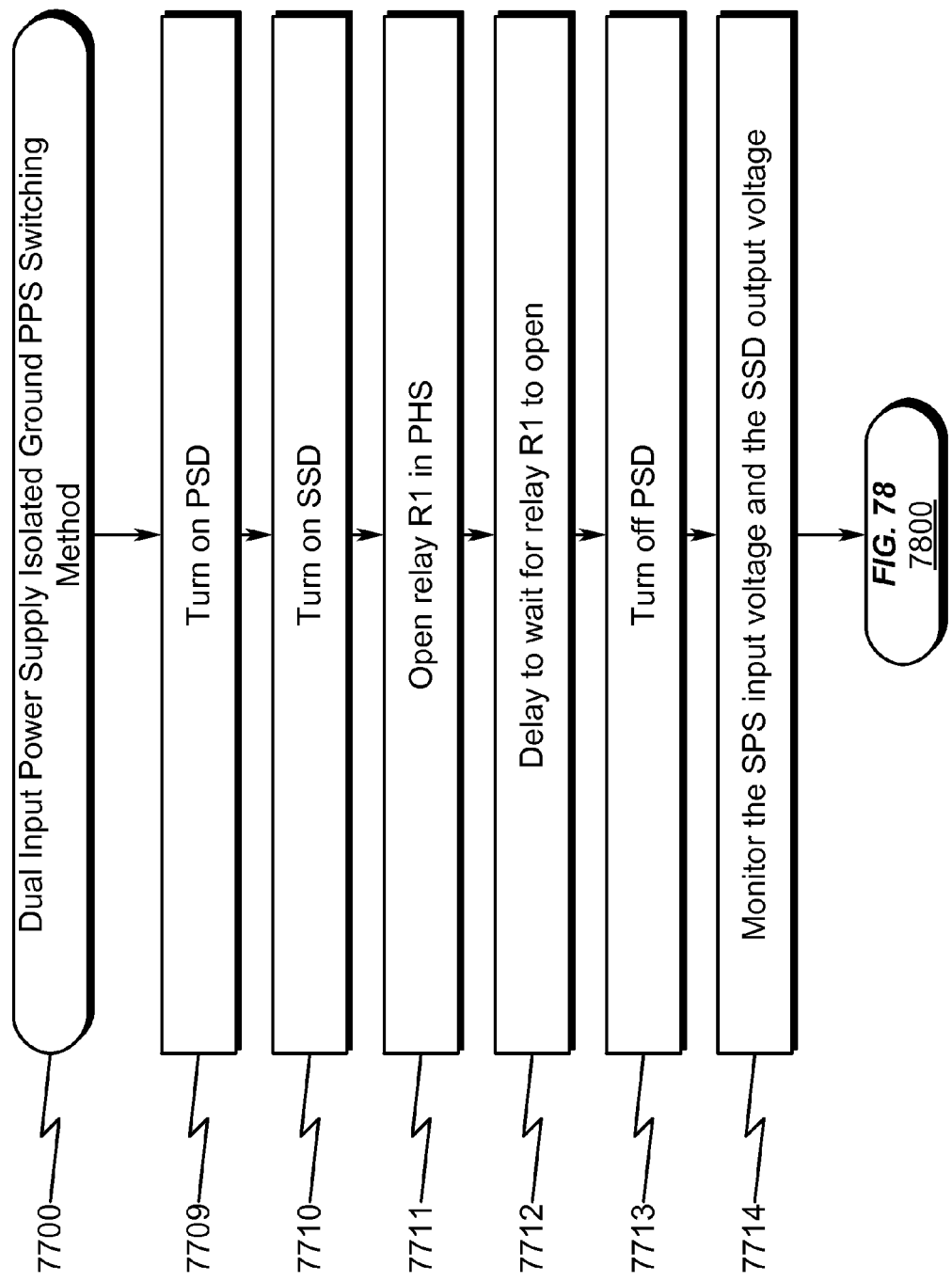
FIG. 77 illustrates a PPS switching flowchart depicting the operation of a preferred exemplary invention method embodiment wherein the PPS and SPS have isolated grounds.
Figure 78:
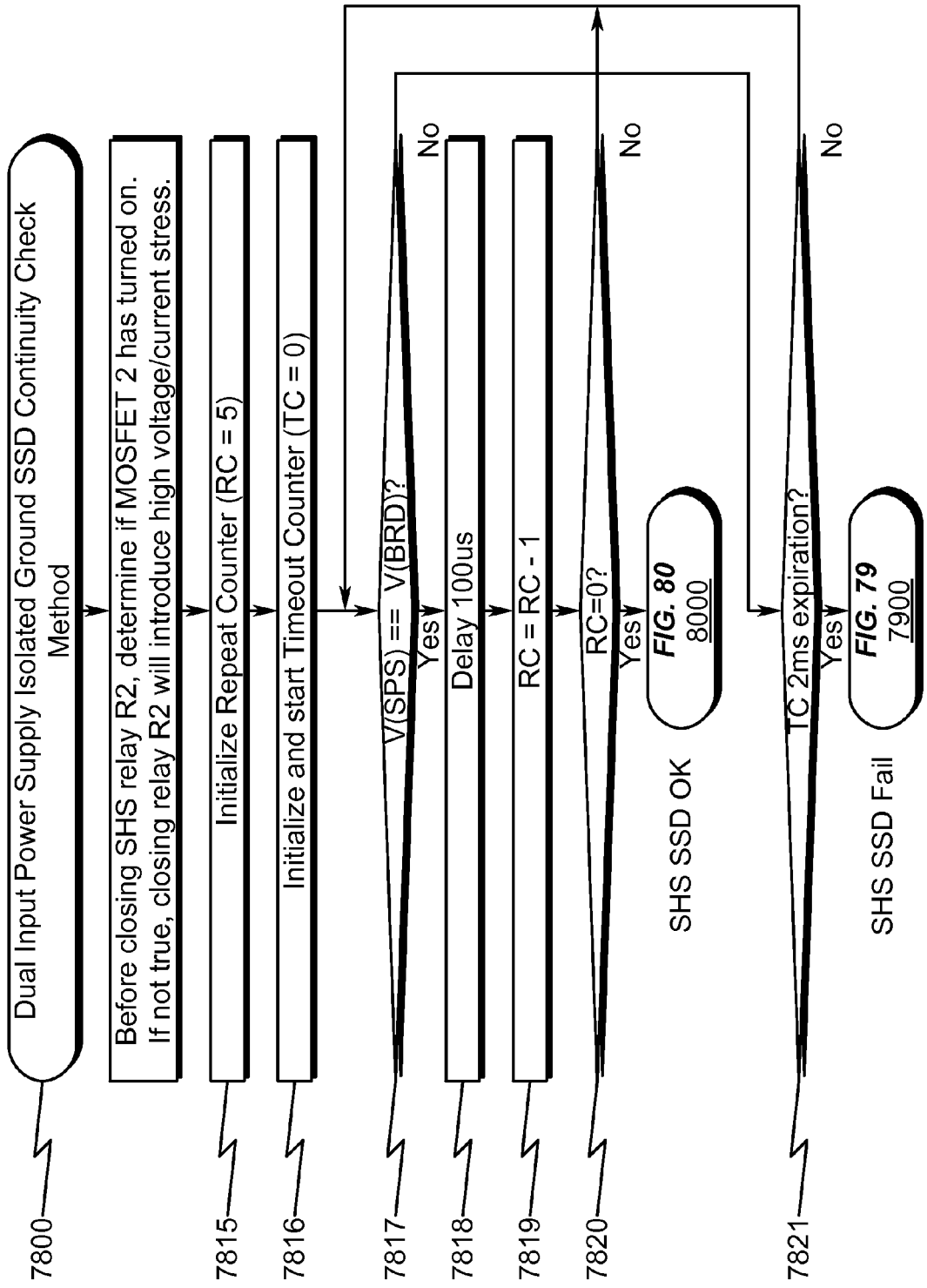
FIG. 78 illustrates a SSD continuity check flowchart depicting the operation of a preferred exemplary invention method embodiment wherein the PPS and SPS have isolated grounds.
Figure 79:
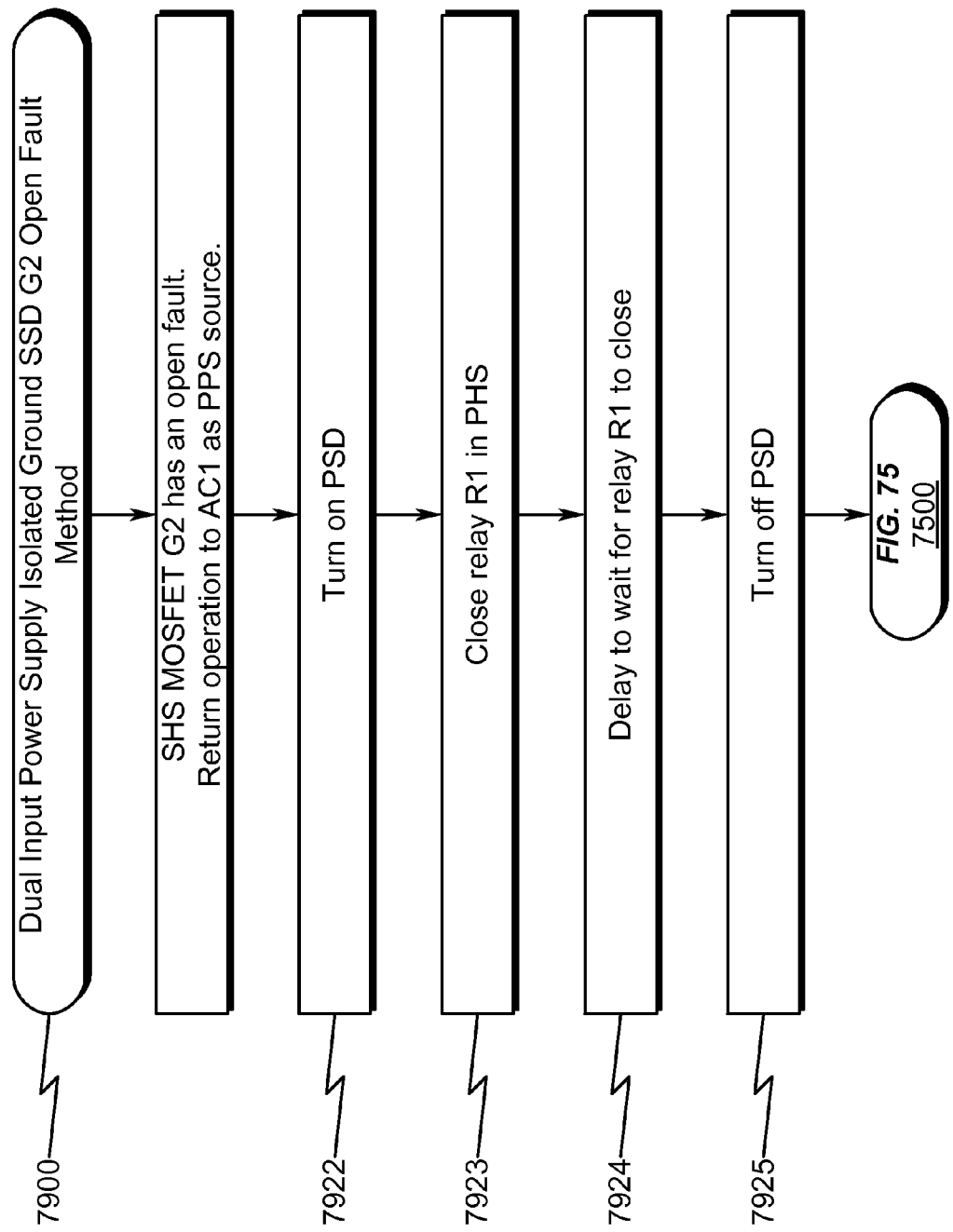
FIG. 79 illustrates a SSD open fault flowchart depicting the operation of a preferred exemplary invention method embodiment wherein the PPS and SPS have isolated grounds.

The system context as depicted in FIG. 73 (7300)-FIG. (7400) is typically associated with an overall methodology as depicted in FIG. 75 (7500)-FIG. 80 (8000). It should be noted that the flowcharts depicted in this example focus on the PPS-to-SPS transition (in the event of a PPS power failure) but may equally be applied to a SPS-to-PPS transition (in the event of a SPS power failure or in situations where the PPS has recovered and should be selected as the active power source). The methodology depicted in the flowcharts addressing a PPS-to-SPS switchover in which the PPS power has failed involves the following steps:

Determine if the PHS is active (PPS is selected as power source), and if so, proceed to step (3) (7501);

Process the SPS as the PPS in steps (3)-(28) and proceed to step (1) (7502);

Close the R1 relay in the PHS (7603);

Open remaining HSD switch components in the PHS and SHS (7604);

Sense the PPS voltage (7605);

Determine if the PPS voltage is zero, indicating that the PPS supply is not operational, and if so, proceed to step (9) (7606);

Determine if the PPS is an AC supply with 180 VAC≤PPS≤264 VAC, and if so, proceed to step (3) (7607);

Determine if the PPS is DC supply with 190 VDC≤PPS≤300 VDC, and if so, proceed to step (3) (7608);

Turn on the PSD (7709);

Turn on the SSD (7710);

Open relay R1 in the PHS (7711);

Delay to wait for relay R1 in the PHS to open (7712);

Turn off the PSD (7713);

Monitor input voltage provided by the SPS and output voltage provided by the SSD (7714);

Initialize a repeat counter (RC) to a predetermined value (~5) (7815);

Initialize and start a timeout counter (TC=0) (7816);

Determine if the SPS voltage is equal to an output voltage measured at the output of the SHS, and if not, proceed to step (21) (7817);

Delay 100 microseconds (7818);

Decrement the RC counter (7819);

Determine if the RC counter is zero, and if so, proceed to step (26), otherwise, proceed to step (17) (7820);

Determine if the TC counter has reached a predetermined elapsed time (~2 ms), and if so, proceed to step (22), otherwise proceed to step (17) (7821);

Turn on the PSD (7922);

Close relay R1 in the PHS (7923);

Delay to wait for the relay R1 to close (7924);

Turn off the PSD and proceed to step (1) (7925);

Close relay R2 in the SHS (8026);

Delay to wait for relay R2 to fully close (8027); and

Open the SSD and proceed to step (1) (8028).

One skilled in the art will recognize that these method steps may be augmented or rearranged without limiting the teachings of the present invention. This general method overview may be augmented by the various elements described herein to produce a wide variety of invention embodiments consistent with this overall design description.

First Preferred Embodiment System Summary

The present invention preferred exemplary system embodiment anticipates a wide variety of variations in the basic theme of construction, but a first preferred embodiment system can be generalized as a dual input power supply system comprising:

(a) primary power source (PPS);
(b) primary bridge rectifier diode (PBR);
(c) primary hybrid switch device (PHS);
(d) secondary power source (SPS);
(e) secondary bridge rectifier diode (SBR);
(f) secondary hybrid switch device (SHS);
(g) electromagnetic interference (EMI) snubber (EMS);
(h) AC-DC converter (ADC);
(i) DC-DC converter (DDC); and
(j) operate/release controller (ORC);

wherein:
the PBR comprises a dual input port and a dual output port;
the SBR comprises a dual input port and a dual output port;
the PHS comprises a dual input port, a dual output port, and a control port;
the SHS comprises a dual input port, a dual output port, and a control port;
the EMS comprises a dual input port and a dual output port;
the ADC comprises a dual input port and a dual output port;
the DDC comprises a dual input port and a dual output port;
the PPS is electrically coupled to the PBR dual input port;
the PBR output port is electrically coupled to the PHS dual input port;
the SPS is electrically coupled to the SBR dual input port;
the SBR output port is electrically coupled to the SHS dual input port;
the EMS dual input port is electrically coupled to the PBR output port and the SBR output port;
the EMS output port is electrically coupled to the ADC dual input port;
the ADC output port is electrically coupled to the DDC dual input port;
the DDC output port is configured to supply power to a protected load device (PLD);
the PHS comprises a primary electromagnetic relay (PER) electrically connected in parallel with a primary semiconductor switch device (PSD) that are both electrically connected between one port connection of the PHS dual input port and one port connection of the PHS dual output port;
the SHS comprises a secondary electromagnetic relay (SER) electrically connected in parallel with a secondary semiconductor switch device (SSD) that are both electrically connected between one port connection of the SHS dual input port and one port connection of the SHS dual output port;
the PHS control port is electrically coupled to and controlled by the ORC;
the SHS control port is electrically coupled to and controlled by the ORC;
the ORC is configured to monitor a voltage provided by the PPS;
the ORC is configured to control the PER to electrically disconnect the PBR from the EMS if the PPS monitored voltage is outside a predetermined range;
the ORC is configured to control the PSD to electrically connect the PBR to the EMS during a RELEASE time associated with the PER disconnection;
the ORC is configured to control the SER to electrically connect the SBR to the EMS when the PPS monitored voltage is outside the predetermined range; and
the ORC is configured to control the SSD to electrically connect the SBR to the EMS before an ACTIVATE time associated with the SER connection.

This general system summary may be augmented by the various elements described herein to produce a wide variety of invention embodiments consistent with this overall design description.

Second Preferred Embodiment System Summary

The present invention preferred exemplary system embodiment anticipates a wide variety of variations in the basic theme of construction, but a second preferred embodiment system can be generalized as a dual input power supply system comprising:
(a) primary power source (PPS);
(b) primary electromagnetic interference (EMI) snubber (PEM);
(c) primary bridge rectifier diode (PBR);
(d) primary hybrid switch device (PHS);
(e) secondary power source (SPS);
(f) secondary electromagnetic interference (EMI) snubber (SEM);
(g) secondary bridge rectifier diode (SBR);
(h) secondary hybrid switch device (SHS);
(i) AC-DC converter (ADC);
(j) DC-DC converter (DDC); and
(k) operate/release controller (ORC);
wherein:
the PEM comprises a dual input port and a dual output port;
the SEM comprises a dual input port and a dual output port;
the PBR comprises a dual input port and a dual output port;
the SBR comprises a dual input port and a dual output port;
the PHS comprises a dual input port, a dual output port, and a control port;
the SHS comprises a dual input port, a dual output port, and a control port;
the ADC comprises a dual input port and a dual output port;
the DDC comprises a dual input port and a dual output port;
the PPS is electrically coupled to the PEM dual input port;
the PEM output port is electrically coupled to the PBR dual input port;
the PBR output port is electrically coupled to the PHS dual input port;
the SPS is electrically coupled to the SEM dual input port;
the SEM output port is electrically coupled to the SBR dual input port;
the SBR output port is electrically coupled to the SHS dual input port;
the ADC dual input port is electrically coupled to the PHS output port and the SHS output port;
the ADC output port is electrically coupled to the DDC dual input port;
the DDC output port is configured to supply power to a protected load device (PLD);
the PHS comprises a primary electromagnetic relay (PER) electrically connected in parallel with a primary semiconductor switch device (PSD) that are both electrically connected between one port connection of the PHS dual input port and one port connection of the PHS dual output port;
the SHS comprises a secondary electromagnetic relay (SER) electrically connected in parallel with a secondary semiconductor switch device (SSD) that are both electrically connected between one port connection of the SHS dual input port and one port connection of the SHS dual output port;
the PHS control port is electrically coupled to and controlled by the ORC;
the SHS control port is electrically coupled to and controlled by the ORC;
the ORC is configured to monitor a voltage provided by the PPS;

the ORC is configured to control the PER to electrically disconnect the PBR from the ADC if the PPS monitored voltage is outside a predetermined range;

the ORC is configured to control the PSD to electrically connect the PBR to the ADC during a RELEASE time associated with the PER disconnection;

the ORC is configured to control the SER to electrically connect the SBR to the ADC when the PPS monitored voltage is outside the predetermined range; and the ORC is configured to control the SSD to electrically connect the SBR to the ADC before an ACTIVATE time associated with the SER connection.

This general system summary may be augmented by the various elements described herein to produce a wide variety of invention embodiments consistent with this overall design description.

Third Preferred Embodiment System Summary

The present invention preferred exemplary system embodiment anticipates a wide variety of variations in the basic theme of construction, but a third preferred embodiment system can be generalized as a dual input power supply system comprising:
(a) primary power source (PPS);
(b) primary hybrid switch device (PHS);
(c) secondary power source (SPS);
(d) secondary hybrid switch device (SHS);
(e) electromagnetic interference (EMI) snubber (EMS);
(f) bridge rectifier diode (BRD);
(g) AC-DC converter (ADC);
(h) DC-DC converter (DDC); and
(i) operate/release controller (ORC);
wherein:
the PHS comprises a dual input port, a dual output port, and a control port;
the SHS comprises a dual input port, a dual output port, and a control port;
the BRD comprises a dual input port and a dual output port;
the EMS comprises a dual input port and a dual output port;
the ADC comprises a dual input port and a dual output port;
the DDC comprises a dual input port and a dual output port;
the PPS is electrically coupled to the PHS dual input port;
the SPS is electrically coupled to the SPS dual input port;
the BRD dual input port is electrically coupled to the PHS output port and the SHS output port;
the BRD output port is electrically coupled to the EMS dual input port;
the EMS output port is electrically coupled to the ADC dual input port;
the ADC output port is electrically coupled to the DDC dual input port;
the DDC output port is configured to supply power to a protected load device (PLD);
the PHS comprises a primary electromagnetic relay (PER) electrically connected in parallel with a primary semiconductor switch device (PSD) that are both electrically connected between one port connection of the PHS dual input port and one port connection of the PHS dual output port;
the SHS comprises a secondary electromagnetic relay (SER) electrically connected in parallel with a secondary semiconductor switch device (SSD) that are both electrically connected between one port connection of the SHS dual input port and one port connection of the SHS dual output port;

the PHS control port is electrically coupled to and controlled by the ORC;

the SHS control port is electrically coupled to and controlled by the ORC;

the ORC is configured to monitor a voltage provided by the PPS;

the ORC is configured to control the PER to electrically disconnect the PPS from the BRD if the PPS monitored voltage is outside a predetermined range;

the ORC is configured to control the PSD to electrically connect the PPS to the BRD during a RELEASE time associated with the PER disconnection;

the ORC is configured to control the SER to electrically connect the SPS to the BRD when the PPS monitored voltage is outside the predetermined range; and the ORC is configured to control the SSD to electrically connect the SPS to the BRD before an ACTIVATE time associated with the SER connection.

This general system summary may be augmented by the various elements described herein to produce a wide variety of invention embodiments consistent with this overall design description.

Fourth Preferred Embodiment System Summary

The present invention preferred exemplary system embodiment anticipates a wide variety of variations in the basic theme of construction, but a fourth preferred embodiment system can be generalized as a dual input power supply system comprising:
(a) primary power source (PPS);
(b) primary electromagnetic interference (EMI) snubber (PEM);
(c) primary hybrid switch device (PHS);
(d) secondary power source (SPS);
(e) secondary electromagnetic interference (EMI) snubber (SEM);
(f) secondary hybrid switch device (SHS);
(g) bridge rectifier diode (BRD);
(h) AC-DC converter (ADC);
(i) DC-DC converter (DDC); and
(j) operate/release controller (ORC);
wherein:
the PEM comprises a dual input port and a dual output port;
the SEM comprises a dual input port and a dual output port;
the PHS comprises a dual input port, a dual output port, and a control port;
the SHS comprises a dual input port, a dual output port, and a control port;
the BRD comprises a dual input port and a dual output port;
the ADC comprises a dual input port and a dual output port;
the DDC comprises a dual input port and a dual output port;
the PPS is electrically coupled to the PEM dual input port;
the PEM output port is electrically coupled to the PHS dual input port;
the SPS is electrically coupled to the SEM dual input port;
the SEM output port is electrically coupled to the SHS dual input port;

the BRD dual input port is electrically coupled to the PHS output port and the SHS output port;

the BRD output port is electrically coupled to the ADC dual input port;

the ADC output port is electrically coupled to the DDC dual input port;

the DDC output port is configured to supply power to a protected load device (PLD);

the PHS comprises a primary electromagnetic relay (PER) electrically connected in parallel with a primary semiconductor switch device (PSD) that are both electrically connected between one port connection of the PHS dual input port and one port connection of the PHS dual output port;

the SHS comprises a secondary electromagnetic relay (SER) electrically connected in parallel with a secondary semiconductor switch device (SSD) that are both electrically connected between one port connection of the SHS dual input port and one port connection of the SHS dual output port;

the PHS control port is electrically coupled to and controlled by the ORC;

the SHS control port is electrically coupled to and controlled by the ORC;

the ORC is configured to monitor a voltage provided by the PPS;

the ORC is configured to control the PER to electrically disconnect the PEM from the BRD if the PPS monitored voltage is outside a predetermined range;

the ORC is configured to control the PSD to electrically connect the PEM to the BRD during a RELEASE time associated with the PER disconnection;

the ORC is configured to control the SER to electrically connect the SEM to the BRD when the PPS monitored voltage is outside the predetermined range; and the ORC is configured to control the SSD to electrically connect the SEM to the BRD before an ACTIVATE time associated with the SER connection.

This general system summary may be augmented by the various elements described herein to produce a wide variety of invention embodiments consistent with this overall design description.

First Preferred Embodiment Method Summary

The present invention preferred exemplary method embodiment anticipates a wide variety of variations in the basic theme of implementation, but a first preferred embodiment method can be generalized as a dual input power supply method operating on a dual input power supply system comprising:
(a) primary power source (PPS);
(b) primary bridge rectifier diode (PBR);
(c) primary hybrid switch device (PHS);
(d) secondary power source (SPS);
(e) secondary bridge rectifier diode (SBR);
(f) secondary hybrid switch device (SHS);
(g) electromagnetic interference (EMI) snubber (EMS);
(h) AC-DC converter (ADC);
(i) DC-DC converter (DDC); and
(j) operate/release controller (ORC);
wherein:
the PBR comprises a dual input port and a dual output port;
the SBR comprises a dual input port and a dual output port;
the PHS comprises a dual input port, a dual output port, and a control port;
the SHS comprises a dual input port, a dual output port, and a control port;
the EMS comprises a dual input port and a dual output port;
the ADC comprises a dual input port and a dual output port;
the DDC comprises a dual input port and a dual output port;
the PPS is electrically coupled to the PBR dual input port;
the PBR output port is electrically coupled to the PHS dual input port;
the SPS is electrically coupled to the SBR dual input port;
the SBR output port is electrically coupled to the SHS dual input port;
the EMS dual input port is electrically coupled to the PBR output port and the SBR output port;
the EMS output port is electrically coupled to the ADC dual input port;
the ADC output port is electrically coupled to the DDC dual input port;
the DDC output port is configured to supply power to a protected load device (PLD);
the PHS comprises a primary electromagnetic relay (PER) electrically connected in parallel with a primary semiconductor switch device (PSD) that are both electrically connected between one port connection of the PHS dual input port and one port connection of the PHS dual output port;
the SHS comprises a secondary electromagnetic relay (SER) electrically connected in parallel with a secondary semiconductor switch device (SSD) that are both electrically connected between one port connection of the SHS dual input port and one port connection of the SHS dual output port;
the PHS control port is electrically coupled to and controlled by the ORC;
the SHS control port is electrically coupled to and controlled by the ORC; and the PPS and the SPS have a common ground connection;
wherein the method comprises the steps of:
(1) Determine if the PHS is active (PPS is selected as power source) and if so, proceed to step (3);
(2) Process the SPS as the PPS in steps (3)-(28) and proceed to step (1);
(3) Close the PER in the PHS;
(4) Open remaining HSD switch components in the PHS and the SHS;
(5) Sense the PPS voltage;
(6) Determine if the PPS voltage is zero, indicating that the PPS supply is not operational, and if so, proceed to step (9);
(7) Determine if the PPS is an AC supply with 180 VAC≤PPS≤264 VAC, and if so, proceed to step (3);
(8) Determine if the PPS is DC supply with 190 VDC≤PPS≤300 VDC, and if so, proceed to step (3);
(9) Turn on the PSD;
(10) Open the PER in the PHS;
(11) Delay to wait for the PER in the PHS to open;
(12) Turn off the PSD;
(13) Delay to wait for the PSD to fully turn off;
(14) Turn on the SSD and monitor input voltage provided by the SPS and output voltage provided by the SSD;
(15) Initialize a repeat counter (RC) to a predetermined value;
(16) Initialize and start a timeout counter (TC=0);

(17) Determine if the SPS voltage is equal to an output voltage measured at the output of the SHS, and if not, proceed to step (21);
(18) Delay 100 microseconds;
(19) Decrement the RC counter;
(20) Determine if the RC counter is zero, and if so, proceed to step (26), otherwise, proceed to step (17);
(21) Determine if the TC counter has reached a predetermined elapsed time, and if so, proceed to step (22), otherwise proceed to step (17);
(22) Turn on the PSD;
(23) Close the PER in the PHS;
(24) Delay to wait for the PER to close;
(25) Turn off the PSD and proceed to step (1);
(26) Close the SER in the SHS;
(27) Delay to wait for SER to fully close; and
(28) Open the SSD and proceed to step (1).

One skilled in the art will recognize that these method steps may be augmented or rearranged without limiting the teachings of the present invention. This general method summary may be augmented by the various elements described herein to produce a wide variety of invention embodiments consistent with this overall design description.

Second Preferred Embodiment Method Summary

The present invention preferred exemplary method embodiment anticipates a wide variety of variations in the basic theme of implementation, but a second preferred embodiment method can be generalized as a dual input power supply method operating on a dual input power supply system comprising:
(a) primary power source (PPS);
(b) primary bridge rectifier diode (PBR);
(c) primary hybrid switch device (PHS);
(d) secondary power source (SPS);
(e) secondary bridge rectifier diode (SBR);
(f) secondary hybrid switch device (SHS);
(g) electromagnetic interference (EMI) snubber (EMS);
(h) AC-DC converter (ADC);
(i) DC-DC converter (DDC); and
(j) operate/release controller (ORC);
wherein:
the PBR comprises a dual input port and a dual output port;
the SBR comprises a dual input port and a dual output port;
the PHS comprises a dual input port, a dual output port, and a control port;
the SHS comprises a dual input port, a dual output port, and a control port;
the EMS comprises a dual input port and a dual output port;
the ADC comprises a dual input port and a dual output port;
the DDC comprises a dual input port and a dual output port;
the PPS is electrically coupled to the PBR dual input port;
the PBR output port is electrically coupled to the PHS dual input port;
the SPS is electrically coupled to the SBR dual input port;
the SBR output port is electrically coupled to the SHS dual input port;
the EMS dual input port is electrically coupled to the PBR output port and the SBR output port;
the EMS output port is electrically coupled to the ADC dual input port;
the ADC output port is electrically coupled to the DDC dual input port;
the DDC output port is configured to supply power to a protected load device (PLD);
the PHS comprises a primary electromagnetic relay (PER) electrically connected in parallel with a primary semiconductor switch device (PSD) that are both electrically connected between one port connection of the PHS dual input port and one port connection of the PHS dual output port;
the SHS comprises a secondary electromagnetic relay (SER) electrically connected in parallel with a secondary semiconductor switch device (SSD) that are both electrically connected between one port connection of the SHS dual input port and one port connection of the SHS dual output port;
the PHS control port is electrically coupled to and controlled by the ORC;
the SHS control port is electrically coupled to and controlled by the ORC; and
the PPS and the SPS have a common ground connection;
wherein the method comprises the steps of:
Determine if the PHS is active (PPS is selected as power source) and if so, proceed to step (3);
Process the SPS as the PPS in steps (3)-(28) and proceed to step (1);
Close the PER in the PHS;
Open remaining HSD switch components in the PHS and the SHS;
Sense the PPS voltage;
Determine if the PPS voltage is zero, indicating that the PPS supply is not operational, and if so, proceed to step (9);
Determine if the PPS is an AC supply with 180 VAC≤PPS≤264 VAC, and if so, proceed to step (3);
Determine if the PPS is DC supply with 190 VDC≤PPS≤300 VDC, and if so, proceed to step (3);
Turn on the PSD;
Turn on the SSD;
Open the PER in the PHS;
Delay to wait for the PER in the PHS to open;
Turn off the PSD;
Monitor input voltage provided by the SPS and output voltage provided by the SSD;
Initialize a repeat counter (RC) to a predetermined value;
Initialize and start a timeout counter (TC=0);
Determine if the SPS voltage is equal to an output voltage measured at the output of the SHS, and if not, proceed to step (21);
Delay 100 microseconds;
Decrement the RC counter;
Determine if the RC counter is zero, and if so, proceed to step (26), otherwise, proceed to step (17);
Determine if the TC counter has reached a predetermined elapsed time, and if so, proceed to step (22), otherwise proceed to step (17);
Turn on the PSD;
Close the PER in the PHS;
Delay to wait for the PER to close;
Turn off the PSD and proceed to step (1);
Close the SER in the SHS;
Delay to wait for the SER to fully close; and
Open the SSD and proceed to step (1).

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the PPS comprises an AC power source and the SPS comprises an AC power source.

An embodiment wherein the PPS comprises an AC power source and the SPS comprises a DC power source.

An embodiment wherein the PER and the SER are selected from a group consisting of: normally-open contactor (NOC); normally-open relay (NOR); normally-closed contactor (NCC); and normally-closed relay (NCR).

An embodiment wherein the PSD and the SSD are selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

An embodiment wherein the PSD comprises two semiconductor switch (SSW) devices connected in series opposition to form a bidirectional semiconductor switch (BSW), the two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

An embodiment wherein the SSD comprises two semiconductor switch (SSW) devices connected in series opposition to form a bidirectional semiconductor switch (BSW), the two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

An embodiment wherein the PHS and the SHS each comprise a hybrid switch device (HSD), the HSD further comprising:
(29) first port electromagnetic relay (FPR);
(30) first port semiconductor switch device (FPD);
(31) second port electromagnetic relay (SPR);
(32) second port semiconductor switch device (SPD);
wherein:
the FPR and the FPD are electrically connected in parallel across a first input port of the HSD and a first output port of the HSD; and
the SPR and the SPD are electrically connected in parallel across a second input port of the HSD and a second output port of the HSD.

An embodiment wherein the PPS and the SPS have a common GROUND connection.

An embodiment wherein the PPS and the SPS do not have a common GROUND connection.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer-readable instructions that implement the present invention methods, such computer-readable media represent alternate embodiments of the present invention.

As generally illustrated herein, the present invention system embodiments can incorporate a variety of computer-readable media that comprise computer-usable medium having computer-readable code means embodied therein. One skilled in the art will recognize that the software associated with the various processes described herein can be embodied in a wide variety of computer-accessible media from which the software is loaded and activated. Pursuant to *In re Beauregard*, 35 USPQ2d 1383 (U.S. Pat. No. 5,710,578), the present invention anticipates and includes this type of computer-readable media within the scope of the invention. Pursuant to *In re Nuijten*, 500 F.3d 1346 (Fed. Cir. 2007) (U.S. patent application Ser. No. 09/211,928), the present invention scope is limited to computer-readable media wherein the media is both tangible and non-transitory.

CONCLUSION

A dual input power supply system/method providing uninterruptable power to a protected load device (PLD) has been disclosed. The system includes hybrid switch devices (HSD) comprising semiconductor and relay/contactors that minimize the OPERATE/RELEASE times associated with switchover from a primary power source (PPS) to a secondary power source (SPS). An operate/release controller (ORC) monitors the condition of power provided by the PPS and SPS and determines the optimal transfer time to activate the HSD and switch between the PPS and SPS based on the PLD configuration. Use of the HSD in conjunction with the ORC permits a wide variety of series permutated AC/DC primary (PPS) and secondary (SPS) power sources, EMI snubbers (EMS), bridge rectifier diodes (BRD), AC-DC converters (ADC), and DC-DC converters (DDC) to service the PLD, while simultaneously reducing storage capacitors normally required to cover the OPERATE/RELEASE times associated with traditional PPS/SPS switchover/failover delays.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. §112(f) and such claim shall be construed to cover the corresponding structure, material, or acts described in the specification and equivalents thereof.

The phrase "MEANS FOR" specifically invokes the means-plus-function claims limitation recited in 35 U.S.C. §112(f) and such claim shall be construed to cover the corresponding structure, material, or acts described in the specification and equivalents thereof.

The phrase "STEP FOR" specifically invokes the step-plus-function claims limitation recited in 35 U.S.C. §112(f) and such claim shall be construed to cover the corresponding structure, material, or acts described in the specification and equivalents thereof.

The step-plus-function claims limitation recited in 35 U.S.C. §112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, "'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A dual input power supply system comprising:
   (a) primary power source (PPS);
   (b) primary bridge rectifier diode (PBR);
   (c) primary hybrid switch device (PHS);
   (d) secondary power source (SPS);
   (e) secondary bridge rectifier diode (SBR);
   (f) secondary hybrid switch device (SHS);
   (g) electromagnetic interference (EMI) snubber (EMS);
   (h) AC-DC converter (ADC);
   (i) DC-DC converter (DDC); and
   (j) operate/release controller (ORC);

wherein:

said PBR comprises a dual input port and a dual output port;

said SBR comprises a dual input port and a dual output port;

said PHS comprises a dual input port, a dual output port, and a control port;

said SHS comprises a dual input port, a dual output port, and a control port;

said EMS comprises a dual input port and a dual output port;

said ADC comprises a dual input port and a dual output port;

said DDC comprises a dual input port and a dual output port;

said PPS is electrically coupled to said PBR dual input port;

said PBR output port is electrically coupled to said PHS dual input port;

said SPS is electrically coupled to said SBR dual input port;

said SBR output port is electrically coupled to said SHS dual input port;

said EMS dual input port is electrically coupled to said PBR output port and said SBR output port;

said EMS output port is electrically coupled to said ADC dual input port;

said ADC output port is electrically coupled to said DDC dual input port;

said DDC output port is configured to supply power to a protected load device (PLD);

said PHS comprises a primary electromagnetic relay (PER) electrically connected in parallel with a primary semiconductor switch device (PSD) that are both electrically connected between one port connection of said PHS dual input port and one port connection of said PHS dual output port;

said SHS comprises a secondary electromagnetic relay (SER) electrically connected in parallel with a secondary semiconductor switch device (SSD) that are both electrically connected between one port connection of said SHS dual input port and one port connection of said SHS dual output port;

said PHS control port is electrically coupled to and controlled by said ORC;

said SHS control port is electrically coupled to and controlled by said ORC;

said ORC is configured to monitor a voltage provided by said PPS;

said ORC is configured to control said PER to electrically disconnect said PBR from said EMS if said PPS monitored voltage is outside a predetermined range;

said ORC is configured to control said PSD to electrically connect said PBR to said EMS during a RELEASE time associated with said PER disconnection;

said ORC is configured to control said SER to electrically connect said SBR to said EMS when said PPS monitored voltage is outside said predetermined range; and said ORC is configured to control said SSD to electrically connect said SBR to said EMS before an ACTIVATE time associated with said SER connection.

2. The dual input power supply system of claim 1 wherein said PPS comprises an AC power source and said SPS comprises an AC power source.

3. The dual input power supply system of claim 1 wherein said PPS comprises an AC power source and said SPS comprises a DC power source.

4. The dual input power supply system of claim 1 wherein said PER and said SER are selected from a group consisting of: normally-open contactor (NOC); normally-open relay (NOR); normally-closed contactor (NCC); and normally-closed relay (NCR).

5. The dual input power supply system of claim 1 wherein said PSD and said SSD are selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

6. The dual input power supply system of claim 1 wherein said PSD comprises two semiconductor switch (SSW) devices connected in series opposition to form a bidirectional semiconductor switch (BSW), said two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

7. The dual input power supply system of claim 1 wherein said SSD comprises two semiconductor switch (SSW) devices connected in series opposition to form a bidirectional semiconductor switch (BSW), said two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

8. The dual input power supply system of claim 1 wherein said PHS and said SHS each comprise a hybrid switch device (HSD), said HSD comprising:
  (1) first port electromagnetic relay (FPR);
  (2) first port semiconductor switch device (FPD);
  (3) second port electromagnetic relay (SPR);
  (4) second port semiconductor switch device (SPD);
  wherein:
  said FPR and said FPD are electrically connected in parallel across a first input port of said HSD and a first output port of said HSD; and
  said SPR and said SPD are electrically connected in parallel across a second input port of said HSD and a second output port of said HSD.

9. The dual input power supply system of claim 1 wherein said PPS and said SPS have a common GROUND connection.

10. The dual input power supply system of claim 1 wherein said PPS and said SPS do not have a common GROUND connection.

11. A dual input power supply system comprising:
  (a) primary power source (PPS);
  (b) primary electromagnetic interference (EMI) snubber (PEM);
  (c) primary bridge rectifier diode (PBR);
  (d) primary hybrid switch device (PHS);
  (e) secondary power source (SPS);
  (f) secondary electromagnetic interference (EMI) snubber (SEM);
  (g) secondary bridge rectifier diode (SBR);
  (h) secondary hybrid switch device (SHS);
  (i) AC-DC converter (ADC);
  (j) DC-DC converter (DDC); and
  (k) operate/release controller (ORC);
  wherein:
  said PEM comprises a dual input port and a dual output port;
  said SEM comprises a dual input port and a dual output port;
  said PBR comprises a dual input port and a dual output port;
  said SBR comprises a dual input port and a dual output port;
  said PHS comprises a dual input port, a dual output port, and a control port;
  said SHS comprises a dual input port, a dual output port, and a control port;
  said ADC comprises a dual input port and a dual output port;
  said DDC comprises a dual input port and a dual output port;
  said PPS is electrically coupled to said PEM dual input port;
  said PEM output port is electrically coupled to said PBR dual input port;
  said PBR output port is electrically coupled to said PHS dual input port;
  said SPS is electrically coupled to said SEM dual input port;
  said SEM output port is electrically coupled to said SBR dual input port;
  said SBR output port is electrically coupled to said SHS dual input port;
  said ADC dual input port is electrically coupled to said PHS output port and said SHS output port;
  said ADC output port is electrically coupled to said DDC dual input port;
  said DDC output port is configured to supply power to a protected load device (PLD);
  said PHS comprises a primary electromagnetic relay (PER) electrically connected in parallel with a primary semiconductor switch device (PSD) that are both electrically connected between one port connection of said PHS dual input port and one port connection of said PHS dual output port;
  said SHS comprises a secondary electromagnetic relay (SER) electrically connected in parallel with a secondary semiconductor switch device (SSD) that are both electrically connected between one port connection of said SHS dual input port and one port connection of said SHS dual output port;
  said PHS control port is electrically coupled to and controlled by said ORC;
  said SHS control port is electrically coupled to and controlled by said ORC;
  said ORC is configured to monitor a voltage provided by said PPS;
  said ORC is configured to control said PER to electrically disconnect said PBR from said ADC if said PPS monitored voltage is outside a predetermined range;
  said ORC is configured to control said PSD to electrically connect said PBR to said ADC during a RELEASE time associated with said PER disconnection;
  said ORC is configured to control said SER to electrically connect said SBR to said ADC when said PPS monitored voltage is outside said predetermined range; and said ORC is configured to control said SSD to electrically connect said SBR to said ADC before an ACTIVATE time associated with said SER connection.

12. The dual input power supply system of claim 11 wherein said PPS comprises an AC power source and said SPS comprises an AC power source.

13. The dual input power supply system of claim 11 wherein said PPS comprises an AC power source and said SPS comprises a DC power source.

14. The dual input power supply system of claim 11 wherein said PER and said SER are selected from a group consisting of: normally-open contactor (NOC); normally-open relay (NOR); normally-closed contactor (NCC); and normally-closed relay (NCR).

15. The dual input power supply system of claim 11 wherein said PSD and said SSD are selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

16. The dual input power supply system of claim 11 wherein said PSD comprises two semiconductor switch (SSW) devices connected in series opposition to form a bidirectional semiconductor switch (BSW), said two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

17. The dual input power supply system of claim 11 wherein said SSD comprises two semiconductor switch (SSW) devices connected in series opposition to form a bidirectional semiconductor switch (BSW), said two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

18. The dual input power supply system of claim 11 wherein said PHS and said SHS each comprise a hybrid switch device (HSD), said HSD comprising:
(1) first port electromagnetic relay (FPR);
(2) first port semiconductor switch device (FPD);
(3) second port electromagnetic relay (SPR);
(4) second port semiconductor switch device (SPD);
wherein:
said FPR and said FPD are electrically connected in parallel across a first input port of said HSD and a first output port of said HSD; and
said SPR and said SPD are electrically connected in parallel across a second input port of said HSD and a second output port of said HSD.

19. The dual input power supply system of claim 11 wherein said PPS and said SPS have a common GROUND connection.

20. The dual input power supply system of claim 11 wherein said PPS and said SPS do not have a common GROUND connection.

21. A dual input power supply system comprising:
(a) primary power source (PPS);
(b) primary hybrid switch device (PHS);
(c) secondary power source (SPS);
(d) secondary hybrid switch device (SHS);
(e) electromagnetic interference (EMI) snubber (EMS);
(f) bridge rectifier diode (BRD);
(g) AC-DC converter (ADC);
(h) DC-DC converter (DDC); and
(i) operate/release controller (ORC);
wherein:
said PHS comprises a dual input port, a dual output port, and a control port;
said SHS comprises a dual input port, a dual output port, and a control port;
said BRD comprises a dual input port and a dual output port;
said EMS comprises a dual input port and a dual output port;
said ADC comprises a dual input port and a dual output port;
said DDC comprises a dual input port and a dual output port;
said PPS is electrically coupled to said PHS dual input port;
said SPS is electrically coupled to said SPS dual input port;
said BRD dual input port is electrically coupled to said PHS output port and said SHS output port;
said BRD output port is electrically coupled to said EMS dual input port;
said EMS output port is electrically coupled to said ADC dual input port;
said ADC output port is electrically coupled to said DDC dual input port;
said DDC output port is configured to supply power to a protected load device (PLD);
said PHS comprises a primary electromagnetic relay (PER) electrically connected in parallel with a primary semiconductor switch device (PSD) that are both electrically connected between one port connection of said PHS dual input port and one port connection of said PHS dual output port;
said SHS comprises a secondary electromagnetic relay (SER) electrically connected in parallel with a secondary semiconductor switch device (SSD) that are both electrically connected between one port connection of said SHS dual input port and one port connection of said SHS dual output port;
said PHS control port is electrically coupled to and controlled by said ORC;
said SHS control port is electrically coupled to and controlled by said ORC;
said ORC is configured to monitor a voltage provided by said PPS;
said ORC is configured to control said PER to electrically disconnect said PPS from said BRD if said PPS monitored voltage is outside a predetermined range;
said ORC is configured to control said PSD to electrically connect said PPS to said BRD during a RELEASE time associated with said PER disconnection;
said ORC is configured to control said SER to electrically connect said SPS to said BRD when said PPS monitored voltage is outside said predetermined range; and
said ORC is configured to control said SSD to electrically connect said SPS to said BRD before an ACTIVATE time associated with said SER connection.

22. The dual input power supply system of claim 21 wherein said PPS comprises an AC power source and said SPS comprises an AC power source.

23. The dual input power supply system of claim 21 wherein said PPS comprises an AC power source and said SPS comprises a DC power source.

39

24. The dual input power supply system of claim 21 wherein said PER and said SER are selected from a group consisting of: normally-open contactor (NOC); normally-open relay (NOR); normally-closed contactor (NCC); and normally-closed relay (NCR).

25. The dual input power supply system of claim 21 wherein said PSD and said SSD are selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

26. The dual input power supply system of claim 21 wherein said PSD comprises two semiconductor switch (SSW) devices connected in series opposition to form a bidirectional semiconductor switch (BSW), said two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

27. The dual input power supply system of claim 21 wherein said SSD comprises two semiconductor switch (SSW) devices connected in series opposition to form a bidirectional semiconductor switch (BSW), said two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

28. The dual input power supply system of claim 21 wherein said PHS and said SHS each comprise a hybrid switch device (HSD), said HSD comprising:
 (1) first port electromagnetic relay (FPR);
 (2) first port semiconductor switch device (FPD);
 (3) second port electromagnetic relay (SPR);
 (4) second port semiconductor switch device (SPD);
 wherein:
 said FPR and said FPD are electrically connected in parallel across a first input port of said HSD and a first output port of said HSD; and
 said SPR and said SPD are electrically connected in parallel across a second input port of said HSD and a second output port of said HSD.

29. The dual input power supply system of claim 21 wherein said PPS and said SPS have a common GROUND connection.

30. The dual input power supply system of claim 21 wherein said PPS and said SPS do not have a common GROUND connection.

31. A dual input power supply system comprising:
 (a) primary power source (PPS);
 (b) primary electromagnetic interference (EMI) snubber (PEM);
 (c) primary hybrid switch device (PHS);
 (d) secondary power source (SPS);
 (e) secondary electromagnetic interference (EMI) snubber (SEM);
 (f) secondary hybrid switch device (SHS);
 (g) bridge rectifier diode (BRD);
 (h) AC-DC converter (ADC);
 (i) DC-DC converter (DDC); and
 (j) operate/release controller (ORC);

wherein:
 said PEM comprises a dual input port and a dual output port;
 said SEM comprises a dual input port and a dual output port;
 said PHS comprises a dual input port, a dual output port, and a control port;
 said SHS comprises a dual input port, a dual output port, and a control port;
 said BRD comprises a dual input port and a dual output port;
 said ADC comprises a dual input port and a dual output port;
 said DDC comprises a dual input port and a dual output port;
 said PPS is electrically coupled to said PEM dual input port;
 said PEM output port is electrically coupled to said PHS dual input port;
 said SPS is electrically coupled to said SEM dual input port;
 said SEM output port is electrically coupled to said SHS dual input port;
 said BRD dual input port is electrically coupled to said PHS output port and said SHS output port;
 said BRD output port is electrically coupled to said ADC dual input port;
 said ADC output port is electrically coupled to said DDC dual input port;
 said DDC output port is configured to supply power to a protected load device (PLD);
 said PHS comprises a primary electromagnetic relay (PER) electrically connected in parallel with a primary semiconductor switch device (PSD) that are both electrically connected between one port connection of said PHS dual input port and one port connection of said PHS dual output port;
 said SHS comprises a secondary electromagnetic relay (SER) electrically connected in parallel with a secondary semiconductor switch device (SSD) that are both electrically connected between one port connection of said SHS dual input port and one port connection of said SHS dual output port;
 said PHS control port is electrically coupled to and controlled by said ORC;
 said SHS control port is electrically coupled to and controlled by said ORC;
 said ORC is configured to monitor a voltage provided by said PPS;
 said ORC is configured to control said PER to electrically disconnect said PEM from said BRD if said PPS monitored voltage is outside a predetermined range;
 said ORC is configured to control said PSD to electrically connect said PEM to said BRD during a RELEASE time associated with said PER disconnection;
 said ORC is configured to control said SER to electrically connect said SEM to said BRD when said PPS monitored voltage is outside said predetermined range; and
 said ORC is configured to control said SSD to electrically connect said SEM to said BRD before an ACTIVATE time associated with said SER connection.

32. The dual input power supply system of claim 31 wherein said PPS comprises an AC power source and said SPS comprises an AC power source.

33. The dual input power supply system of claim 31 wherein said PPS comprises an AC power source and said SPS comprises a DC power source.

34. The dual input power supply system of claim 31 wherein said PER and said SER are selected from a group consisting of: normally-open contactor (NOC); normally-open relay (NOR); normally-closed contactor (NCC); and normally-closed relay (NCR).

35. The dual input power supply system of claim 31 wherein said PSD and said SSD are selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

36. The dual input power supply system of claim 31 wherein said PSD comprises two semiconductor switch (SSW) devices connected in series opposition to form a bidirectional semiconductor switch (BSW), said two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

37. The dual input power supply system of claim 31 wherein said SSD comprises two semiconductor switch (SSW) devices connected in series opposition to form a bidirectional semiconductor switch (BSW), said two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

38. The dual input power supply system of claim 31 wherein said PHS and said SHS each comprise a hybrid switch device (HSD), said HSD comprising:
 (1) first port electromagnetic relay (FPR);
 (2) first port semiconductor switch device (FPD);
 (3) second port electromagnetic relay (SPR);
 (4) second port semiconductor switch device (SPD);
 wherein:
  said FPR and said FPD are electrically connected in parallel across a first input port of said HSD and a first output port of said HSD; and
  said SPR and said SPD are electrically connected in parallel across a second input port of said HSD and a second output port of said HSD.

39. The dual input power supply system of claim 31 wherein said PPS and said SPS have a common GROUND connection.

40. The dual input power supply system of claim 31 wherein said PPS and said SPS do not have a common GROUND connection.

41. A dual input power supply method, said method operating on a dual input power supply system, said system comprising:
 (a) primary power source (PPS);
 (b) primary bridge rectifier diode (PBR);
 (c) primary hybrid switch device (PHS);
 (d) secondary power source (SPS);
 (e) secondary bridge rectifier diode (SBR);
 (f) secondary hybrid switch device (SHS);
 (g) electromagnetic interference (EMI) snubber (EMS);
 (h) AC-DC converter (ADC);
 (i) DC-DC converter (DDC); and
 (j) operate/release controller (ORC);
wherein:
 said PBR comprises a dual input port and a dual output port;
 said SBR comprises a dual input port and a dual output port;
 said PHS comprises a dual input port, a dual output port, and a control port;
 said SHS comprises a dual input port, a dual output port, and a control port;
 said EMS comprises a dual input port and a dual output port;
 said ADC comprises a dual input port and a dual output port;
 said DDC comprises a dual input port and a dual output port;
 said PPS is electrically coupled to said PBR dual input port;
 said PBR output port is electrically coupled to said PHS dual input port;
 said SPS is electrically coupled to said SBR dual input port;
 said SBR output port is electrically coupled to said SHS dual input port;
 said EMS dual input port is electrically coupled to said PBR output port and said SBR output port;
 said EMS output port is electrically coupled to said ADC dual input port;
 said ADC output port is electrically coupled to said DDC dual input port;
 said DDC output port is configured to supply power to a protected load device (PLD);
 said PHS comprises a primary electromagnetic relay (PER) electrically connected in parallel with a primary semiconductor switch device (PSD) that are both electrically connected between one port connection of said PHS dual input port and one port connection of said PHS dual output port;
 said SHS comprises a secondary electromagnetic relay (SER) electrically connected in parallel with a secondary semiconductor switch device (SSD) that are both electrically connected between one port connection of said SHS dual input port and one port connection of said SHS dual output port;
 said PHS control port is electrically coupled to and controlled by said ORC;
 said SHS control port is electrically coupled to and controlled by said ORC; and
 said PPS and said SPS have a common ground connection;
wherein said method comprises the steps of:
 (1) Determine if said PHS is active (PPS is selected as power source) and if so, proceed to step (3);
 (2) Process said SPS as said PPS in steps (3)-(28) and proceed to step (1);
 (3) Close said PER in said PHS;
 (4) Open remaining HSD switch components in said PHS and said SHS;
 (5) Sense said PPS voltage;
 (6) Determine if said PPS voltage is zero, indicating that said PPS supply is not operational, and if so, proceed to step (9);
 (7) Determine if said PPS is an AC supply with 180 VAC≤PPS≤264 VAC, and if so, proceed to step (3);
 (8) Determine if said PPS is DC supply with 190 VDC≤PPS≤300 VDC, and if so, proceed to step (3);
 (9) Turn on said PSD;
 (10) Open said PER in said PHS;
 (11) Delay to wait for said PER in said PHS to open;

(12) Turn off said PSD;
(13) Delay to wait for said PSD to fully turn off;
(14) Turn on said SSD and monitor input voltage provided by said SPS and output voltage provided by said SSD;
(15) Initialize a repeat counter (RC) to a predetermined value;
(16) Initialize and start a timeout counter (TC=0);
(17) Determine if said SPS voltage is equal to an output voltage measured at said output of said SHS, and if not, proceed to step (21);
(18) Delay 100 microseconds;
(19) Decrement said RC counter;
(20) Determine if said RC counter is zero, and if so, proceed to step (26), otherwise, proceed to step (17);
(21) Determine if said TC counter has reached a predetermined elapsed time, and if so, proceed to step (22), otherwise proceed to step (17);
(22) Turn on said PSD;
(23) Close said PER in said PHS;
(24) Delay to wait for said PER to close;
(25) Turn off said PSD and proceed to step (1);
(26) Close said SER in said SHS;
(27) Delay to wait for SER to fully close; and
(28) Open said SSD and proceed to step (1).

42. The dual input power supply method of claim 41 wherein said PPS comprises an AC power source and said SPS comprises an AC power source.

43. The dual input power supply method of claim 41 wherein said PPS comprises an AC power source and said SPS comprises a DC power source.

44. The dual input power supply method of claim 41 wherein said PER and said SER are selected from a group consisting of: normally-open contactor (NOC); normally-open relay (NOR); normally-closed contactor (NCC); and normally-closed relay (NCR).

45. The dual input power supply method of claim 41 wherein said PSD and said SSD are selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

46. The dual input power supply method of claim 41 wherein said PSD comprises two semiconductor switch (SSW) devices connected in series opposition to form a bidirectional semiconductor switch (BSW), said two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

47. The dual input power supply method of claim 41 wherein said SSD comprises two semiconductor switch (SSW) devices connected in series opposition to form a bidirectional semiconductor switch (BSW), said two SSW devices selected from a group consisting of: NPN bipolar transistor; PNP bipolar transistor; N-channel MOSFET; P-channel MOSFET; N-channel and P-channel MOSFET transmission gate (T-GATE); insulated-gate bipolar NPN transistor (IGBT-NPN); and insulated-gate bipolar PNP transistor (IGBT-PNP).

48. The dual input power supply method of claim 41 wherein said PHS and said SHS each comprise a hybrid switch device (HSD), said HSD comprising:
(1) first port electromagnetic relay (FPR);
(2) first port semiconductor switch device (FPD);
(3) second port electromagnetic relay (SPR);
(4) second port semiconductor switch device (SPD);
wherein:
said FPR and said FPD are electrically connected in parallel across a first input port of said HSD and a first output port of said HSD; and
said SPR and said SPD are electrically connected in parallel across a second input port of said HSD and a second output port of said HSD.

* * * * *